(12) United States Patent
Agrawala et al.

(10) Patent No.: US 7,496,484 B2
(45) Date of Patent: Feb. 24, 2009

(54) SYSTEM AND METHOD FOR ABSTRACTING AND VISUALIZING A ROUTE MAP

(75) Inventors: Maneesh Agrawala, San Francisco, CA (US); Chris Stolte, Stanford, CA (US)

(73) Assignee: Microsoft Corporation, Redmond, WA (US)

( * ) Notice: Subject to any disclaimer, the term of this patent is extended or adjusted under 35 U.S.C. 154(b) by 718 days.

(21) Appl. No.: 11/005,862

(22) Filed: Dec. 6, 2004

(65) Prior Publication Data

US 2005/0182604 A1    Aug. 18, 2005

Related U.S. Application Data

(60) Division of application No. 09/727,646, filed on Nov. 30, 2000, now Pat. No. 6,952,661, which is a continuation-in-part of application No. 09/528,703, filed on Mar. 17, 2000, now Pat. No. 6,424,933.

(51) Int. Cl.
*G06F 7/60* (2006.01)
(52) U.S. Cl. ............... 703/2; 701/210; 701/208; 701/212; 701/211; 701/213; 340/988; 340/990; 345/660; 345/665
(58) Field of Classification Search .......... 701/213, 701/209, 208; 340/995.22, 995.14; 707/3; 342/357.09
See application file for complete search history.

(56) References Cited

U.S. PATENT DOCUMENTS 4,796,189 A * 1/1989 Nakayama et al. ......... 701/209

4,814,989 A * 3/1989 Dobereiner et al. ......... 701/210
4,897,792 A * 1/1990 Hosoi .......................... 701/208
5,179,329 A * 1/1993 Nishikawa et al. .......... 318/587
5,229,941 A * 7/1993 Hattori ........................ 701/26
5,345,388 A * 9/1994 Kashiwazaki ............... 701/213
5,486,822 A * 1/1996 Tenmoku et al. ........ 340/995.22

(Continued)

FOREIGN PATENT DOCUMENTS

WO    PCT/US01/08439    3/2001

OTHER PUBLICATIONS

T. Alan Keahey☐☐The Generalized Detail-In-Context Problem☐☐Information Visualization, 1998. Proceedings. IEEE Symposium on Oct. 19-20, 1998 pp. 44-51, 152.*

(Continued)

*Primary Examiner*—Kamini Shah
*Assistant Examiner*—Cuong V Luu
(74) *Attorney, Agent, or Firm*—Merchant & Gould, P.C.

(57) ABSTRACT

A system and method for making computer-generated maps includes a different scale factor for each road in a route. The scale factors are used to optimize the route map against a target function that considers factors such as the number of false intersections in the route and the number of roads falling below a minimum length threshold. A refinement technique such as simulated annealing is used to find a solution to the target function. Each road in the scaled map is rendered to provide a finished product having the appearance of a hand-drawn map. The finished product includes context roads that intersect the main route but are not part of the main route. Furthermore, the hand-drawn map is optimized to the characteristics of the viewport used to visualize the map.

9 Claims, 41 Drawing Sheets

U.S. PATENT DOCUMENTS

| | | | |
|---|---|---|---|
| 5,559,707 | A | 9/1996 | DeLorme et al. |
| 5,689,717 | A | 11/1997 | Pritt |
| 5,787,383 | A * | 7/1998 | Moroto et al. ............... 701/210 |
| 5,802,492 | A | 9/1998 | DeLorme et al. |
| 5,848,374 | A | 12/1998 | Wakabayashi et al. |
| 5,884,218 | A * | 3/1999 | Nimura et al. ............... 701/208 |
| 5,897,604 | A | 4/1999 | Takahashi et al. |
| 5,925,090 | A | 7/1999 | Poonsaengsathit |
| 5,945,927 | A | 8/1999 | Nakayama et al. |
| 5,948,040 | A | 9/1999 | DeLorme et al. |
| 5,951,622 | A * | 9/1999 | Nomura ...................... 701/212 |
| 5,961,572 | A | 10/1999 | Craport et al. |
| 5,974,356 | A | 10/1999 | Doyle et al. |
| 5,978,747 | A | 11/1999 | Craport et al. |
| 6,011,494 | A * | 1/2000 | Watanabe et al. ...... 340/995.14 |
| 6,021,372 | A * | 2/2000 | Harrington .................. 701/209 |
| 6,038,498 | A | 3/2000 | Briffe et al. |
| 6,067,502 | A | 5/2000 | Hayashida et al. |
| 6,101,443 | A * | 8/2000 | Kato et al. .................. 701/210 |
| 6,108,555 | A | 8/2000 | Maloney et al. |
| 6,112,141 | A | 8/2000 | Briffe et al. |
| 6,119,066 | A | 9/2000 | Sugiura et al. |
| 6,125,367 | A | 9/2000 | NA |
| 6,154,219 | A | 11/2000 | Wiley et al. |
| 6,202,026 | B1 * | 3/2001 | Nimura et al. ............... 701/211 |
| 6,222,583 | B1 | 4/2001 | Matsumura et al. |
| 6,278,383 | B1 | 8/2001 | Endo et al. ............. 340/995.14 |
| 6,321,158 | B1 | 11/2001 | DeLorme et al. |
| 6,324,469 | B1 * | 11/2001 | Okude et al. ................ 701/208 |
| 6,349,261 | B1 | 2/2002 | Ohnishi et al. |
| 6,414,696 | B1 | 7/2002 | Ellenby et al. |
| 6,421,659 | B1 * | 7/2002 | Nomura ......................... 707/3 |
| 6,424,911 | B2 | 7/2002 | Yamashita et al. |
| 6,424,933 | B1 | 7/2002 | Agrawala et al. |
| 6,546,336 | B1 * | 4/2003 | Matsuoka et al. ........... 701/213 |
| 6,565,610 | B1 | 5/2003 | Wang et al. |
| 6,587,787 | B1 * | 7/2003 | Yokota ....................... 701/212 |
| 6,680,694 | B1 * | 1/2004 | Knockeart et al. ..... 342/357.09 |
| 6,707,421 | B1 * | 3/2004 | Drury et al. .............. 342/357.1 |
| 6,952,661 | B2 | 10/2005 | Agrawala et al. |
| 7,076,409 | B2 | 7/2006 | Agrawala et al. |
| 7,330,787 | B2 | 2/2008 | Agrawala et al. |
| 2005/0149303 | A1 | 7/2005 | Agrawala et al. |
| 2005/0182604 | A1 | 8/2005 | Agrawala et al. |
| 2005/0182605 | A1 | 8/2005 | Agrawala et al. |

OTHER PUBLICATIONS

Glassner, Copyright 1989 by Academic Press Ltd., "An Introduction to Ray Tracing," Xerox PARC, 216-227.

Samet, Jun. 1990, "Applications of Spatial Data Structures," Computer Graphics, Image Processing, and GIS, pp. 1-9.

Visvalingam et al., Jun. 1993, "Line Generalisation by Repeated Elimination of Points," Cartographic Information Systems Research Group, University of Hull, pp. 46-51.

Cormen et al., 1990, "Introduction to Algorithms," Chapter 17, pp. 329-355.

Van Keveld et al., "Point Set Labeling with Sliding Labels," Proceedings of the 14th Annual Symposium on Computational Geometry, pp. 337-346 (1998), cited by Examiner.

Rogers et al., "An Adaptive Interactive Agent for Route Advice," DaimlerChrysler Research and Technology Center, May 1-5, 1999, pp. 198-205.

Haigh et al., "Route Planning by Analogy," Proc. Of Intl. Conf. on Case-Based Reasoning, 1995, pp. 1-12.

Vinson, "Design Guidelines for Landmarks to Support Navigation in Virtual Environments," ACM Conference on Human Factors in Computing Systems, pp. 278-285 (May 1999).

U.S. Office Action dated Jul. 13, 2007 cited in U.S. Appl. No. 11/073,399.

Rayson, "Aggregate Towers: Sale Sensitive Visualization and Decluttering of Geospatial Data," IEEE 1999 Symposium on Information Visualization, 1999, pp. 92-99, 149.

Mehta et al., "The Road Best Traveled," Geo Info Systems, Mar. 1999, vol. 9, Issue 3, pp. 36-39.

Sarkar et al., "Graphical Fisheye Views," Communications of the ACM, 1994, vol. 37, Issue 12, pp. 73-83.

Kirkpatrick et al., "Optimization by Simulated Annealing," Science, May 1983, vol. 22 No. 4598, pp. 671-680.

Douglas et al., Dec. 1973, "Algorithims for the Reduction of the Number of Points Required to Reresent a Digitized Line or its Caricature," The Canadian Cartographer, vol. 10., No. 2, pp. 112-122.

Glassner, "An Introduction to Ray Tracing," Xerox PARC, 216-227, 1989.

Ramer, 1972, "An Iterative Procedure for the Polygonal Approximation of Plane Curves," Computer Graphics and Image Processing, vol. 1,pp. 244-356.

Michaelwicz et al., 2000, "How to Solve It: Modern Heuristics," pp. 87-109.

Michaelwicz et al., 2000, "How to Solve It: Modern Heuristics," pp. 125-134.

Samet, "Applications of Spatial Data Structures," Computer Graphics, Image Processing, and GIS, pp. 1-9, 1989.

Visvalingam et al., "Line Generalisation by Repeated Elimination of Points," Cartographic Information Systems Research Group, University of Hull, pp. 46-51, 1993.

Barkowsky et al., 2000, "Schematizing Maps: Simplification of Geographic Shape by Discrete Curve Evolution," Spcial Cognition II, LNAI 1849, pp. 41-53.

Carpendale et al., 1995, "Three-Dimensional Pliable Surfaces: For the Effective Presentation of Visual Information," Proceedings of the ACM Symposium on User Interface Software and Technology, UIST 95:217-226.

Cormen et al.,, "Introduction to Algorithms," Chapter 17, pp. 329-355, 1990.

Edmondsen et al., 1997, "A General Cartographic Labeling Algorithm," Cartographics 33:12-23.

Markosian et al., "Real-Time Nonphotorealistic Rendering," In: SIGGRAPH 97 Conference Proceedings (Aug. 1997), pp. 415-420.

Seligman and Feiner, 1991, "Automated Generation of Intent-Based 3D Illustrations," Computer Graphics 25(4): 123-132.

Keahey, The Generalized Detail-in-Context Problem, Information Visualization, Proceedings, IEEE Symposium, pp. 44-51 (Oct. 19-20, 1998).

Herbert Freeman, Jeffrey Doerschler, "System for Dense Map Name Placement", Communication of the ACM, Jan. 1992, vol. 35, No. 1.

Edmonson et al., "A General Cartographic Labelling Algorithm", Cartographica, Winter 1996, vol. 33, pp. 1-11.

U.S. Office Action dated Dec. 31, 2007 issued in U.S. Appl. No. 11/073,399.

U.S. Office Action dated Aug. 1, 2008 issued in U.S. Appl. No. 11/005,952.

U.S. Office Action dated Feb. 20, 2008 issued in U.S. Appl. No. 11/005,952.

* cited by examiner (Prior Art - With Arrows Added)

Page 1        Page 2

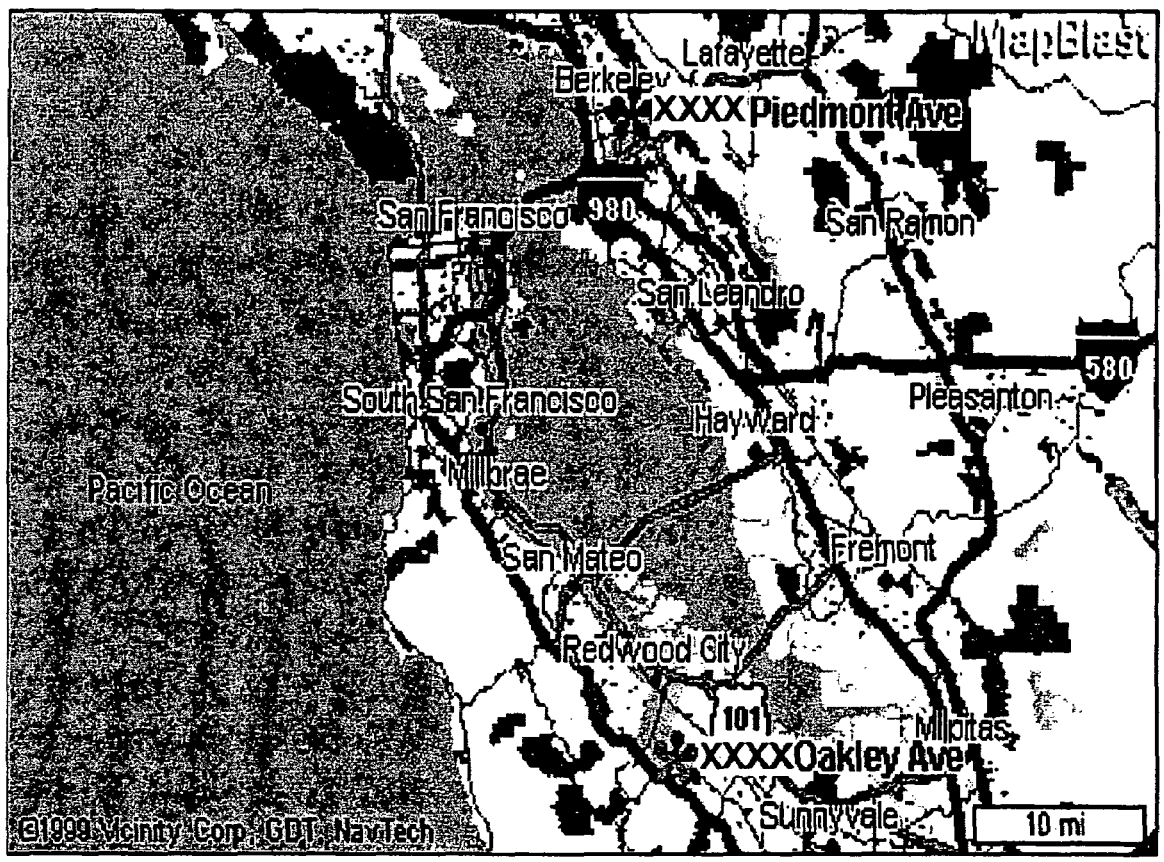
(a)
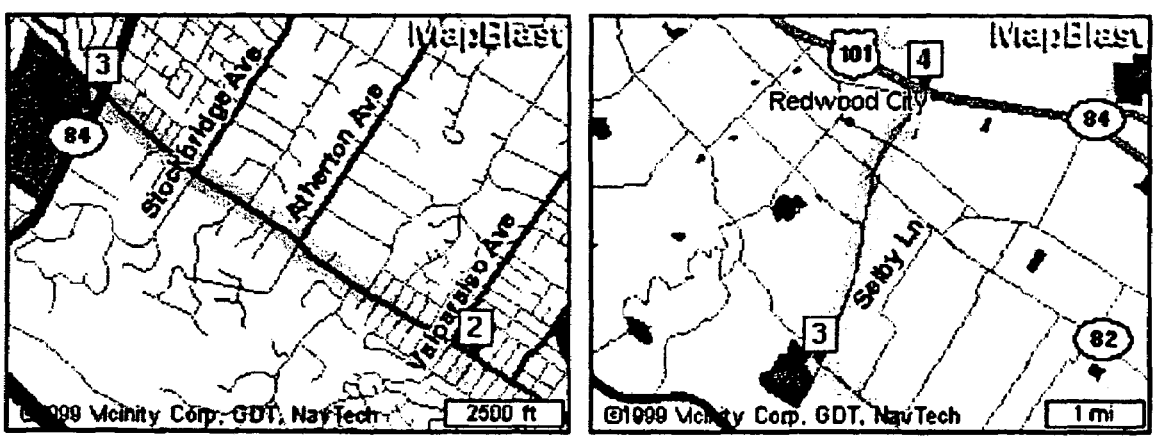
(b)
(Prior Art)
FIG. 3

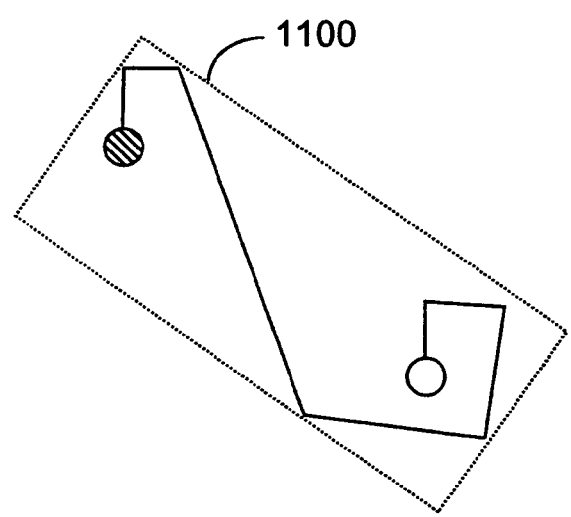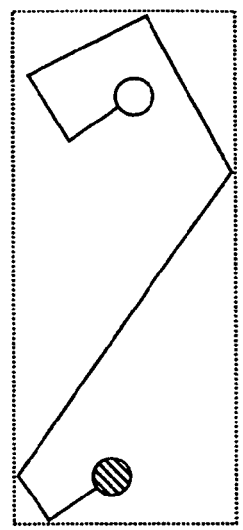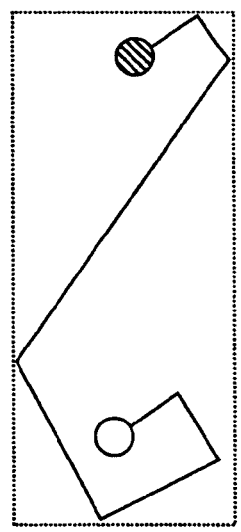
FIG. 11A   FIG. 11B   FIG. 11C

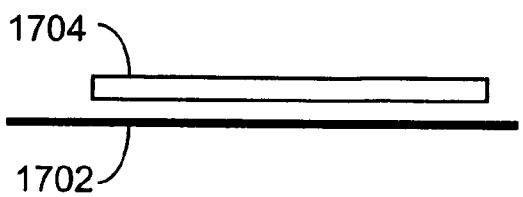
FIG. 17A
FIG. 17B
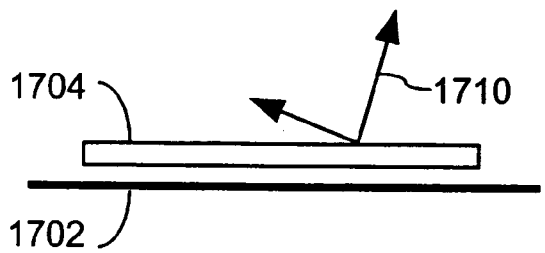
FIG. 17C
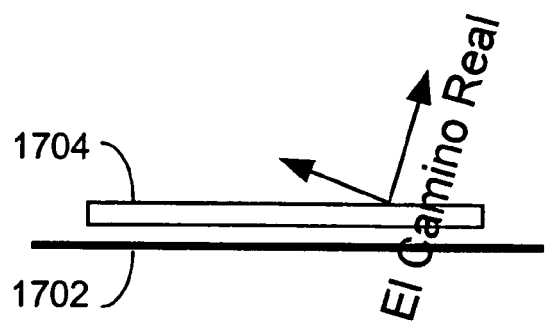
FIG. 17D
| El Camino Real |
|---|
FIG. 18A
| ← | El Camino Real |
|---|---|
FIG. 18B
| El Camino Real | 10.5 |
|---|---|
FIG. 18C
(82)
FIG. 18D
| El Camino Real |
|---|
FIG. 18E
(82)
10.5
FIG. 18F

FIG. 21A

From: XX Oak St
San Francisco, CA 94102-6011
To: XXX University Ave
Palo Alto, CA 94301-1628

FIG. 21B

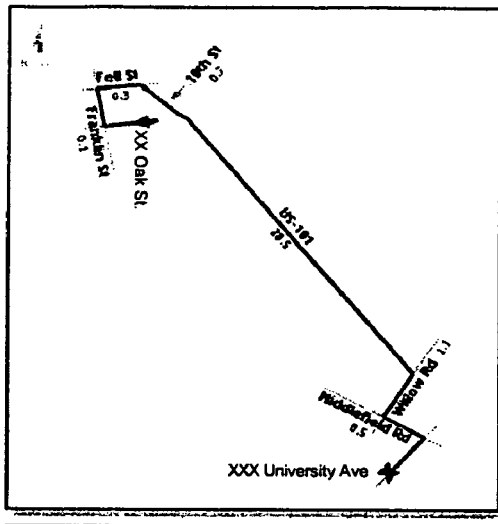

FIG. 21C

The estimated travel time is 34 minutes for 32.28 miles of travel, total of 10 steps.
Directions (Elapsed Distance)
1. Begin at XX Oak St on Oak St and go West for about 300 feet (0.1)
2. Turn right on Franklin St and go North for about 300 feet (0.1)
3. Turn right on Fell St and go East for 0.2 miles (0.3)
4. Turn right on 10th St and go Southeast for 0.6 miles (0.9)
5. Turn left on ramp and go Southeast for 0.3 miles (1.2)
6. Bear right on US-101 and go Southeast for 28.5 miles (29.7)
7. Continue on ramp at sign reading "Willow Road to Menlo Park" and go Southeast for 0.2 miles (29.9)
8. Turn right on Willow Rd and go Southwest for 1.0 miles (30.9)
9. Turn left on Middlefield Rd and go Southeast for 0.5 miles (31.4)
10. Turn right on University Ave and go Southwest for 0.9 miles to XXX University Ave (32.3)

FIG. 21D

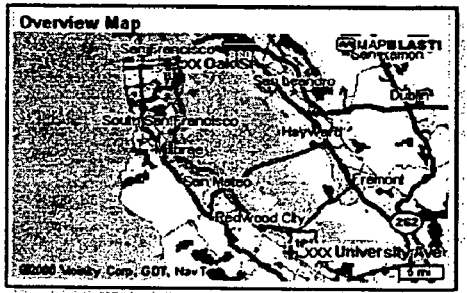

FIG. 21E

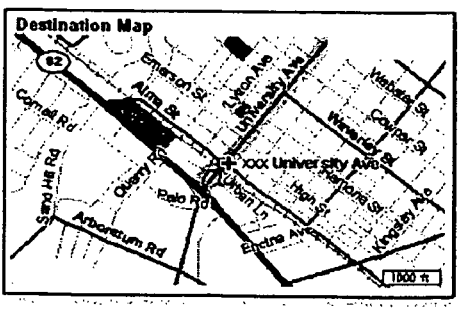

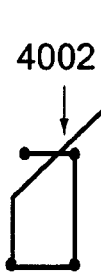
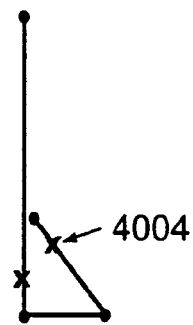
FIG. 40A   FIG. 40B   FIG. 40C   FIG. 40D
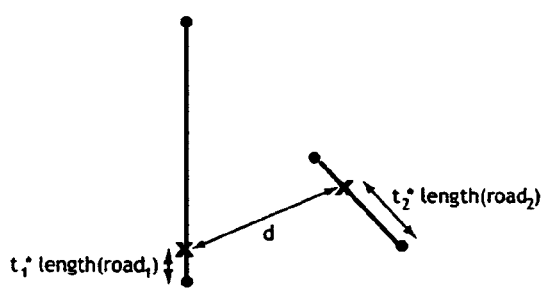
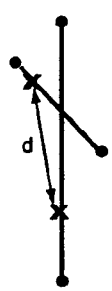
FIG. 41A   FIG. 41B
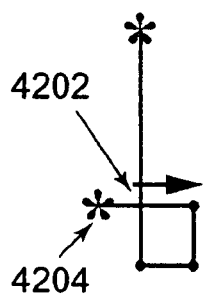
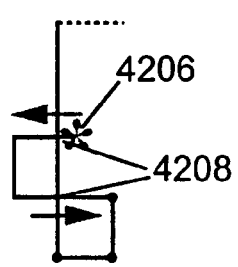
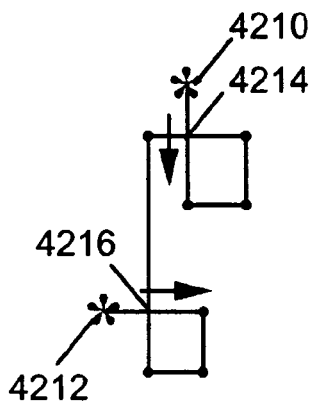
FIG. 42A   FIG. 42B   FIG. 42C

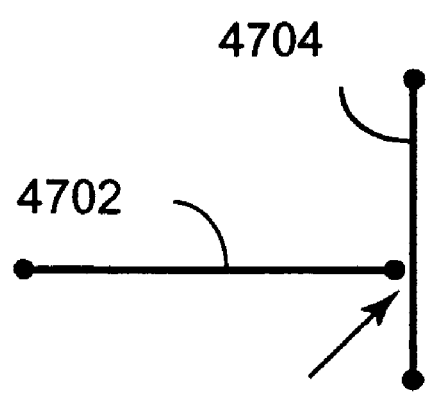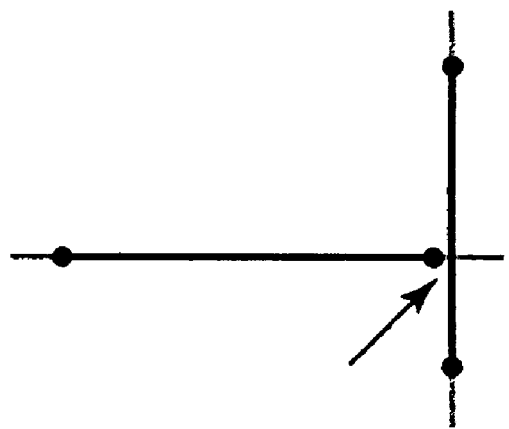
FIG. 47A FIG. 47B

SYSTEM AND METHOD FOR ABSTRACTING AND VISUALIZING A ROUTE MAP

This application is a divisional of U.S. patent application Ser. No. 09/727,646 filed Nov. 30, 2000, entitled System And Method For Abstracting And Visualizing A Route Map, which is a continuation-in-part of application Ser. No. 09/528,703 filed Mar. 17, 2000, now U.S. Pat. No. 6,424,933, the disclosures of which are hereby incorporated herein by reference in their entirety.

The present invention relates generally to a system and method for generating a route map. More particularly, this invention relates to a system and method for applying a unique scale factor to each road in a route map and for optimizing the positions of labels in the route map. Further, a method for rendering the appearance of roads in the route map is disclosed.

BACKGROUND

Route maps, when well designed, are an effective device for visualizing and communicating directions. Such maps have existed in various forms for centuries, and the recent availability of detailed geographic databases via the Internet has led to the widespread use of computer-generated route maps. Online mapping services typically provide directions as a set of maps complemented with text descriptions. Such on-line computer-generated maps are unsatisfactory, however, because the algorithms used to generate the maps disregard many of the techniques and principles used by human map-makers.

Effective use of a route map generally requires two distinct activities: (i) following a path until reaching a critical point and (ii) changing orientation at that point to follow another path. Thus, one of the most important types of information route maps can communicate are points of reorientation, that is, point along the route where someone must consciously turn from one path to another. However, existing computer-generated route maps fail to effectively communicate points of reorientation because they scale all the roads in the map by a constant scale factor. The scaling of all the roads in a route map by a constant scale factor is referred to herein as uniform scaling. As a result of uniform scaling, for routes of any reasonable length, uniform scaling frequently requires some roads to be very short. But it is often precisely these very short roads that connect critical turning points. Thus, uniform scaling can result in a loss of some of the most critical information found in a route map.

Another shortcoming in prior art computer-generated route maps is that they needlessly depict accurate length, angle, and curvature of each road in the route. Such accurate depictions are made at the expense of map readability. Psychological research indicates that most people distort distances, angles, and curvature when drawing route maps. See e.g., Tversky and Lee, "How space structures language," Spatial Cognition: An interdisciplinary approach to representation and processing of spatial knowledge, (eds.) Freska, Habel, and Wender, 1998, 157-175; Tversky and Lee, "Pictorial and Verbal Tools for Conveying Routes," COSIT 99, Conference Proceedings, Stade Germany, 1999, 51-64. Other psychological studies indicate that people maintain such distortions in their own mental representations of a route. See e.g., Tversky, "Distortions in Cognitive Maps," Geoforum 23, 1992, 131-138. Thus, adherence to accurate lengths and angles in prior art computer-generated maps runs counter to how humans conceptualize routes.

Computer-generated route maps can be classified into four major mapping styles: route highlight maps, TripTiks, overview/detail maps, and two dimensional nonlinear distortion maps. Route highlight maps simply highlight the route on a general road map of the region, as shown in FIG. 1. Since the purpose of general road maps is to provide an understanding of the entire road system in a region, such maps typically employ constant scale factors and display extraneous detail throughout the map. The constant scaling, as exhibited in FIG. 1, generally causes one of two problems. Either detailed turn information is lost because the scale factor is too large, or the scale factor is small enough to show the detail, but the map is very large. Since general road maps are not optimized to show any particular route, a route highlight map will often suffer from both a large scale factor and an inconvenient size. The clarity of the route in a route highlight map depends on the style of the highlighting since that is the only property differentiating the route from other roads. Usually the route is distinctively colored, but because general road maps provide context information over the entire map, the map is cluttered with extraneous information that makes it difficult to perceive the route and the individual reorientation points.

TripTiks are similar to route highlight maps, but they are specifically designed for communicating a particular route. As shown in FIG. 2, a TripTik map usually stretches over multiple rectangular pages, and each page is oriented so that the route runs roughly down the center of the page. Each TripTik page employs constant scaling, but the scale factor differs across pages. Changing the scale factor from page to page allows the TripTik to show more detailed turn information where needed. However, because the map stretches over many pages and the orientation and scale factor varies from page to page, forming a general understanding of the overall route is difficult.

Overview/detail maps combine multiple maps rendered at different scales to present a single route, as shown in FIG. 3. One of the maps (e.g., FIG. 3A) is scaled by a large factor so that it provides an overview of the entire route. Since the large scale factor of this map reduces the readability of local turn details, maps showing turn-by-turn information are provided (e.g., FIG. 3B). A constant scale factor is used for each map, but the scale factor differs across the maps. While an overview/detail map may seem like an effective combination, such maps are unsatisfactory in practice. The overview map rarely presents more than the overall direction and context of the route. Although turn-by-turn maps provide detailed information for every turn, the use of distinct maps for each turn, often with different orientation and scale, makes it difficult to understand how the maps correspond to one another. Therefore, the navigator has difficulty forming a cognitive model of the route.

To ensure clear communication of all of the reorientation points, some parts of a route's depiction may require a small scale factor while others require a large scale factor. Researchers have described attempts to use two dimensional nonlinear image distortion techniques on general road maps to provide focus-plus-context viewing. (See. e.g., Carpendale et al., "Three-Dimensional Pliable Surfaces: For the Effective Presentation of Visual Information," Proceedings of the ACM Symposium on User Interface Software and Technology, UIST 95, 1995, 217-226; Keahey, "The Generalized Detail-In-Context Problem," Proceedings of the IEEE Symposium on Information Visualization, IEEE Visualization 1998). These techniques allow users to choose regions of the map they want to focus on and then apply a nonlinear magnification, such as a spherical distortion, to enlarge these focus regions. Such two dimensional distortion allows detailed information to be displayed only where relevant and often produces general area maps that can be conveniently displayed on a single page. However, a major problem with nonlinear two-dimensional distortion is that the regions at the edges between the magnified and non-magnified portions of the map undergo extreme distortion.

In an effective route map, all essential components of the route, especially the roads, are easily identifiable. The route is clearly marked and readily apparent even at a quick glance. The map contains only as much information as is necessary and is easy to carry and manipulate. To further such design goals, map content, precision, and rendering style must be carefully optimized. Map content includes important parameters such as a route start and end, as well as points of reorientation. Although all maps are abstract representations of a route, there is a range of styles that can be used to render a map, with varying associations of accuracy and realism. An appropriate rendering style can greatly affect the readability and clarity of a map. Retinal properties such as color and line thickness are used to draw attention to important features of the map. Rendering style can also aid the user in interpreting how closely the map corresponds with the real world. Another important map design goal is the proper use of context information. The amount of context information included in the map greatly affects the utility of the map. Useful context information includes labels or names for a path on the route as well as context information along the route such as buildings, stop lights, or stop signs. When drawing a route map by hand, people most commonly use context information to indicate points of reorientation and, less frequently, to communicate progress along a road.

Environmental psychology studies have demonstrated that human generated route maps contain distortion. There are three primary types of distortion: (1) inaccurate path lengths, (2) incorrect turning angles at intersections, and (3) simplified road shape. For example, Tversky and Lee, COSIT 99 Conference Proceedings, 1999, 51-64, asked a group of students to sketch a route map between two locations near the Stanford University campus. Although they encouraged participants in their study to represent paths and intersections accurately, most did not. Most intersections were drawn at right angles regardless of their actual angle and seventy-one percent of the participants used simple generic curves and straight lines to represent roads. Even when participants intended to communicate the shape or length of the road accurately, they typically rendered these attributes incorrectly. Such distortion in the map is in fact beneficial because it increases the flexibility available to the map-maker in the design and layout of the map. Variably scaling the length of each road allows the map-maker to ensure all reorientation points are visible, while flexibility in choosing turning angles and road curvature allows the map to be simplified. Such distortions can simultaneously improve the readability and convenience of the route map with little adverse effect on its clarity and completeness.

Hand-drawn route maps often present a good combination of readability, clarity, completeness and convenience, as shown in FIG. 4. Instead of using a constant scale factor, hand-drawn maps only maintain the relative ordering of roads by length. While this ensures that longer roads appear longer than shorter roads in the map, each road is scaled by a different factor. Often the map designer does not know the exact length of the roads and only knows their lengths relative to one another. The flexibility of relative scaling allows hand-drawn route maps to fit within a manageable size and remain readable.

Hand-drawn route maps typically remove most contextual information that does not lie directly along the route. This strategy reduces overall clutter and improves clarity. The intersection angles in hand-drawn maps are generally incorrect, the precise shape of roads is often misrepresented, and the roads are typically depicted as generically straight or curved. These distortions make the map simpler and only remove unnecessary information. Hand-drawn route maps are rendered in a "sketchy" style typical of quick pen-and-ink doodling. Many navigators are familiar with such hand-drawn maps and the sketchy style is a subtle indicator of imprecision in the map.

In order to improve route map clarity, many algorithms have been developed for smoothing, interpolating, and simplifying roads in a route map. In the area of map rendering the most well-known simplification algorithms are Douglas & Peucker, "Algorithms for the reduction of the number of points required to represent a digitized line or its caricature," The Canadian Cartographer 10(2), 1973, 112-22; Ramer, "An iterative approach for polygonal approximation of planar closed curves," Computer Graphics and Image Processing. 1, 1972, 244-56isvalingam & Whyatt, "Line generalization by repeated elimination of points," Cartographic Journal. 30(1), 1993, 46-51; and Barkowsky, Latecki, and Richter, "Schematizing maps: Simplification of geographic shape by discrete curve evolution," in Freksa, Brauer, Habel, and Wender (eds.): Spatial Cognition II, Springer-Verlag, Berlin, in press. Given a piecewise linear curve as a set of shape points, all of these methods remove some subset of the shape points to produce a simpler curve. Examples of shape points 3302 and turning points 3306 are provided in FIG. 33A. Each of these methods uses different criteria/metrics to decide which shape points to remove and which to retain. As roads become simpler both the perceptual benefits and processing speed increase. The most extreme form of simplification replaces the piecewise linear road with a single linear segment from the first shape point to the last shape point. Although this extreme approach produces a good approximation in most cases, it can cause the map to become misleading. Prior art algorithms for simplifying roads in a route map can generate three types of undesirable results:

(i) False Intersections. Roads that did not intersect before simplification falsely intersect after simplification. An example of a false intersection 3310 is found in FIG. 33A.

(ii) Missing Intersections. Roads that did intersect before simplification no longer intersect after simplification. An example of a missing intersection 3312 is found in FIG. 33B.

(iii) Inconsistent Turning Angles. The turning angle between roads can change substantially, even to the point where a left turn might appear as a right turn. An example of a wrong turn angle 3314 is found in FIG. 33C.

Based on the above background it is apparent that what is needed in the art is an improved system and method for making computer-generated maps. What is further needed in the art is a system and method for making computer generated maps that avoid the pitfalls found in existing map-making algorithms, such as the use of extraneous information and constant scaling.

SUMMARY OF THE INVENTION

The present invention provides an improved system and method for making computer-generated maps. In the present invention, each road in a route is individually scaled. The scale factor for each road is optimized using an objective function that considers a number of factors such as the number of false intersections and the number of roads that are shorter than a minimum threshold length. Thus, the scaled route fits in a predetermined viewport without loss of information about important turns. Refinement against the objective function is performed by one of many possible search algorithms such as greedy searches, simulated annealing schedules, or gradient descents. Greedy search algorithms are described in Cormen et al., Introduction to Algorithms, eds. Cormen, Leiserson, & Rivest, The MIT Press, Cambridge Mass., 1990, 329-355. Simulated annealing was first disclosed by Kirkpatrick et al. in the article "Optimization by Simulated Annealing," Science 220 1983, 671-680. Unlike prior art methods, some embodiments of the present invention provide simplification algorithms that ensure that problems such as false intersections, missing intersections, and inconsistent turning angles do not occur in the final scaled route map.

Map clutter in the scaled map is avoided by refining label positions against a novel target function that minimizes the number of roads the labels intersect, the number of labels that intersect each other, and the distance along the route between a label and the center of a road corresponding to the label. In one embodiment, simulated annealing is used to find a solution to the novel target function. The final scaled route map is rendered so that it has the appearance of a hand-drawn map. The rendered map clearly communicates every reorientation point in a readable and convenient form.

One embodiment of the present invention provides a method for rotating the route map to best fit the display aspect ratio. In this method, a collection of reference points in the route map are defined. Each reference point in the collection corresponds to a position of an intersection in the route map. The collection of reference points form a distribution in two dimensional space. Therefore, they can be fitted with a probability distribution function that defines the mean position of the collection of reference points in the two dimensional space as well as the farthest position in which a member of the collection of reference points extends in a first direction away from the mean position (i.e. a first extent) as well as the farthest position to which a member of the collection of reference points extends in a direction that is orthogonal to the vector between the mean position and the position of the first extent (i.e. a second extent). The mean, first extent, and second extent provide a description of the outer boundary of the reference points and a bounding box that denotes this outer boundary is computed. The bounding box is centered on the mean position and the sides of the bounding box are determined by the positions of the first extent and the second extent. The orientation of the bounding box is determined by the vector between the mean position and the position of the first extent. Based on this orientation, the route map is rotated by an amount that is sufficient to reorient the bounding box to a predetermined orientation, thus forming a rotated route map. A portion of the rotated route map is then presented, thereby optimizing the display of the route map.

Another embodiment of the present invention provides a method for placing an annotation or label in a route map. In the method, the route map is partitioned into an initial grid. The grid is composed of grid cells. Candidate grid cells, into which the annotation or label can be placed, are identified. Each of the candidate grid cells are free of objects associated with the route map. When the annotation or label will not fit in a single candidate grid cell, a search for grid cells having sufficient adjacent object free grid cells is conducted. This search is subject to the requirement that the candidate grid cell, and one or more of the adjacent object free grid cells, must be able to accommodate the annotation or label. When no candidate grid cells are found during the identifying or searching stages, a grid subdivision scheme is performed. The grid subdivision scheme subdivides a portion of the grid cells in the initial grid to form a new grid. Then, the identifying and searching steps are repeated using the new grid. When multiple candidate grid cells are found, each candidate grid cell is ranked based on a density of objects in grid cells that border each candidate grid cell. The candidate grid cell that borders grid cells having the lowest density of objects is selected as the candidate grid cell and all other candidate grid cells are discarded. The annotation or label is positioned in the candidate grid cell, thereby placing the annotation or label in the route map.

In another embodiment of the present invention, a plurality of labels are positioned in a route map. For each label in the plurality of labels, the following steps are performed:

(i) A plurality of constraint definitions are associated with the label. Each constraint definition in the plurality of constraint definitions uniquely defines a bounding box, label orientation, and layout style.

(ii) An initial constraint definition is selected from the plurality of constraint definitions.

(iii) A center of the label is positioned at a location within the bounding box defined by the initial constraint definition in accordance with the label orientation and layout style defined by the initial constraint definition.

The method further comprises choosing a label in the plurality of labels and determining a first score ($S_1$) using a target function. The target function is determined by a position of the chosen label in the route map. Then, a constraint definition is selected from the plurality of constraint definitions associated with the selected label. The selected constraint definition is then applied. Application of the constraint definition includes the step of repositioning the center of the label inside the bounding box defined by the constraint definition, in accordance with the label orientation and layout style defined by the constraint definition. A second score ($S_2$) is calculated using a target function that considers the repositioned label position. The new position for the label is accepted in accordance with a function that is determined by a comparison of $S_1$ and $S_2$. The choosing, determining, applying, calculating, and accepting steps are repeated until a first occurrence of an exit condition. Exemplary exit conditions include achievement of a suitably low score or the occurrence of a predetermined number of repetitions of the choosing, determining, applying, calculating, and accepting steps.

Still another embodiment of the present invention provides a method of preparing a route map that describes a path between a start and an end. In this method, the path from the start to the end is obtained. The path comprises an initial set of elements. Each element includes sufficient information to determine a direction. Further, each element intersects at least one other element in the initial set of elements. A first element in the initial set of elements includes a start and a second element in the set includes the end. A different scale factor is independently applied to each of at least two elements in the initial set of elements. Application of the different scale factor to each of the at least two elements produces a scaled set of elements. A total height and a total width of a rendering of each element in the scaled set of elements is estimated. Then, an image component is selected based on a function of the total height and the total width. Finally, an image of the scaled route map is formed by rendering each element in the scaled set of elements.

Another embodiment of the present invention includes a method of adding a cross street, and a cross street label associated with the cross street, to a route map that includes a main path. In the method, an intersection point at which the cross street intersects the main path is determined. The cross street is placed in the route map with the constraint that the cross street intersects the main path at a first test position that is randomly chosen from a segment of the main path that includes the intersection point. The cross street label is positioned at a second test position within a predetermined area. The predetermined area includes the intersection point. A length of the cross street is adjusted so that the cross street passes under the cross street label and intersects the main path. The first or second test position is perturbed by an random amount and a score of a function, i.e. scoring function, is obtained. The size of the random amount used to perturb the first or second test position is typically a small increment that is designed to see if a "tweak" in the first or second test position leads to an improved score. However, on occasion, the size of the random amount used to perturb the first or second test position is considerably larger, in order to prevent the scoring function from becoming trapped in a local minima. The scoring function is determined by a location of the cross street and the cross street label in the route map. The perturbing and obtaining steps are repeated until the score reaches a threshold value or the perturbing and obtaining steps have been executed a predetermined number of times. The cross street and the cross street label are added to the route map when the score reaches the threshold value. Furthermore, the cross street and the cross street label are not added to the route map when the perturbing, obtaining and determining steps have been executed the predetermined number of times before the score has reached the threshold value.

In still another embodiment of the present invention, a method of preparing a route map that describes a path between a start and an end is provided. In this method, the path from the start to the end is obtained. The path comprises an initial set of elements. Each element includes sufficient information to determine a direction and each element intersects at least one other element in the initial set of elements. A first element in the initial set of elements includes the start and a second element in the initial set of elements includes the end. A different scale factor is independently applied to each of at least two elements in the initial set of elements. Application of the different scale factor to each of the at least two elements produces a scaled set of elements. A rendering of each element in the scaled set of elements is created to form an intermediate map. A set of N breakpoints is identified in the intermediate map. Each breakpoint in the set of N breakpoints occurs in an element in the scaled set of elements, and a minimum value for N is determined by the expression:

$$N >= S/M$$

where,

S is a number of elements in the scaled set of elements; and

M is a predetermined maximum number of elements.

The intermediate map is then split into a set of N segment maps, each segment map including a different breakpoint. The set of N segment maps thereby comprises the route map.

Another embodiment of the present invention provides a method of simplifying a road in a route map. In the method, the road is approximated as a piecewise linear curve that includes a plurality of shape points. Each shape point in the plurality of shape points is connected by a linear segment to a respective shape point in the plurality of shape points. At least one point at which the road intersects another road in the route map is added to the plurality of shape points as an intersection point. Each shape point in the plurality of shape points that is (i) not a first shape point, (ii) a last shape point, or (iii) an intersection point, is marked. A check is made for false intersections between the road and another road in the route map and, when a false intersection is found, a first marked shape point and a last marked shape point in the plurality of shape points are unmarked. The checking step is repeated until no false intersection is found or there is no marked shape point in the plurality of shape points. When a shape point is marked, the piecewise linear curve is modified by replacing the marked shape point and each said linear segment connected to the marked shape point with a new linear segment that originates at a shape point or intersection point immediately proceeding the marked shape point and ends with a shape point or intersection point immediately succeeding the marked shape point. When a shape point is unmarked, the piecewise linear curve is modified by replacing the new linear segment associated with the shape point with (i) a first linear segment that is bounded by the shape point or intersection point immediately proceeding the marked shape point and the shape point and (ii) a second linear segment that is bounded by the shape point or intersection point succeeding the marked shape point and the shape point. In this way, the piecewise linear curve represents a smoothed road that corresponds to the road in said route map.

BRIEF DESCRIPTION OF THE DRAWINGS

FIG. 3 is a prior art Overview/Detail map.

FIGS. 11A, 11B, and 11C illustrate the conceptual steps used to identify the longest axis of a route and to rotate this axis in a predetermined direction, in accordance with one embodiment of the present invention.

FIGS. 17A and 17B illustrate the use of bounding boxes and FIGS. 18A and 18C illustrate the use of orientation vectors that are present in some constraint definitions in accordance with one embodiment of the present invention.

FIGS. 18A, 18B, 18C, 18D, 18E, and 18F illustrate various layout styles that are present in some constraint definitions in accordance with one embodiment of the present invention.

FIG. 21 illustrates exemplary image components and text boxes used to compose forms, in accordance with one embodiment of the present invention.

FIGS. 40A and 40C illustrate portions of an unscaled route map whereas FIGS. 40B and 40D show corresponding scaled route maps that respectively illustrate how scaling can lead to false intersections and missing intersections.

FIGS. 41A illustrates how a missing intersection is scored and FIG. 41B illustrates how a misplaced intersection is scored in accordance with one embodiment of the present invention.

FIGS. 42A, 42B, and 42C illustrate several false intersection scenarios, showing for each false intersection point which direction the closest endpoint must travel to remove the knot formed by that false intersection point.

FIGS. 47A and 47B illustrate the utility of using extended intersections, in accordance with one embodiment of the present invention.

Like reference numerals refer to corresponding parts throughout the several views of the drawings.

DETAILED DESCRIPTION OF THE INVENTION

The present invention provides a system and method for generating maps that have the benefits and characteristics of a hand-drawn map. Automatically generating route maps in this style is complex. Distorting aspects of the map can accentuate reorientation points, but it can also have detrimental effects such as introducing false intersections. Creating an effective route map generally requires searching a large space of possible map layouts for an optimal layout. An efficient multistage algorithm that couples a road layout refinement module with a label and annotation placement module is disclosed. The resulting map is rendered using subtle perceptual cues, such as a wavy hand-drawn style for drawing the paths, to communicate the distortion of scale and shape.

The design goals of the present invention are:

(i) Roads should be variably scaled so that all roads and reorientation points are clearly visible and easily labeled.

(ii) If road A is longer than road B, then road A should be noticeably longer than road B in the map.

(iii) The representation of a road only needs to convey general curvature and the significant changes in orientation.

(iv) The precise angle of intersection of two roads is not important; instead it is sufficient to communicate clearly the action to be taken (turn left; turn right) and a generalized orientation.

(v) The start and end of the route should be clearly marked.

(vi) A "sketchy" style should be used to render a road in order to represent an imprecision of scale and orientation.

(vii) The resulting map should fit in the desired viewport, such as a single sheet of paper, a computer display screen and/or a window in a graphical user interface.

Figure 5:
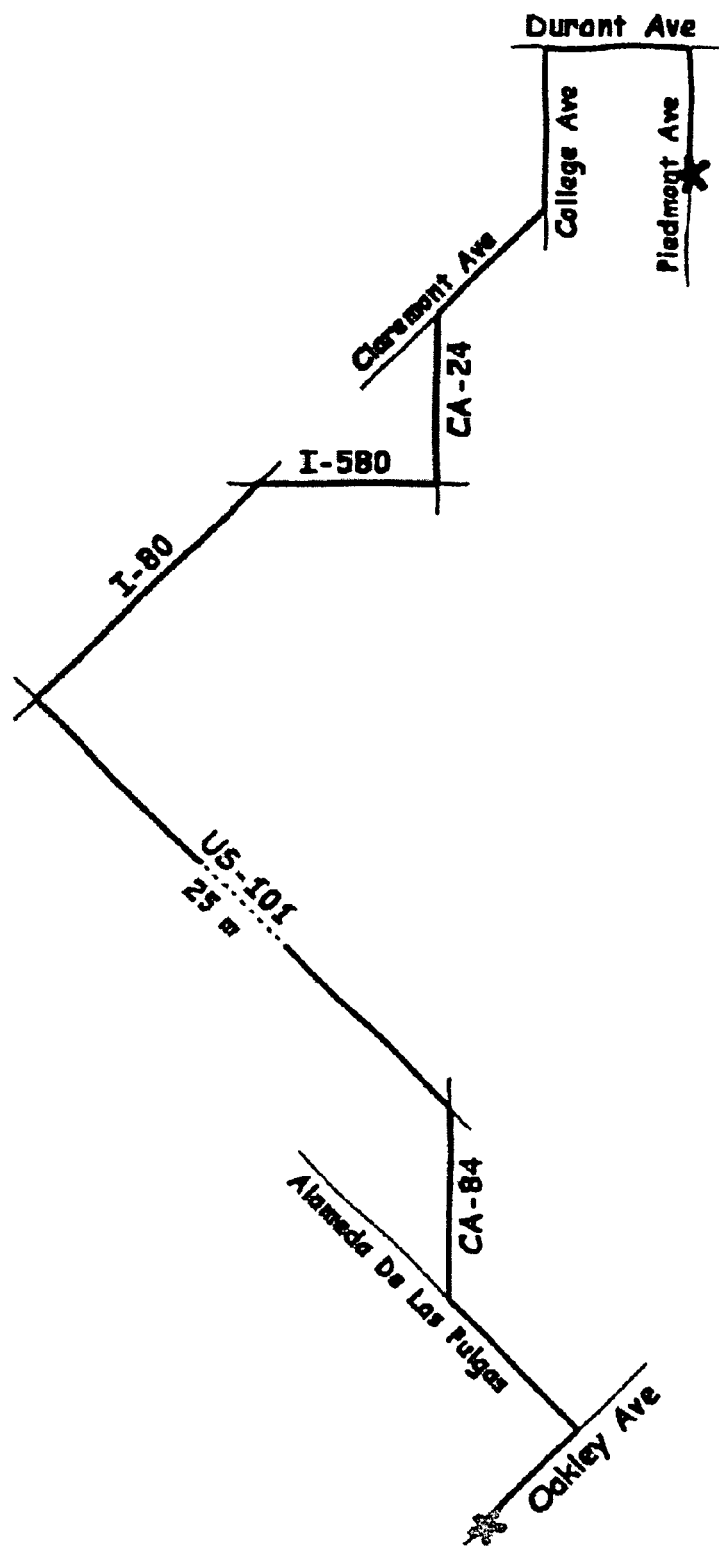
FIG. 5 is a map that is generated in accordance with one embodiment of the present invention.

Generating a computer-based map in accordance with the above identified design goals is more difficult than generating a map in conventional computer-based styles. Variable road scaling provides some flexibility in choosing the length of each road to produce a clear and readable map. However, the relative ordering of roads by length must remain fixed and false intersections should not be introduced into the map. The space of all possible route-map layouts is extremely large, and therefore it is not feasible to blindly search for a layout that satisfies the design goals of the present invention. Rather, a multi-phase heuristic generate-and-test approach is used to obtain a map that satisfies the design principles of the present invention. FIG. 5 illustrates a map generated using the methods of the present invention.

General Architecture

Figure 6:
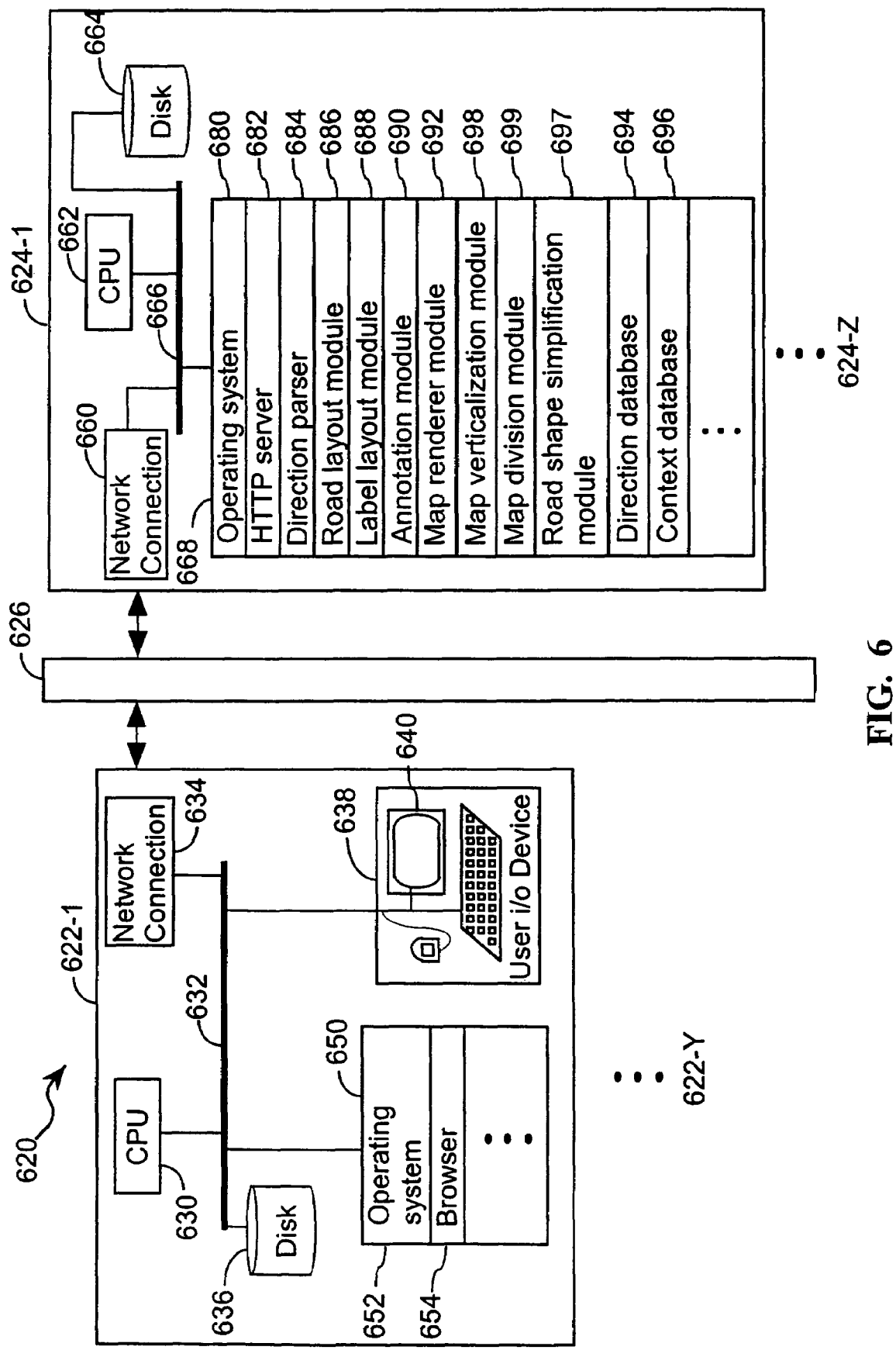
FIG. 6 illustrates a system for generating a route map in accordance with one embodiment of the present invention.

Attention now turns to FIG. 6, which is a system in accordance with one embodiment of the present invention. FIG. 6 illustrates a network 620 that is operated in accordance with the present invention. Network 620 includes at least one user computer 622 and at least one server computer 624. User computer 622 and server computer 624 are connected by transmission channel 626, which may be any wired or wireless transmission channel.

User computer 622 is any device that includes a Central Processing Unit (CPU) 630 connected to a random access memory 650, a network connection 634, and one or more user input/output ("i/o") devices 638 including output means 640. In some embodiments, system memory 650 includes read-only memory (ROM). Output means 640 is any device capable of communicating with a human and includes, for example, a monitor, voice user interfaces, and/or integrated graphic means such as mini-displays present in web-phones. Typically, user computer 622 includes a main non-volatile storage unit 636, preferably a hard disk drive, for storing software and data. Further, user computer 622 includes one or more internal buses 632 for interconnecting the aforementioned elements. In a typical embodiment, memory 650 includes an operating system 652 and an Internet browser 654.

In some embodiments of the present invention, user computer 622 is a hand held device such as a Palm Pilot. Accordingly, in such embodiments, it is possible that user computer 622 does not have disk 636 and browser 654 is integrated seamlessly into operating system 652.

Server computer 624 includes standard server components, including a network connection device 660, a CPU 662, a main non-volatile storage unit 664, and a random access memory 668. Further, server computer 624 includes one or more internal buses 666 for interconnecting the aforementioned elements. Memory 668 stores a set of computer programs, modules and data to implement the processing associated with the invention. In particular, a preferred embodiment of memory 668 includes an operating system 680 and a HTTP server 682. Memory 668 further includes direction parser 684, road layout module 686, label layout module 688, annotation module 690, and map renderer module 692. In some embodiments of the present invention, memory 668 also includes a direction database 694 and/or context database 696. As will be discussed in further detail below, server computer 624 further includes a shape simplification module 697 for smoothing roads in a route map, a map verticalization module 698 for optimizing the dimensions of a scaled route map to the dimensions of the viewport used to display the scaled route map, and a map division module 699 for breaking a complex scaled route map into a plurality of segment maps.

Direction parser 684 reads directions from a source, such as a file, a database external to server 624, or a database resident in server 624. Direction parser 684 translates the directions into a graph. Nodes in the graph represent intersections, and edges represent the roads connecting the intersections. In one embodiment, system 620 does not contain a database of roads. Rather, all the information about the map is obtained from text directions stored offsite. In another embodiment, server 624 contains direction database 694, which is used to identify a suitable route between an origin and a destination.

After directions have been parsed by direction parser 684, roads in the route map are scaled with road layout module 686. In one embodiment, road layout module 686 applies a constant scale factor to the entire map so that the map fits in a viewport having predetermined dimensions. As a result of this uniform scaling, the map often contains many roads that are too small to see or label. To remedy this, each road in the map, beginning with the smaller roads, is scaled by road layout module 686 until roads in the map are clearly visible. Since the length of roads is only increased in this step, the map ends up being larger than the size of the viewport. Thus, in subsequent steps, certain aspects of the map are reduced to yield a map that fits the dimensions of the desired viewport.

In one embodiment of the present invention, the size of the map is reduced by repeatedly initiating a tracing procedure. In this embodiment, road layout module 686 executes the tracing procedure until the entire route is traced without identifying a road that exceeds the dimensions of the viewport. In the tracing procedure, each successive road in the route is examined, beginning at the route origin, until a road extending outside the viewport, i.e. an offending road, is identified. When an offending road is identified, each road that had been traced is examined to see if it is capable of being shortened. A road candidate is capable of being shortened if it is (i) longer than a specified minimum length, (ii) the relative ordering of the roads by length remains fixed even after the candidate has been shortened, and (iii) false intersections are avoided. In one aspect of this embodiment, road layout module 686 shortens road candidates using a greedy approach so that the candidate is shortened as much as possible, in order from longest to shortest, until the offending road is pulled back inside the viewport.

Label layout module 688 is used to place labels on the scaled map produced by road layout module 686. To date, proper labeling of individual roads has been an intractable problem. Label layout module 688 solves this problem by refining a novel target function using a simulated annealing schedule. Simulated annealing has been used to refine label positions in prior art methods. Edmondson et al., Cartographica 33, 1997, 12-23. However, unlike Edmondson, which uses a limited set of discrete label positions, the present invention considers a continuous range of positions for label placement, and label placements are not limited to positions that are directly above or below the road. Furthermore, the present invention uses a more comprehensive target function that considers the number of roads each label intersects, the number of labels each label intersects, the distance the label is from the center of the road associated with the label, and whether the label is above or below the associated road. Finally, the present invention is advantageous because roads are extended when the label corresponding to the road is lengthy.

Figure 10:
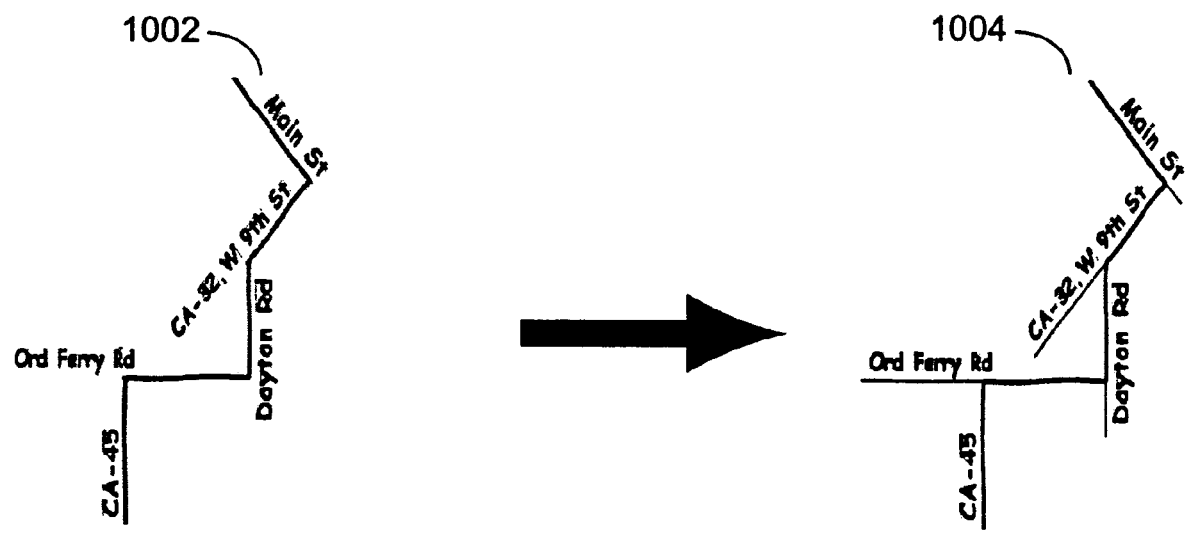
FIG. 10 illustrates a map before and after road extensions are made so that labels are optimally associated with corresponding roads.

Annotation module 690 adds decorations, such as road extensions, to the route map of the present invention. Further, module 690 adds an icon for route start and end points. Road extensions accentuate reorientation points, and allow for a larger range of label positions to be considered. In this phase, all roads are extended by a small fixed amount. Then only those roads that need to be extended for the chosen labeling pattern are further lengthened. FIG. 10 illustrates the advantages of applying road extensions. In FIG. 10, 1002 represents a road map prior to road extension whereas 1004 represents the same road map after road extension. Labels now fit the corresponding roads and the map is easier to read. Geographic and/or commercial context information are added to the route map by annotation module 690 to help guide the user through the desired route. In one embodiment, such context information is obtained from context database 696.

Map renderer module 692 renders the scaled route map. In this phase, a "sketchy" pen-and-ink style is applied to each road in the route map. That is, instead of drawing roads as straight lines, variation is introduced in the bend and width of each road to generate a hand-drawn look. In an approach similar to that of Markosian et al., SIGGRAPH 97 Conference Proceedings, 1997, 415-420, each road is broken into small segments and the position of each point is slightly shifted both normal and tangent to the segment direction. These points are then joined with a non-uniform rational b-spline (NURB) to create the final stroke. A NURB is a curve that interpolates data. Thus, given a set of points, a curve is generated passing through all the points. The thickness of the roads is then adjusted to emphasize the route and de-emphasize road extensions generated by annotation module 690.

Now that an overview of one embodiment of the invention has been disclosed, a number of advantages of the present inventions are apparent. First, the present invention discloses a method for automatically generating a route map that has the clarity of a hand-drawn map. Such a map is produced by using a novel scaling function in which each road is scaled individually using the design criteria of the present invention. Further, a novel method for positioning labels on the map is disclosed. The refined label positions help provide a route map having improved clarity.

Map Scaling

Attention now turns to detailed embodiments of road layout module 686. The present invention contemplates several different implementations of road layout module 686. The different road layout module embodiments contemplated by the present invention include but are not limited to uniform scaling, fixed non-uniform scaling, as well as refinement of individual scale factors using a greedy search or simulated annealing schedule.

In uniform scaling embodiments, a single scale factor that allows the graph created by direction parser 684 to fit in a desired viewport is computed. For viewports that are defined as an x by y pixel array, a single scale factor, pixelsPerMile, is computed by an assignment such as:

pixelsPerMile=ComputePixelsPerMile( );

in which the function ComputePixelsPerMile( ) determines the maximum number of pixels a mile of the route may have without causing the overall route to exceed the desired pixel-based viewport. One of skill in the art will appreciate that a single scale factor for viewports that are based on metrics other than pixels can be computed using functions analogous to ComputePixelsPerMile( ). Once a uniform scale factor has been identified by a function such as ComputePixelsPerMile( ), the uniform scale factor is applied to the length of each road, and intersection points between consecutive pairs of roads are updated to reflect the change in length of the roads. For pixel-based viewports, the application of the uniform scale factor to each road reduces to a conversion of miles to pixels. Thus, in such embodiments, the application of the constant scale factor to each road takes the form

```
(101) for each Road r {
(102)     r.lengthPxls = r.lengthMiles*pixelsPerMile;
(103) }
(104) SetRoadIntersectionPts( );
```

In fixed non-uniform scaling embodiments, road layout module 686 includes a rescaleByBucket( ) function that breaks the range of road lengths (0, infinity) found in the route into N consecutive buckets $[0, x_{-1}), [x_1, x_2), \ldots [x_{N-1}, x_N), [x_N, \text{infinity})$. The function then scales the roads differently depending on which bucket they fall in. Small roads, those in the earlier buckets, are scaled to be longer, while longer roads are scaled to be shorter. In one embodiment, roads falling in the final bucket are capped at some maximum length. In another embodiment, roads falling in the first bucket are not allowed to fall below a minimum length. In yet another embodiment, the scale factor that is chosen for each bucket is subject to the constraint that the relative ordering of the roads by length remains fixed. In embodiments in which the route is to be scaled to a pixel-based viewport, each road is scaled by the uniform scale factor computed by the ComputePixelsPerMile( ) function described in the uniform scaling embodiment. Thus, one implementation in accordance with the non-uniform scaling embodiment, has the steps:

```
(201) LayoutRoads( )
(202) {
(203) for each Road r {
(204)     r.lengthMiles = rescaleByBucket(r.lengthMiles- );
(205)     r.lengthPxls = r.lengthMiles*pixelsPerMile;
(206)     }
(207)     SetRoadIntersectionPts( );
(208) }
```

Figure 7:
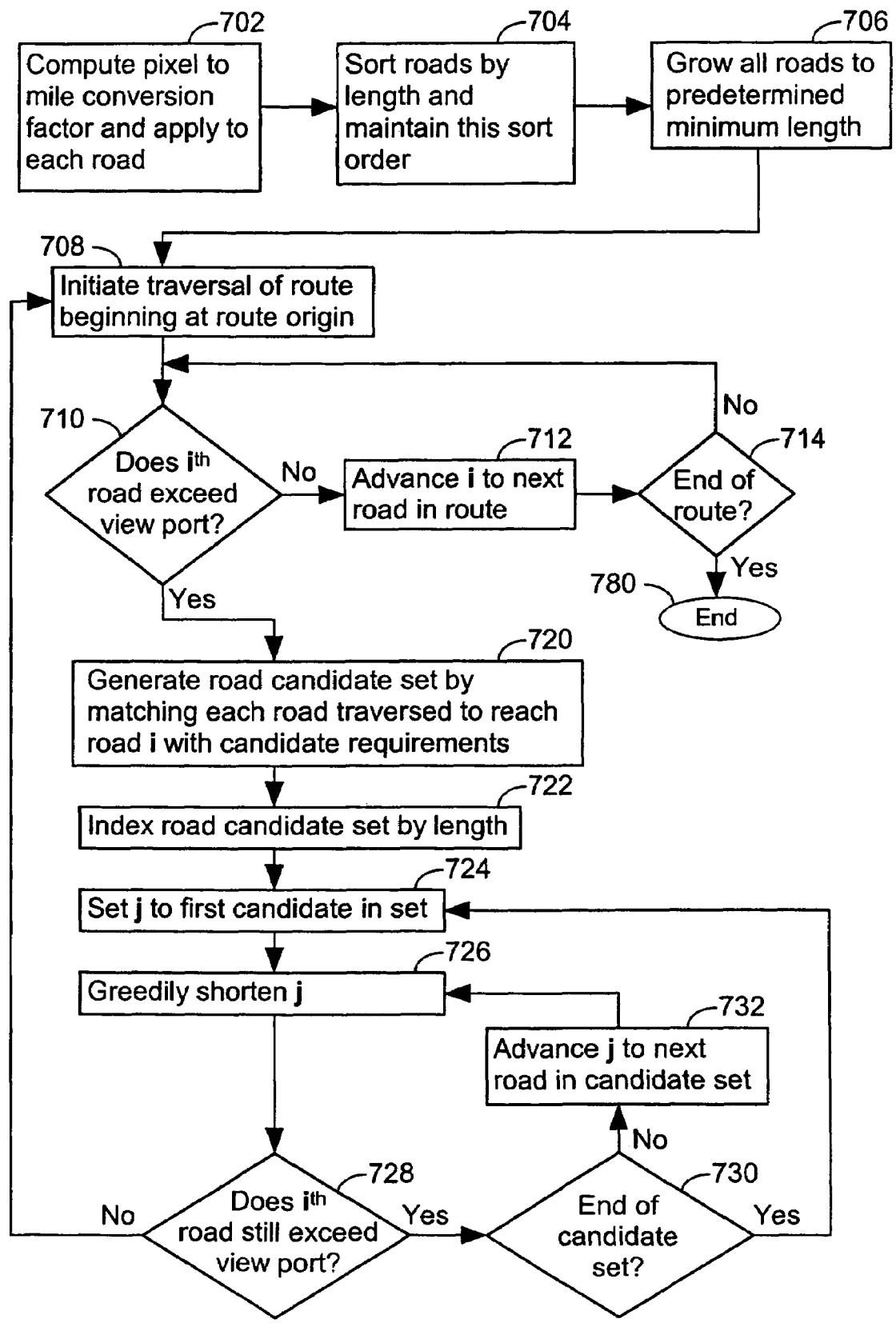
FIG. 7 illustrates the processing steps used to optimize the length of individual roads in a route map using a greedy algorithm, in accordance with one embodiment of the present invention.

Attention now turns to FIG. 7 which illustrates an embodiment of the present invention in which road layout module 686 refines the length of roads in the map using a greedy search algorithm. In processing step 702, road layout module 686 first computes a pixel to mile conversion factor and applies this factor to each road in the map so that the map fits into the desired viewport. Then, in processing step 704, the roads are sorted by length. The relative order of the roads, in terms of length, in the map as determined in processing step 704 is maintained throughout the remainder of the processing steps illustrated in FIG. 7. In some embodiments deviations in this relative ordering is allowed upon payment of a penalty. In processing step 706, all small roads are grown until each road is longer than a set minimum length. Because processing step 706 only lengthens roads, the route map is not likely to fit in the desired viewport after processing step 706 has been executed To reduce the map so that it fits into the desired viewport, a search for roads that can be shortened is performed. In processing step 708, the route is traversed from the route origin. Each route in the road is examined (710-714) until a road that extends outside the viewport (offending road) is identified. When such a road is identified (710-yes), a list of candidate roads in the portion of the route that had been traversed prior to identifying the offending road is collected (720). To qualify as a candidate road, a traversed road must be capable of being shortened without changing the relative ordering of the roads by length and without falling below a minimum road length. Further, a candidate road must be capable of being shortened without creating any false intersections between roads. Finally, the candidate road should be oriented within .+-.90 degrees of the offending road. Once a road candidate set has been generated, it is ordered by length, from longest to shortest (722).

Once the candidate roads have been ordered, a shortening process is initiated. The shortening process takes advantage of the computational efficiency of a greedy algorithm to shorten the roads (724). The shortening process cycles through each candidate road in the ordered set of candidate roads and shortens the candidate as much as possible (726) before advancing to the next candidate in the ordered set (732). After the greedy algorithm is applied to a candidate road, a check is made to see if the offending road has been pulled back inside the viewport (728). If the offending road has been pulled back into the viewport (728-no), the shortening process ends and control returns to processing step 708.

When the greedy algorithm has been applied to each candidate road in the ordered set without successfully pulling the offending road into the viewport (730-yes), the shortening process repeats the process of applying the greedy algorithm to each road in the candidate list (724) until the offending road is pulled back into the viewport (728-no). The process in FIG. 7 continues until the complete route can be traversed without identifying a road that exceeds the dimensions of the viewport (714-yes, 780). If such a traversal fails, the shortening process of steps 720-732 is executed and a new attempt to traverse the route is initiated 708.

At times, an identified road that matches the candidate requirements indicated above will not be added to the road candidate set because there is some other road in the route that is the same length. Roads that have the same length as the identified road are termed blocking roads. If there is a blocking road, the identified road cannot be added to the road candidate set because, if it were shortened, the relative ordering of roads by length, as identified in processing step 704, would be destroyed. The occurrence of blocking roads is of interest because, in some circumstances, they prevent the processing steps of 724-732 from pulling the offending road into the viewport (728-no). In some embodiments, when a certain number of iterations of processing steps 724 through 732 fail to effect a solution (728-no) one or more of the blocking roads are shortened using the greedy algorithm discussed previously. Then, if the offending road still exceeds the dimensions of the viewport, a new road candidate set is generated (720) and processing steps 724 through 732 are executed until the offending road no longer exceeds the dimensions of the viewport (728-no).

Figure 8:
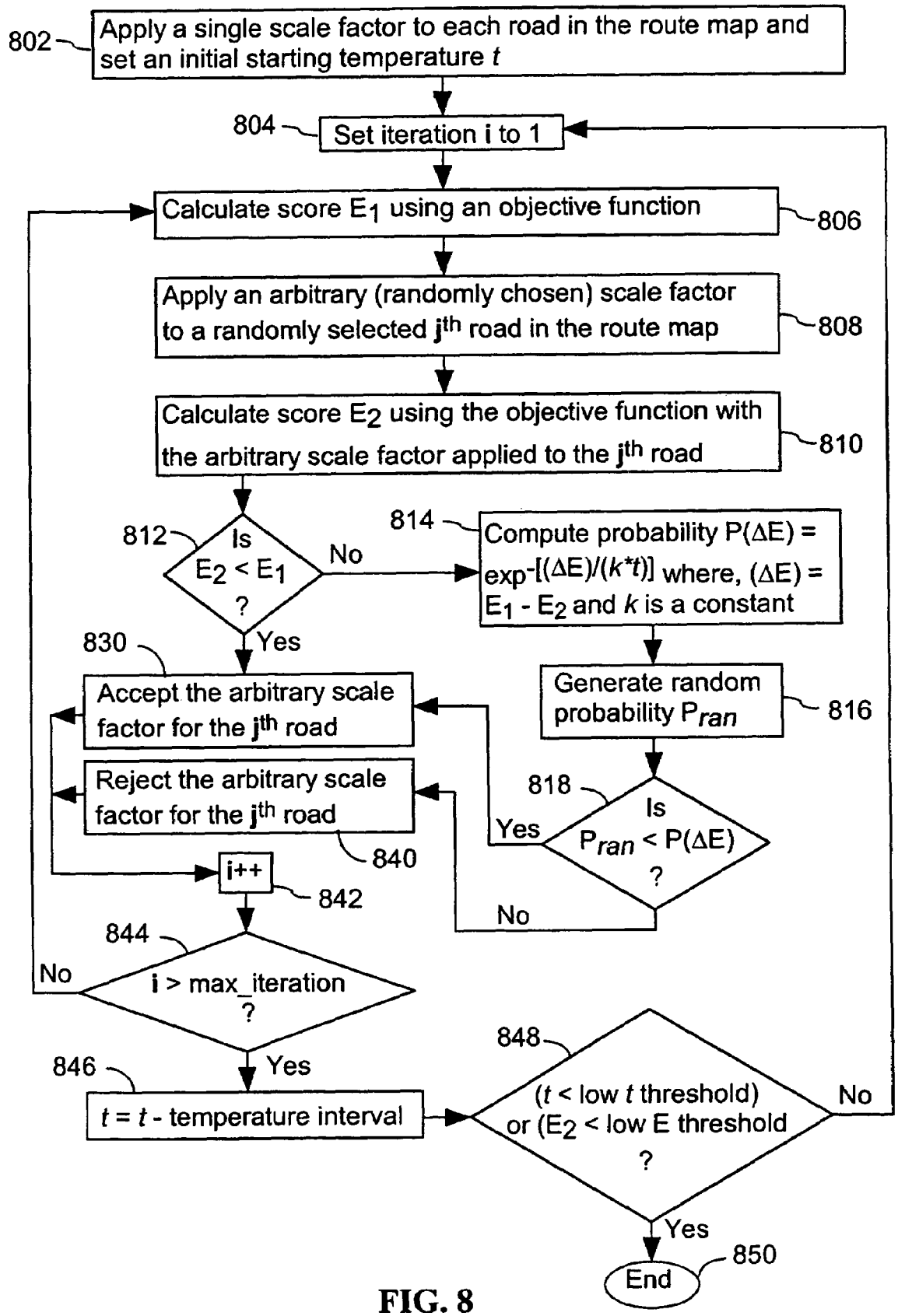
FIG. 8 illustrates the processing steps used to optimize the length of individual roads in a route map using a simulated annealing schedule, in accordance with one embodiment of the present invention.

FIG. 8 illustrates another embodiment of road layout module 686 in which the length of roads in the map are refined with a simulated annealing schedule. In processing step 802, a single scale factor is applied to each road in the route map.

In one embodiment, which is in accordance with this aspect of the invention, the scale factor is used to size the map produced by direction parser 684 so that it fits within the dimensions of the desired viewport. In another embodiment, the map is sized so that each road in the map is longer than a selected minimum length so that each road in the map is legible in the desired viewport.

In the second phase of processing step 802, an initial parameter t is chosen. The use of a parameter t to obtain better heuristic solutions to a combinatorial optimization problem has it roots in the work of Kirkpatrick et al., Science 220, 4598, (1983). Kirkpatrick et al. noted the methods used to find the low-energy state of a material, in which a single crystal of the material is first melted by raising the temperature of the material. Then, the temperature of the material is slowly lowered in the vicinity of the freezing point of the material. In this way, the true low-energy state of the material, rather than some high energy-state such as a glass, is determined. Kirkpatrick et al. noted that the methods for finding the low-energy state of a material can be applied to other combinatorial optimization problems if a proper analogy to temperature as well as an appropriate probablistic function, which is driven by the this analogy to temperature, can be developed. The art has termed the analogy to temperature an effective temperature. Therefore, parameter t will henceforth be termed an effective temperature. It will be appreciated that any effective temperature t may be chosen in processing step 802. One of skill in the art will further appreciate that the refinement of an objective function using simulated annealing is most effective when high effective temperatures are chosen. There is no requirement that the effective temperature adhere to any physical dimension such as degrees Celcius, etc. Indeed, the dimensions of the effective temperature t used in the simulated annealing schedule adopts the same units as the objective function that is the subject of the optimization.

In one embodiment, a starting effective temperature that is readily reduced by ten percent on a periodic basis is chosen, such as 1.0/log(3)*3. In another embodiment, the starting value of t is based on a function of one or more of the characteristics of the route to be scaled, such as the number of roads in the route, the number of intersections in the route, and/or the length of the route. In another embodiment, the starting value of t is selected based on the amount of resources available to compute the simulated annealing schedule. For example, the starting value of t is reduced below a pre-specified default value when the annealing schedule is to be run on a server that is currently refining several other routes or on a relatively slower client. In still another embodiment, the starting value of t is related to the form of the probability function used in processing step 814. It has been found, in fact, that the effective temperature does not have to be very large to produce a substantial probability of keeping a worse score. Therefore, in some embodiments, starting effective temperature t is not large.

Once a single scale factor has been applied to each road in the route map and an initial starting effective temperature has been assigned, an iterative process begins. A counter is initialized in processing step 804 and, in processing step 806, the quality of the map ($E_1$) is assessed using an objective function. It will be appreciated that the utility of the map produced by the simulated annealing schedule is dependent upon the development of an objective function that accurately balances the various features of the map that need to be optimized. In one embodiment, the objective function is dependent upon the number of false intersections each road in the route makes, the number of roads in the route that no longer have the same relative length that they had before the simulated annealing schedule was initiated, and the number of roads that fall below a minimum length. An objective function in accordance with this embodiment is:

$$E = [_{i=1}\Sigma^N w_1 * \text{false\_intersection}_i + [w_2 * \text{Num\_w/o\_rel}_{\_len}] + [w_3 * \text{num\_short\_roads}]$$

where,
- $w_1$, $w_2$ and $w_3$ are independently selected weights;
- false_intersection, is the number of false intersections road i makes;
- N is the number of roads in the route;
- num_w/o_rel_len is the number of roads that no longer have the same relative length that they had before simulated annealing schedule was initiated; and
- num_short_roads is the number of roads that are shorter than a minimum length threshold.

After the quality ($E_1$) of the map has been measured using the objective function, a scale factor is randomly generated and applied to a randomly selected road (808). In one embodiment, the scale factor is randomly chosen from a permissible range, such as zero to two. Thus, in such an embodiment, a random number generator is used to identify a number in the range zero to two, such as "0.6893." The random number is then applied to a randomly selected road in the route as a scale constant. For example, if the number is "0.6893" and the randomly selected road is the $j^{th}$ road in the route map, the $j^{th}$ road is shortened by 31.07 percent. In another embodiment, the permissible range for the random number is −0.1 to 0.1 and therefore, in such embodiments, application of the randomly chosen scale constant is capable of altering the length of the $j^{th}$ road by no more than ten percent.

After the length of the $j^{th}$ road has been adjusted by the scale factor, the quality of the map ($E_2$) is calculated using the same objective function used in processing step 806 (810). When the quality of the map has improved ($E_2 < E_1$) (812-yes), then the change made to the length of the $j^{th}$ road is accepted (830). When the quality of the map has not improved ($E_2 > E_1$) (812-no) the change made to the length of the $j^{th}$ road is accepted with the probability:

$$1 - \exp^{-[(\Delta E)/k*t)]} \quad (1)$$

From the form of equation (1), it will be appreciated that the probability that the change is accepted, when ($E_2 > E_1$), is lower at lower effective temperatures t. Equation (1) is implemented as processing steps 814 through 818 in FIG. 8. In processing step 814, $\exp^{-[(\Delta E)/k*t)]}$ is computed. In processing step 816, a number $P_{ran}$ in the interval 0 to 1 is generated. If $P_{ran}$ is less than $\exp^{-[(\Delta E)/k*t)]}$ (818-yes), the change made to the $j^{th}$ road in processing step 808 is accepted (830). If $P_{ran}$ is more than $\exp^{-[(\Delta E)/k*t)]}$ (818-no), the change made to the $j^{th}$ road in processing step 808 is rejected (840). It will be appreciated that probability functions other than that disclosed in equation (1) are within the scope of the present invention.

Acceptance of conditions ($E_2 > E_1$) on a limited probabilistic basis is advantageous because it provides the refinement system with the capability of escaping local minima traps that do not represent a global solution to the objective function. One of skill in the art will appreciate, therefore, that probability functions other than that of equation (1) will advance the goals of the present invention. Representative probability functions include, for example, functions that are linearly or logarithmically dependent upon effective temperature, rather than exponentially dependent on effective temperature as described in equation (1).

Processing steps 806 through 840 represent one iteration in the refinement process. In processing step 842 an iteration count is advanced. When the iteration count does not exceed the maximum iteration count, the process continues at step 806 (844-no). When the iteration count equals a maximum iteration flag (844-yes), effective temperature t is reduced (846). One of skill in the art will appreciate that there are many different types of schedules that are used to reduce effective temperature t in various embodiments of processing step 846. All such schedules are within the scope of the present invention. In one embodiment, effective temperature t is reduced by ten percent. In another embodiment, effective temperature t is reduced by a constant value. For example, the starting effective temperature set in processing step 802 could be 20,000 and this effective temperature could be reduced by 300 each time processing step 846 is executed. In another embodiment the percentage decrease in effective temperature in processing step 846 is calculated as a function of the number of roads to be scaled.

When the effective temperature has been reduced by an amount in processing step 846, a check is performed to determine whether the simulated annealing schedule should be terminated (848). In the embodiment illustrated in FIG. 8, the process is terminated (848-yes, 850) when effective temperature t has fallen below a low effective temperature threshold or $E_2$ falls below a predetermined low quality threshold. The low effective temperature threshold is any suitably chosen effective temperature that allows for a sufficient number of iterations of the refinement cycle at relatively low effective temperatures. When it is determined that the annealing schedule should not end (848-no), the process continues at step 804 with the reinitialization of iteration count i.

In another embodiment of the present invention, a distinctly different exit condition than the one illustrated in FIG. 8 is used. In this alternative embodiment, a separate counter is maintained. This counter, which could be termed a stage counter, is incremented each time t is reduced in step 846. When the stage counter has exceeded a predetermined value, such as fifty, the simulating annealing process ends (850). In yet another embodiment, a counter tracks a consecutive number of times the arbitrary scale factor is rejected (840). When a set number of arbitrary changes in a row have been rejected, the route map is considered optimized and the process ends (850).

Map Annotation

In one embodiment, annotation module 690 is used to deterministically place context information on the map after the map has been scaled by road layout module 686. In one aspect of this embodiment, the context information represents points of geographical interest and helps to guide the user through the route to the destination. In another embodiment, the context information represents a form of advertisement that is paid for by subscribers. In one example in accordance with such embodiments, the subscriber is a fast food chain and the landmarks represent the location of each fast food franchise that is associated with the fast food chain. It will be appreciated that an important advantage of the present invention is that the route maps do not contain superfluous content. Thus, the route maps of the present invention are particularly well suited for use in conjunction with geographical landmarks that are paid for by subscribers. In one embodiment of the present invention, memory 668 of server 624 includes a context database 696 that is populated with context information that has been provided by and paid for by advertisers.

Label Refinement

Identification of an optimal position for each label in the route map improves the quality of the map because clutter and object overlap is reduced. The present invention optimizes label position by minimizing a novel target function that scores the position of a label using a unique set of label parameters. Importantly, rather than considering a small number of discrete positions for label placement, a continuous range of positions within a region around the center of the road being labeled are considered. This region includes positions that are not directly above or below the road being labeled. When a position that is not directly above or below the road is selected, the road is extended to the position of the label.

Figure 9:
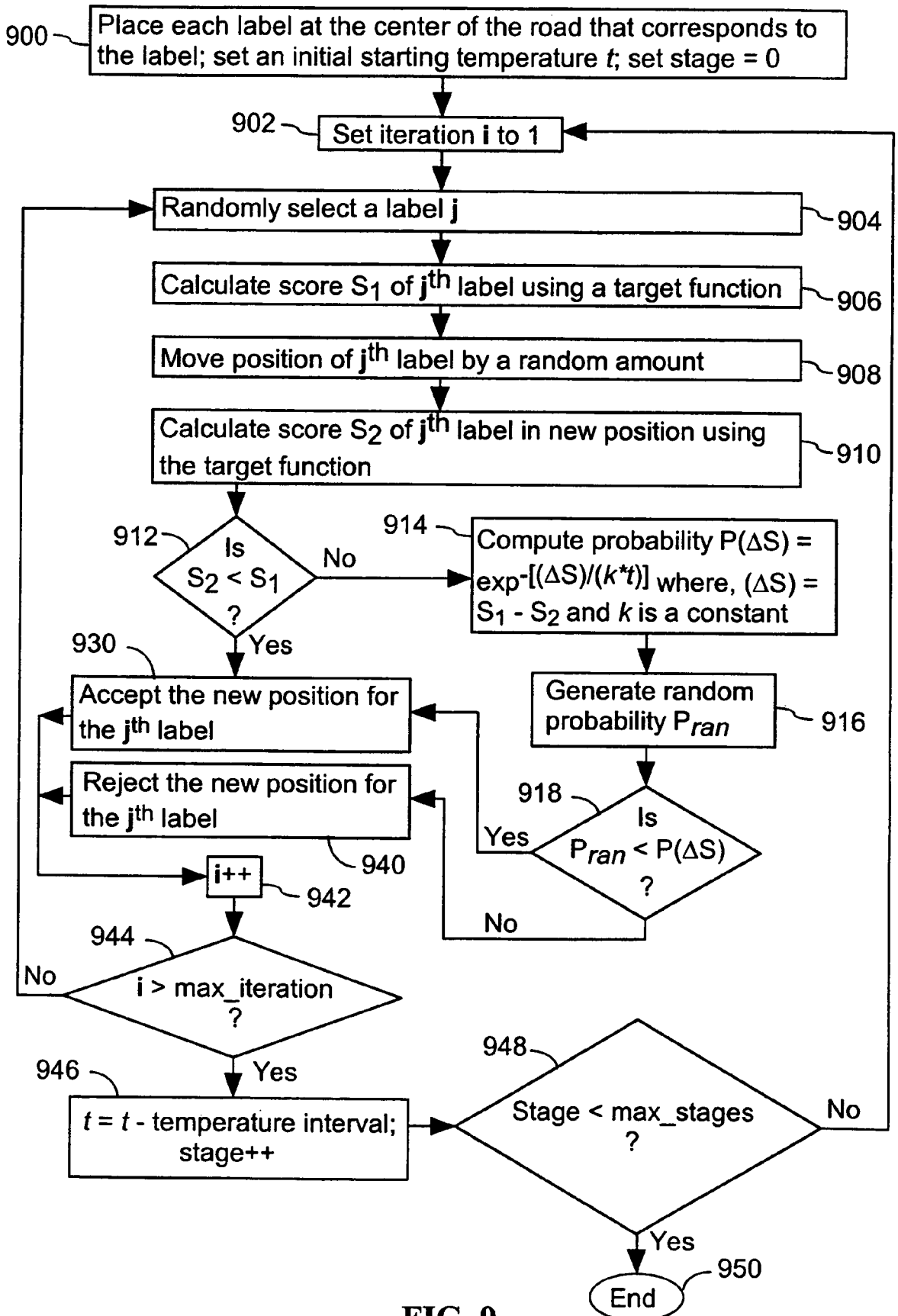
FIG. 9 illustrates the processing steps used to optimize label positions in a route map using a simulated annealing schedule, in accordance with one embodiment of the present invention.

In one embodiment, the target function is optimized using a simulated annealing schedule. FIG. 9 illustrates one embodiment in accordance with the present invention. In processing step 900, each label is placed at the center of the road corresponding to the label and an initial effective temperature t is selected. It will be appreciated that effective temperature it may be set to wide range of possible effective temperatures in processing step 900. In one embodiment, a starting effective temperature that is readily reduced by ten percent on a periodic basis, such as 1.0/log(3)*3, is chosen. In another embodiment, the starting effective temperature is based on a function of one or more of the characteristics of the route to be optimized, such as the number of labels in the route, the amount of context information along the route, and/or the length of the route. In another embodiment, the starting effective temperature is selected based on the amount of resources available to perform the simulated annealing calculations. For example, the initial effective temperature is set to a low value when the annealing schedule is to be run on a server that is currently refining several other routes or a client with a relatively slow central processing unit. In still another embodiment, the starting effective temperature t is determined by the nature of the probability function that is used to accept scores having $S_2 > S_1$.

In processing step 902 the stage counter is set to zero. The stage counter is incremented each time effective temperature t has been reduced. Once the initialization steps of processing step 900 have been performed, counter i is set to one (902) and a label j is randomly selected (904). The quality of the position of the $j^{th}$ label ($S_1$) is measured using a target function, which is designed to measure label position quality, in processing step 906 and in processing step 908 the $j^{th}$ label is repositioned by a random amount. In step 908, the quality of the repositioned $j^{th}$ label ($S_2$) is measured. An important advantage of the present invention is that the $j^{th}$ label is repositioned into any of a continuous range of values rather than a limited number of discrete positions. Further the target function used to compute $S_1$ and $S_2$ provides an improved method for assessing the quality of a label position. In one embodiment the target function includes the following components:

---
(301) collect all objects that intersect the $j^{th}$ label
(302) for each intersecting object {
(303)       case ROAD:
(304)           score += ROAD_PENALTY;
(305)       case LABEL:
(306)           score += LABEL_PENALTY;
(307)       case ANNOTATION:
(308)           score += ANNOTATION_PENALTY; }
---

In line 301, all the objects that intersect the $j^{th}$ label are collected. Such objects include, for example, roads, other labels, and annotations such as context information. The target function loops through each of the collected objects (line 302). When the object is a road, a road penalty is added to the score (line 304), when the object is a label, a label penalty is added to the score (line 306) and when the object is an annotation, an annotation penalty is added to the score (line 308).

In some embodiments, the target function includes one or more additional components. One such component is an off screen penalty. When the $j^{th}$ label is positioned such that a portion of the label exceeds the boundary of the viewport, an off screen penalty is added to the score. Another component is a "distance from the center of the corresponding road penalty." This penalty is determined by taking the product of a centering penalty and the normalized distance of the $j^{th}$ label from the road center. Additional components in the target function represent various constraints that are imposed on the label position. Constraints are used to bias label positions that are consistent with label position design criteria. For example, in one embodiment, it is preferable to position a label above the road rather than below the road. Thus, a below_the_road constraint penalty is added to the score of a label position that is below the road corresponding to the label. Another constraint penalty asks whether a road should be extended so that the road runs alongside the label. When it is determined that a road extension will provide better label to road correspondence, a road extension penalty is added to the target function score. Yet another constraint penalty is used when the label is positioned far away from the center of the corresponding road. In such cases, an arrow is positioned on the map to indicate the relationship between the label and the corresponding road and an arrow penalty is added to the target function.

In one embodiment, the target function has the form:

---
(401) float score = 0.0;
(402) // Get all the objects that intersect the label
(403) for each object {
(404)       case ROAD:
(405)           score += ROAD_PENALTY;
(406)       case LABEL:
(407)           score += LABEL_PENALTY;
(408)       case ANNOTATION:
(409)           score += ANNOTATION_PENALTY;
(410) }
(411) // Is label completely visible on viewport?
(412) if not {
(413)       score += OFF_SCREEN_PENALTY;
(414) }
(415) score += normalized distance from road center* CENTERING_PENALTY;
(416) score += constraint penalty;
(417) return score;
---

When the quality of the $j^{th}$ position has improved ($S_2 < S_1$) (912-yes), the new label position for the $j^{th}$ label is accepted (930). When the quality of the map has not improved ($S_2 > S_1$) (912-no) there is a probability $$1 - \exp^{-[(\Delta S)/k*t]} \quad (2)$$

that the new label position for the $j^{th}$ label will be accepted. From the form of equation (2), it will be appreciated that, for cases in which ($S_2 > S_1$), the probability that the change in label position will be accepted diminishes as effective temperature t is reduced. Equation (2) is implemented as processing steps 914 through 918 in FIG. 9. In processing step 914, $\exp^{-[(\Delta S)/k*t]}$ is computed. In processing step 916, a number $P_{ran}$, in the interval 0 to 1, is generated. If $P_{ran}$ is less than $\exp^{-[(\Delta S)/k*t]}$ (918-yes), the change made to the $j^{th}$ label position in processing step 908 is accepted (930). If $P_{ran}$ is more than $\exp^{-[(\Delta S)/k*t]}$ (918-no), the change made to the $j^{th}$ label position in processing step 908 is rejected (940). It will be appreciated that probability functions other than the function shown in equation (2) and processing step 914 are within the scope of the present invention. Indeed, any probability function that is dependent upon effective temperature is suitable.

Processing steps 904 through 940 represent one iteration in the annealing process. In processing step 942, an iteration count is advanced. When the iteration count does not exceed the maximum iteration count (944-no), the process continues at step 904. When the iteration count equals a maximum iteration flag (944-yes), effective temperature t is reduced and the stage counter is advanced (946). One of skill in the art will appreciate that there are many possible different types of schedules that are used to reduce effective temperature t in various implementations of processing step 946. All such schedules are within the scope of the present invention. In one embodiment, effective temperature t is reduced by ten percent each time processing step 946 is executed. In another embodiment the percentage decrease in effective temperature t in processing step 946 is calculated as a function of the number of labels to be scaled. After processing step 946, a check is performed to determine whether the simulated annealing schedule should be terminated (948). When it is determined that the annealing schedule should not end (948-no), the process continues at step 902 with the re-initialization of iteration count i.

In the embodiment illustrated in FIG. 9, the process is terminated (948-yes, 950) when a maximum number of stages has been executed. In one embodiment, the maximum number of stages executed is fifty. In embodiments other than that illustrated in FIG. 9, criteria other than the stage count is used in processing step 948 to determine when the simulated annealing process should be terminated. Such criteria include terminating the process when effective temperature t has fallen below a low effective temperature threshold, when $E_2$ or $E_1$ falls below a predetermined low quality threshold, or when the consecutive number of times the new label position has been rejected exceeds a threshold value.

Map Rendering

The final phase of the process is the rendering of the route by map renderer module 692. In this phase, the route map is humanized. In some embodiments, techniques used to humanize the map include casting the roads in a "sketchy" pen-and-ink style, adding a breakage symbol to long roads that have been significantly scaled down by road layout module 686, providing an indication of road length for long roads in the route, adding an arrow to indicate which way is North, and/or adding insets that show enhanced route detail.

Map renderer module 692 produces the "sketchy" style by breaking each road into small segments and slightly shifting the position of each segment both normal to the stroke direction and along the stroke directions. The rotated segments are then joined with a NURB to create the final stroke. Further, the thickness of the roads is adjusted to emphasize the route and de-emphasize route extensions. In a preferred embodiment, a hand-drawn font is used for the labels.

Overview of Alternative Embodiments for Abstracting and Visualizing Route Maps

Embodiments for producing scaled route maps have now been described in detail. In the following sections, details of alternative embodiments for scaling route maps are provided. Full appreciation of these alternative embodiments is best obtained by first providing an overview of the basic processing steps performed by these alternative embodiments.

Obtain route directions. First, directions are obtained by direction parser 684 from a source such as direction database 694 (FIG. 6). Although direction database is depicted as being on the same server 624 as direction parser 684, it will be appreciated that there is no requirement that direction database 694 reside on the same server. Indeed, direction database 694 may take several different forms and reside at any address that is in communication with transmission channel 626.

Road simplification. Once road directions are obtained, an initial route map is constructed. Then, as will be described in further detail below, a pass is made by road shape simplification module 697 at simplifying the initial route map. If successful, road shape simplification module 697 removes one or more shape points from some of the roads in the route map, thereby reducing the complexity of the route map without sacrificing map legibility and utility. Furthermore, the reduced complexity of a simplified route map facilitates computationally intensive map refinement and scaling that arises in subsequent processing stages.

Map page design. In the map page design stage, the dimensions of the viewport that the map will be displayed in or printed onto are considered. A layout template is chosen by road layout module 686 based on the dimensions of the viewport. Furthermore, the route map is optionally rotated by map verticalization module 698 in order to optimize the dimensions of the route map to the dimensions of the viewport. When the route map includes several steps, map division module 699 is invoked in order to break the route map into a plurality of segment maps in a manner that is consistent with the selected layout template.

Road layout. At this stage, road layout module 686 scales each road independently (i.e. nonuniformly). The nonuniform scaling is driven by an optimization algorithm such as simulated annealing in order to achieve a suitable scaled map. The target function used by the optimization algorithm utilizes a novel scoring strategy that is designed to quantify map scale quality.

Label layout. Once the map has been scaled, the route map is populated with road labels by label layout module 688. Each label is associated with a constraint definition that defines the boundaries in which the label may be placed and the format of the label. Using these constraint definitions, label layout module 688 refines the label locations using an optimization algorithm having a target function that quantifies label position quality.

Map Annotation. Cross streets, land marks and an optional North arrow are added to the map during the map annotation stage. Annotation module 690 identifies suitable landmarks that will assist the navigator while using the route map. Such landmarks may be derived from a source such as context database 696. It will be appreciated that annotation module 690 can be used in some embodiments for commercial benefit. For example, licensing schemes are envisioned in which a retailer pays to have the location of each franchise positioned on the map as landmarks.

Map rendering. Other stages of the map scaling process considered the route map in an abstract sense. In the map rendering stage, the components of the route map, including the main route, cross streets, landmarks, and the North arrow are reduced from an abstract sense to an actual image. In one embodiment, this image is a pixel based image. The stage of the process is performed by map renderer module 692.

Now that an overview of this series of alternative embodiments have been provided, novel aspects of the series of embodiments will be examined in detail.

Alternative Scoring Functions Used in Road Layout Refinement

As outlined in the overview, an important aspect of the map scaling process is performed by road layout module 686. Road layout module 686 scales each road in a route map in a nonuniform manner. In embodiments in which road layout module 686 includes a simulated annealing schedule the following steps are performed:

1. Generate an initial road layout by growing all short roads to a desired minimum length.
2. Obtain an initial score E for the initial road layout using an objective function and set an initial effective temperature.
3. While E is greater than an acceptable score, the number of iterations is less than the maximum allowed iterations, and the effective temperature is above some lower threshold level, repeat steps four to eight.
4. Choose a random road and grow or shrink it by a random amount; re-scale all roads so they fit inside the viewport.
5. Obtain a new score E for the new road layout generated in step four.
6. If new score E is less than initial score E, accept the new road layout generated in step four.
7. If new score E is greater than initial score E, accept the new road layout in accordance with some decreasing probability, in order to escape local minima.
8. Adjust effective temperature.

It will be appreciated that the simulated annealing protocol outlined above and described in detail in FIG. 8 is not limited to any specific scoring function. Indeed, various embodiments of road layout module 686 use a wide array of scoring functions to determine the initial score $E_1$ (806 FIG. 8) as well as new scores $E_2$ (810 FIG. 8). Applicants have described an objective function in accordance with one embodiment of road layout module 686 that is determined by (i) the number of false intersections made be each road i in a route map, (ii) the number of roads that no longer have the same relative length that they had before simulated annealing schedule was initiated, and (iii) the number of roads that are shorter than a minimum length threshold.

In another embodiment of road layout module 686, processing steps 806 and 810 in FIG. 8 use a scoring function represented by the following representative code.

(501) Score( )
(502) Score=0.0;
(503) Score+=IntersectionScore( )
(504) Score+=ShuffleScore( )
(505) Score+=RoadLengthScore( )
(506) Score+=RatioScore( )
(507) Score+=EndPointDirectionScore( )
(508) Score+=EndPointDistanceScore( )

Each subscore considers a specific aspect of the road layout, and are prioritized as follows:

Highest Priority

Intersections: maintaining existing intersections and not introducing false intersections.
Road length: scaling all roads to be readable.
Shuffles: maintaining relative lengths of the roads.
End Point Direction: maintaining overall orientation of route.
Ratios: maintaining ratios in lengths between roads.

Lowest Priority

End Point Distance: maintaining distance between start and destination points of the route.

In this embodiment, the scoring function used by road layout module 686 assigns higher priority to the aspects of the road layout that are most important to resolve. For example, a map with missing and/or false intersections can be misleading. On the other hand, maintaining overall distance and orientation of the route is useful but not required for a navigator to follow the route. Thus, resolving intersections is given a higher priority than maintaining end point distance in this embodiment of road layout module 686.

Line 502 of the representative code initializes the variable "Score" to zero. The variable "Score" represents $E_1$ (806 FIG. 8) or $E_2$ (810). Next, lines 503 through 508 each potentially add to the value of "Score." Higher values of score represent higher values for $E_1$ and $E_2$ and thus represent poor solutions. Each of the functions that contribute to the overall value of "Score" on lines 503 through 508 is discussed with more detail below.

IntersectionScore( ). The first function to contribute to the variable "Score" in the representative code is function "IntersectionScore( )" on line 503. Maintaining proper intersections between roads is the highest priority in the disclosed scoring function. In the initialization of the annealing, all of the roads in the route map are grown to their desired minimum lengths. Growing the roads can lead to two problems: intersections may be introduced between roads that should not intersect (false intersections), or two roads that should intersect no longer intersect (missing intersections). FIG. 40 illustrates both of these scenarios. FIGS. 40A and 40C each represent an original map whereas FIGS. 40B and 40D represent perturbed maps. FIG. 40B represents a situation in which a false intersection 4002 arises. FIG. 40D represents a situation where a missing intersection 4004 arises. Both missing and false intersections can be extremely misleading and therefore are severely penalized in any proposed layout that has either of these problems.

The role of the scoring function in road layout module 686 is to guide the layout algorithm to the desired layout. One approach to furthering this goal is to add a fixed constant penalty when either of these conditions exists. However, this scoring function does not provide adequate guidance because the same penalty is always added to the score no matter how severe the false or missing intersection. Suppose the route contains a missing intersection as shown by 4004 in FIG. 40D. If the layout is perturbed and the missing intersection points end up closer to one another but do not exactly match, the intersection score for this map will not change. The algorithm will not know that moving the missing intersection points closer together generates a better layout. In other words the annealing algorithm is less likely to converge. Thus, in this embodiment, a score is constructed that reflects the severity of the intersection problems in a manner that suggests how they might be resolved rather than using a constant penalty for each false or missing intersection. What follows is a description of how simple false and missing intersections are resolved independently by the disclosed scoring function. Next, a description is provided for how scoring must change when there are both false and missing intersections in a single map.

Missing and Misplaced Intersections. If two roads should intersect but don't (missing intersection), a factor is added to the score that is related to the distance between the proper intersection point on each road. The proper intersection point is computed from the parametric value of the original intersection in the unscaled map. If the roads should intersect and do intersect but at the wrong point (misplaced intersection), a factor is also added that is related to the distance between the proper intersection point on each road. The scoring weight for a misplaced intersection is much less than for a missing intersection. This score is illustrated in FIG. 41. FIG. 41A represents how a missing intersection is scored whereas FIG. 41B represents how a misplaced intersection is scored. The general formulas for computing the intersections are:

missingscore=*d**MISSING_SCORE_WEIGHT misplacedscore=*d**MISPLACED_SCORE_WEIGHT where d is the Euclidian distance between the two points that should intersect as represented in FIG. 41.

Simple False Intersections. False intersections occur when the path incorrectly folds back on itself, forming a loop or knot. To remove false intersections, the knot must be unraveled. To remove any individual knot it is desirable to make the false intersection point move toward the closest endpoint (in pixels along the route) of the path (or similarly, make the closest endpoint move towards the false intersection point). FIG. 42 illustrates several false intersection scenarios, showing for each false intersection point which direction the closest endpoint must travel to remove the knot formed by that false intersection point. FIG. 42A represents the simplest case, one false intersection 4202. End point 4204 simply needs to move to the right to resolve the false intersection. FIGS. 42B and 42C show which direction endpoints should move to resolve each false intersection point independently. FIG. 42B represents a situation in which multiple false intersection points 4208 are near the same endpoint 4206. The two false intersection points 4208 are pulling endpoint 4206 in opposing directions. FIG. 42C represents the case of multiple false intersection points (4214, 4216) that are near different endpoints (4210, 4212). In this case, false intersection points 4214 and 4216 are entirely independent of each other.

Figure 43:
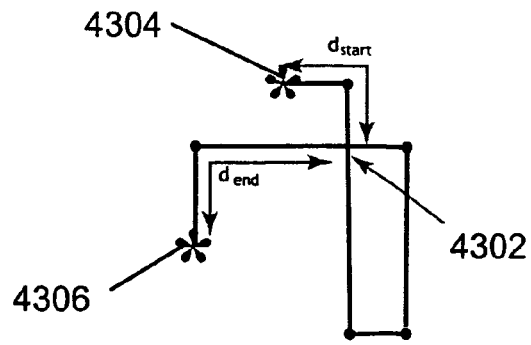
FIG. 43 illustrates a knot that is produced by a false intersection upon scaling a route map.

Computing the score for an individual false intersection point is relatively straightforward. It is desirable to move the false intersection point towards the closer endpoint of the route, or alternatively to move the closer endpoint towards the false intersection point. FIG. 43 illustrates a knot that is produced by false intersection 4302. One way to resolve false intersection 4302, is to push the endpoint that is closer to false intersection 4302 towards the false intersection. To determine which endpoint (4304 or 4306) is closer to false intersection 4302, the distance between each endpoint and the false intersection is computed and compared. Then, the endpoint that is closer to the false intersection is moved towards the false intersection.

Figure 44A:
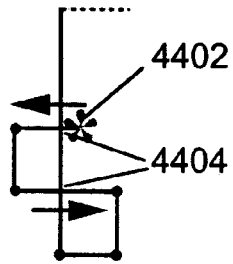
FIGS. 44A and 44B illustrate methods for resolving false intersections, in accordance with various embodiments of the present invention.
Figure 44B:
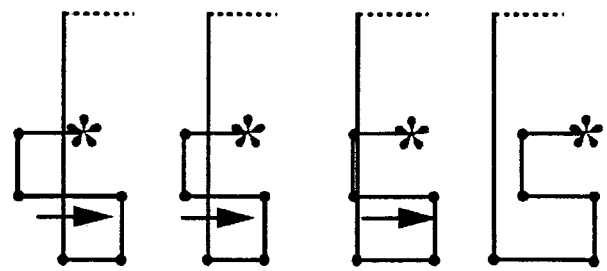

Viewing each false intersection independently, the score for each false intersection point is computed as the "distance in pixels along the route to the nearest end point" multiplied by a scoring weight. This is equivalent to conceptually building a scoring hill along the route that guides the false intersection point to the closer endpoint, where it can be removed. Therefore, the score for a single false intersection can be computed as:

falsescore=*d**FALSE_SCORE_WEIGHT where d is the distance in pixels to the endpoint along the route, as opposed to straight line distance, as shown in FIG. 43. However, as illustrated by the scenario in FIG. 42B, if the score for each false intersection is computed this way, then when there are multiple false intersections the scores will push the endpoint in opposite directions. However, this problem is addressed by always counting only the score for the innermost false intersection (i.e. the one farthest from the endpoint). The difference between counting all false intersections and only the innermost false intersection is shown in FIG. 44. FIG. 44A illustrates the situation in which, if the scores for both false intersections 4404 are counted, endpoint 4402 is pulled equally in both directions, resulting in a plateau in the scoring function since a move of endpoint 4402 in either direction does not change the score. FIG. 44B illustrates the situation in which only the innermost false intersection is counted for each endpoint. In the situation described in FIG. 44B, once the innermost false intersection has been resolved, the remaining false intersection becomes the innermost false intersection and is subsequently resolved. In situations such as FIG. 42C, where there are two false intersections but they are both closer to different endpoints, both scores are counted against these respective endpoints.

Figure 45A:
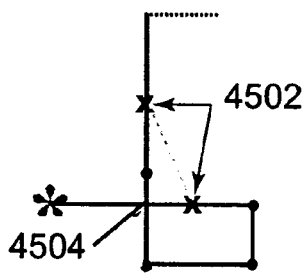
FIGS. 45A and 45B illustrate two types of missing intersections that arise during route map scaling.
Figure 45B:
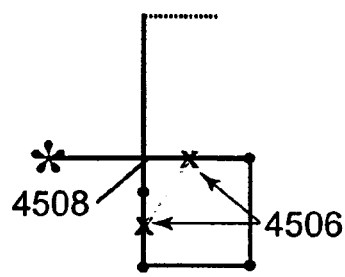
Figure 46A:
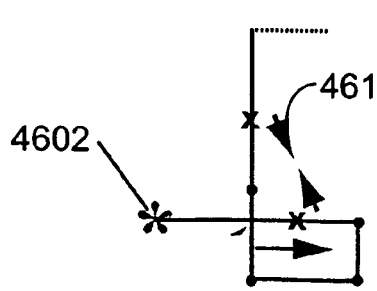
FIGS. 46A and 46B illustrate methods for resolving missing intersections, in accordance with various embodiments of the present invention.
Figure 46B:
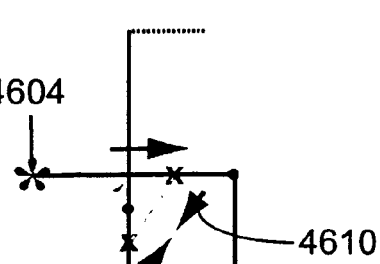

False Intersections and Missing Intersections In general, when both false and missing intersections occur in the same map they can be scored as previously described, and in most cases the scores will interact properly to resolve both problems. However, there is one exceptional situation. This situation occurs when a missing intersection occurs within the loop formed by a false intersection. Several variations of this situation are illustrated in FIG. 45. In FIG. 45A, one point 4502 of the missing intersection is within the loop formed by a false intersection 4504. In FIG. 45B, both points 4506 are within the loop formed by false intersection 4508. In both of the situations shown in FIG. 45, one score may push in one direction and the other score in the other direction, resulting in a stalemate in which neither problem can be resolved. FIG. 46 shows the same routes as FIG. 45, but with arrows 4610 added to indicate the direction that the two scores would move the endpoints 4602 and 4604.

An important point to note about the situations arising in FIG. 45 is that resolving the missing intersection often resolves the false intersection. In FIG. 45, there is supposed to be an intersection, it is just occurring between the wrong roads. It is quite often the case when a missing intersection occurs within the loop of a false intersection that the false intersection is simply the missing intersection misplaced. This situation is resolved with one additional rule: if there is some point of a missing intersection inside the loop formed by a false intersection a constant penalty is added for the false intersection, not a hill-based score. Thus, both of the cases that are shown in FIG. 45 will use a constant penalty for the false intersection, as both contain at least one point of a missing intersection within the false intersection loop.

With this introduction an algorithm for scoring missing and false intersections can now be stated with lines 601 through 633 of the illustrative code.

```
(601) void score_false_intersection(Road* self, Road* other) {
(602)   if (missing_intersection_in_loop) {
(603)     // false intersection loop contains a missing intersection
(604)     if (closest_to_route_endpoint(self,other)) {
```

```
(605)            self->IncrementScore (FALSE_INTERSECTION_CNST);
(606) } else {
(607) // no missing intersection in loop
(608)         if (closest_to_route_endpoint(self,other)) {
(609)            self->IncrementScore(pixelsToClosestEndpoint *
(610)                                    FALSE_INTERSECTION_HILL);
(611)            // Compute the max possible extended intersection
(612)            // score. All false intersection scores must be increased
(613)            // by the max extended intersection score to ensure that
(614)            // there is no valley between solving all the false inter-
(615)            // sections and introducing the extended intersections.
(616)            self->IncrementScore(MaxExtendedI- ntersectionScore);
(617) } } }
(618) void ScoreMissingIntersection(Road* self, Road* other) {
(619) double missingIntersectionScore = 0.0;
(620) // We know where the two roads should have intersected
(621) // in terms of T values along each road. Compute distance // between these two points.
(622) for (each missing intersection between self and other) {
(623)         double dist = (ptSelf – ptOther).length( );
(624)         // Before the roads touch use a higher penalty. After they
(625)         // touch reduce the penalty constant to make sure that the
(626)         // anneal will maintain the touch.
(627)         if (no intersection between self and other) {
(628)             double missingScore = dist * MISSING_INTERSECTION;
(629)             self->IncrementScore(Road::INTERSEC- T, missingScore);
(630)         } else {
(631)         self->IncrementScore(Road::INTERSECT, dist *
(632)                                    MISPLACED_INTERSECTION);
(633) } } }
```

Examining lines 601 through 633 of the illustrative pseudo-code in detail, one will notice that an additional score, "MaxExtendedIntersectio-nScore" is added to the false intersection scores. This function is described below in conjunction with an explanation of the concept of extended intersections.

Extended Intersections. In addition to avoiding actual intersections between roads, it is desirable to avoid having roads pass close enough to each other that they appear to touch. These situations are handled in one embodiment of road layout module 686 by using the concept of an extended intersection. Extended intersections between two roads are calculated by extending both endpoints of each road by a fixed number of pixels and then checking if the resulting roads intersect. This concept is illustrated in FIG. 47. In particular, in FIG. 47A, the roads do not actually intersect but are close to one another. In FIG. 47B, when the roads are extended by a fixed number of pixels, the roads do intersect. If an extended intersection does occur between two roads it is scored in the following manner for each of the two roads:

(a) if the intersection occurs in the extended part of the road, as for road 4702 in FIG. 47A, then the number of pixels from the end of the extended road is computed and multiplied by a fixed constant.

(b) if the intersection occurs within the unextended portion of the road, as for road 4704 in FIG. 47A, then a fixed constant, which is equal to the largest penalty that can be assigned for an intersection with the extended portion of the road, is added to the score.

Figure 48:
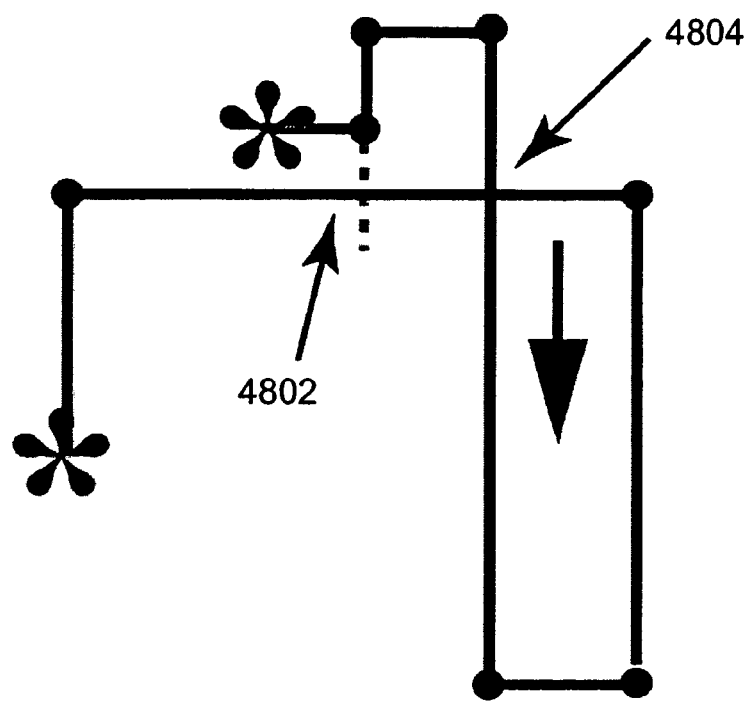
FIG. 48 illustrates how an extended intersection may work against the resolution of a false intersection during route map refinement.

There is one complication with handling extended intersections. When trying to resolve a false intersection, extended intersections often cause many local minimums in the search space. This is illustrated in FIG. 48, where an extended intersection 4802 works against the resolution of false intersection 4804. To reduce the number of local minimums in the search space explored by the target function as much as possible, only extended intersections are counted towards the score when they are not likely to be counteracting the resolution of a false intersection. Implementation of this criteria requires two things:

(a) knowing when to, and when not to, count an extended intersection towards the score, and (b) adding the largest possible extended intersection score to the base false intersection score. Otherwise, when a false intersection is resolved the target function starts counting a number of extended intersections, and their increased score may overwhelm the decrease in score from resolving the false intersection. This may cause a substantial local minimum in the search space that would prevent the resolution of most false intersections. However, in a preferred embodiment road layout module 686, the maximum extended intersection score is added to each false intersection score. This guarantees that the resolution of a false intersection will result in a decrease in score.

Figure 49:
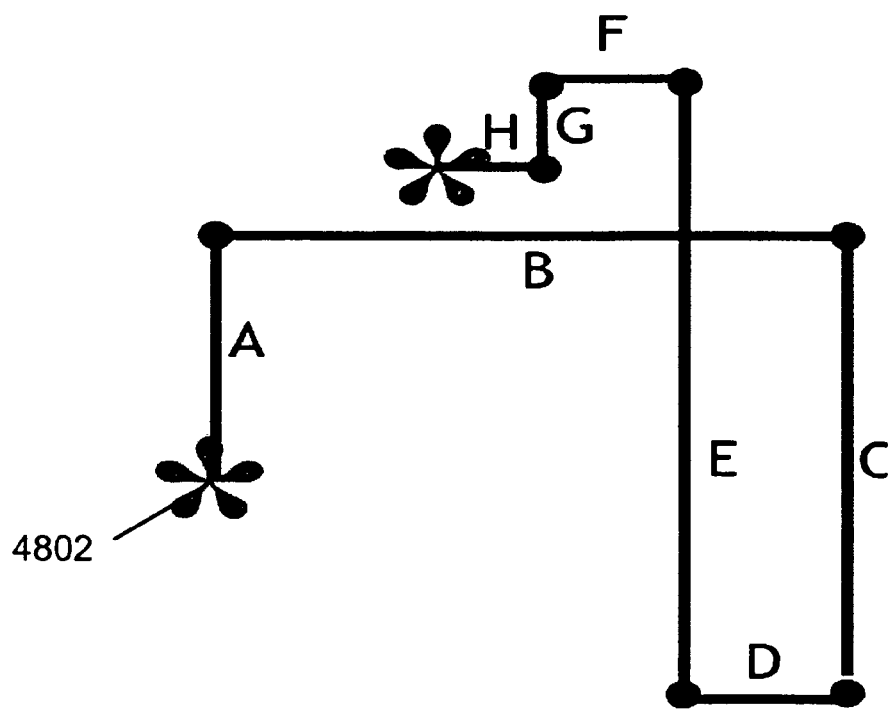
FIG. 49 illustrates a way to determine which extended intersections to add to a refinement score, in accordance with one embodiment of the present invention.

A way to determine which extended intersections to add to the score is to divide the route into false intersection intervals. All roads between an endpoint of the map and a false intersection, or between a pair of false intersections are considered to be in the same false intersection interval. This concept is illustrated in FIG. 49. In FIG. 49, the same route shown in FIG. 48 is illustrated, but the route is segmented by false intersection intervals. In particular, there are three false intersection intervals in FIG. 49: (A) from start point 4802 up to, but not including, the first road with a false intersection, (BCDE) which is from the road with a false intersection up to the next road with a false intersection, and (FGH) which is from the last false intersection to the endpoint. Extended intersections are only counted between roads in the same false intersection interval. Thus, the extended intersection shown in FIG. 48 would not be counted. If only extended intersections that occur between roads in the same false intersection intervals are added, then the problem depicted in FIG. 48 will not occur.

ShuffleScore( ). The second function to contribute to the variable "Score" in the representative code is function "ShuffleScore( )" on line 504. The purpose "ShuffleScore( )" is to maintain the relative lengths of the different roads in the scaled route map the same as they were in the unscaled route map. In function "ShuffleScore( )," for each pair of roads A and B in the route map, the ordering of the roads by length in the scaled map is compared with the ordering of the roads by length in the original unscaled map. If the ordering has changed, roads A and B are considered shuffled and a factor is added to the variable "Score" to reflect this. In one embodiment, however, roads are only considered shuffled when their difference in lengths is greater than some perceptual threshold. Typically, the perceptual threshold used is dependent upon the resolution and size of the viewport that is used to visualize the route map as well as factors such as whether the full scaled route map is being displayed in the viewport as opposed to a scaled up segment of the scaled route map. The purpose of the penalty applied by function "ShuffleScore( )" is to ensure that, whenever possible, the relative ordering of roads by length is maintained in the scaled route map.

In one representative target function used by an embodiment of road layout module 686, "ShuffleScore( )" is represented by the following expression:

For each pair of roads (A,B)
Compare the ordering of the roads by length in the current map with the ordering of the roads by length in the original map. If the ordering has changed then add a constant penalty to the score to reflect this. Roads are only considered shuffled when their difference in lengths is greater than some perceptual threshold.

RoadLengthScore( ). The overall goal of the non-uniform scaling of maps that is implemented by road layout module 686 is to make all of the roads in the route large enough to be legible. This is tracked by the third function ("RoadLengthScore( )"), which contributes to the variable "Score", as found on line 505 of the representative code. In function "RoadLengthScore( )," the current length of each road in the route map is compared to a predetermined minimum desired length. If a road is less than the minimum desired length, then a factor is added to the variable "Score." The magnitude of this factor is a function of the power of the difference between the current length of the offending road and a predetermined minimum acceptable road length. The predetermined minimum acceptable road length is set to ensure that the road is long enough to be identifiable in the scaled route map. In some embodiments of the present invention, the predetermined minimum acceptable road length is designated by considering the dimensions of the viewport 640 (FIG. 6) used to display the scaled route map or the number of pixels in viewport 640. In one example, when viewport 640 is a 1024 by 768 pixel array, the predetermined minimum acceptable road length is 20 pixels. In another example, the predetermined minimum acceptable road length is set to four percent of the length of the shortest dimension of viewport 640. Thus, if viewport 640 has a display that is 5 by 6 centimeters, the predetermined minimum acceptable road length is set to 0.2 centimeters.

In one representative target function used by an embodiment of road layout module 686, "RoadLengthScore( )" is represented by the following expression:

For each road (A)
Compare the current length to a predetermined minimum desired length. If less than the minimum desired length then add a factor to the score. The factor is related to a power of the difference between the current length and the desired minimum length. The minimum desired length is set to ensure the road is long enough to be perceived and labeled and that the relative lengths are preserved.

RatioScore( ). The fourth function to contribute to the variable "Score" is function "RatioScore( )," which is on line 506 of the representative code. One of the lowest priority contributors to "Score," function "RatioScore( )" is used to maintain the ratios between different road lengths. Function "RatioScore( )" examines each road A in the scaled route map whose length is greater than the predetermined minimum acceptable road length described in the discussion of function "RoadLengthScore( )" above. For each such road A in the scaled route map, the ratio of the length of the road is compared to the next shorter and next longer road in the route map. The ratios obtained from these comparisons is matched with the corresponding ratios obtained from the unscaled route map. When the ratio between road A and the next longer and next shorter road in the route map differs significantly in the scaled and unscaled route maps, a penalty is added to the variable "Score." The purpose of function "RatioScore( )" is to preserve road length ratios in the scaled route map from the unscaled route map that have sufficient space.

In one representative target function used by an embodiment of road layout module 686, "RatioScore( )" is represented by the following expression:

For each road (A) whose length is greater than its minimum desired length:
Compare the ratio of this road's length to the next shorter and next longer road, capping the ratios at five, since in a non-uniform cap it is hard to maintain any larger ratio. Assign a penalty as:

penalty=absolute(current ratio−original ratio)*
RATIO_SCORE

EndPointDirectionScore( ). The fifth function to contribute to the variable "Score" in the representative code is function "EndPointDirectionScore( )" (line 507). This function adds a factor to the variable "Score" to reflect the difference in the orientation between the start and end addresses in the unscaled route map and in the scaled route map. The magnitude of the factor added to the variable "Score" by this function is dependent upon the extent of the difference in the orientation between the start and end addresses in the scaled and unscaled route maps. Large differences in the orientation yield a large magnitude while small differences yield a small magnitude.

In one embodiment of road layout module 686, "EndPointDirectionScore( )" is represented by the following expression:

penalty=absolute(original orientation angle−current orientation angle)*ORIENTATION_SCORE EndPointDistancescore( ). The sixth function to contribute to the variable "Score" in the representative code is function "EndPointDistanceScore( )" on line 508 of the representative code. This function adds a factor to the variable "Score" that reflects the difference in distance between the start and end point addresses in the original unscaled route map and the current scaled route map. This function is particularly useful for route maps that have an overall U-shape. This function ensures that the start and finish of the route map will not get too close to one another.

In one embodiment of road layout module 686, "EndPointDistanceScore( )" is represented by the following expression:

penalty=(desired length=current length)/desired length*DISTANCE_LENGTH

It will be appreciated that the scoring function represented by lines 501 through 508 of the representative code merely illustrates one type of scoring function that is used in some embodiments of road layout module 686. In fact, many permutations of the scoring function represented by lines 501 through 508 of the representative code are possible. Such permutations include the use of only a subset of the functions outlined in the representative code to build the value of variable "Score." For instance, in some embodiments, only the functions "IntersectionScore( )" and "RoadLengthScore( )" are used. Other permutations of the scoring function illustrated by the representative code include the relative weighting of component functions so that some of the functions have a greater influence on the value of the variable "Score." Thus, for example, in some embodiments, the contribution of IntersectionScore( ) to the variable "Score" is up weighted relative to the contribution of "RoadLengthScore( )." Such weighting schemes may be dynamically imposed based on factors such as the complexity of the route, the size of the viewport used to display the route, the presence of anomalies such as a road in the route that is much longer than any other road in the route, as well as user specified preferences.

Additional Label Refinement Embodiments

Another important aspect of the overall process for producing a high quality map is performed by label layout module 688. Label layout module 688 places and optimizes labels that correspond to the various roads in the route map. One novel feature of label layout module 688 is that it will fix the position of the label for certain roads during refinement.

FIG. 9 illustrates one embodiment of label layout module 688 (FIG. 6). Many different types of target functions may be used to refine the label position in the process illustrated in FIG. 9. Two such target functions are described by lines 301 through 308 and lines 401 through 417 of the illustrative code. In the previously described embodiments, a simulated annealing schedule was used to place labels within a continuous range of positions in a region around the center of the road corresponding to the label. Such a region is called a constraint. The type of constraint used in previously described embodiments is illustrated in FIG. 17A. In FIG. 17A, element 1702 illustrates the continuous range of positions that may be used to place the label that corresponds to road 1702. Element 1704 serves as a constraint because the center of the label is constrained to lie somewhere within element 1704. FIG. 17B illustrates the placement of label 1706 at one such acceptable location.

The layout module 688 described in this section builds upon the constraint definition used in prior embodiments. The expanded constraint definition is used by the target function in the simulated annealing schedule of label layout module 688 to identify a suitable label position, orientation, and style. The constraint components in the expanded constraint definition include (i) a bounding box (e.g. element 1704 in FIG. 17A), (ii) an orientation (e.g. element 1710 in FIG. 17C), (iii) a layout style (e.g. FIG. 18A through 18F), and (iv) a scoring strategy.

The bounding box defines where the center of the label layout can be positioned. Thus, in FIG. 17B, a label placed using the constraint defined by box 1704 can be placed in such a manner that the center of the label falls anywhere in box 1704. Orientation vectors define how a label should be rotated. Label 1706 in FIG. 17A is positioned along a vector that is parallel to the long axis of corresponding bounding box 1704. Using the expanded constraint definition, labels can adopt alternative orientations. For example, the label may be oriented so that it is orthogonal to the long axis of the corresponding bounding box. FIG. 17D illustrates the placement of a label in a rotated position.

The layout style defines what text and images are created and how they are combined to make up the label when the given constraint is selected during annealing. FIG. 18 provides a number of exemplary layout styles. The layout style illustrated by FIG. 18A is a simple layout style in which the primary name for a street or highway is depicted. The layout style illustrated by FIG. 18B combines an arrow image with the primary name for a street or highway. The layout style illustrated by FIG. 18C combines the primary name for a street or highway with the mileage along the road. The layout style illustrated by FIG. 18D provides a highway number as text stacked on top of a shield image. The layout style illustrated by FIG. 18E provides word wrapping. Finally, the layout style illustrated by FIG. 18F provides a highway number stacked on top of a shield image with the mileage along the corresponding road.

The scoring strategy defines what base penalties are used with each constraint. The magnitude of the base penalty for a particular constraint is chosen by considering the type of layout style that is associated with a constraint. For example, a layout style that doesn't include a distance label (FIGS. 18A, 18E) is penalized more than one that does (FIG. 18C). A representative scoring strategy, in accordance with one embodiment of the present invention, is provided in Table 1. Each layout style has a base weight and a position score. In the scoring strategy provided by Table 1, lower scores represent improved label positions. Furthermore, the scoring strategy provided in Table 1 is designed to provide a target function that allows layout module 688 to find optimal positions for labels in the route map.

TABLE 1

Representative Scoring Strategy for Label Positions

| Layout Style | Base Weight | Position Score | Caveats |
| --- | --- | --- | --- |
| Highway Shield | 0.0 | +penalty* (distance from center of label to center of corresponding road) | Applicable only to highways with known highway numbers |
| Road name directly above or below road | 0.1 | +0.1 for below the road versus above the road; +penalty* (distance from center of label to center of road) | |
| Road name on road extension | 0.3 | +penalty* (distance from center of label to center of road) | Applicable only to roads where road continues past intersection with next or previous road. (i.e. not a T intersection) |
| Road name + aarrow pointing to road | 1.0 | +penalty* (distance from tip of arrow to center of road); +penalty for angle between label, road and screen; horizontal or vertical: +0.0; 90 degrees: +0.6; other: +1.0 | |

In the scoring strategy outlined in Table 1, the base score assigned to a base layout style is further defined by (i) the presence or absence of word-wrapping and (ii) whether there is no distance label, a distance label directly to the right, or a distance label directly below the label. Furthermore all position scores in Table 1 are further determined by whether there is distance labeling and word-wrapping. When there is no distance label, an additional 1.5 units is added to the score and when the road name is twenty characters or longer and there is no word wrapping, an additional 1.0 units is added to the score.

Turning attention to FIG. 19, an illustrative preprocessing phase in accordance with the present invention is illustrated. First, a road 1902 in the route map is selected (FIG. 19A). Then, a random constraint definition is chosen for the road from a set of possible constraint definitions. Each constraint in the set of possible constraint definitions includes a bounding box definition, an orientation vector, a layout style, and a scoring strategy. For example, constraint definition 1904 (FIG. 19B) includes the illustrated bounding box, an orthogonal orientation, a primary name plus distance layout, and a default scoring strategy. Other possible constraint definitions besides arrow constraint 1904 are possible. For example, in FIG. 19B, other possible constraint definitions include extended road constraints and highway shield constraints. The remaining steps in the illustrative preprocessing stage are discussed with the assumption that constraint definition 1904 is selected by the preprocessing method. Once a constraint definition has been selected, the next step is to randomly pick a position within the bounding box that is associated with the constraint. In FIG. 19C, such a position is illustrated by element 1910. Finally, using the layout style and orientation vectors associated with constraint 1904, label 1912 for road 1902 is positioned (FIG. 19D).

Figure 20:
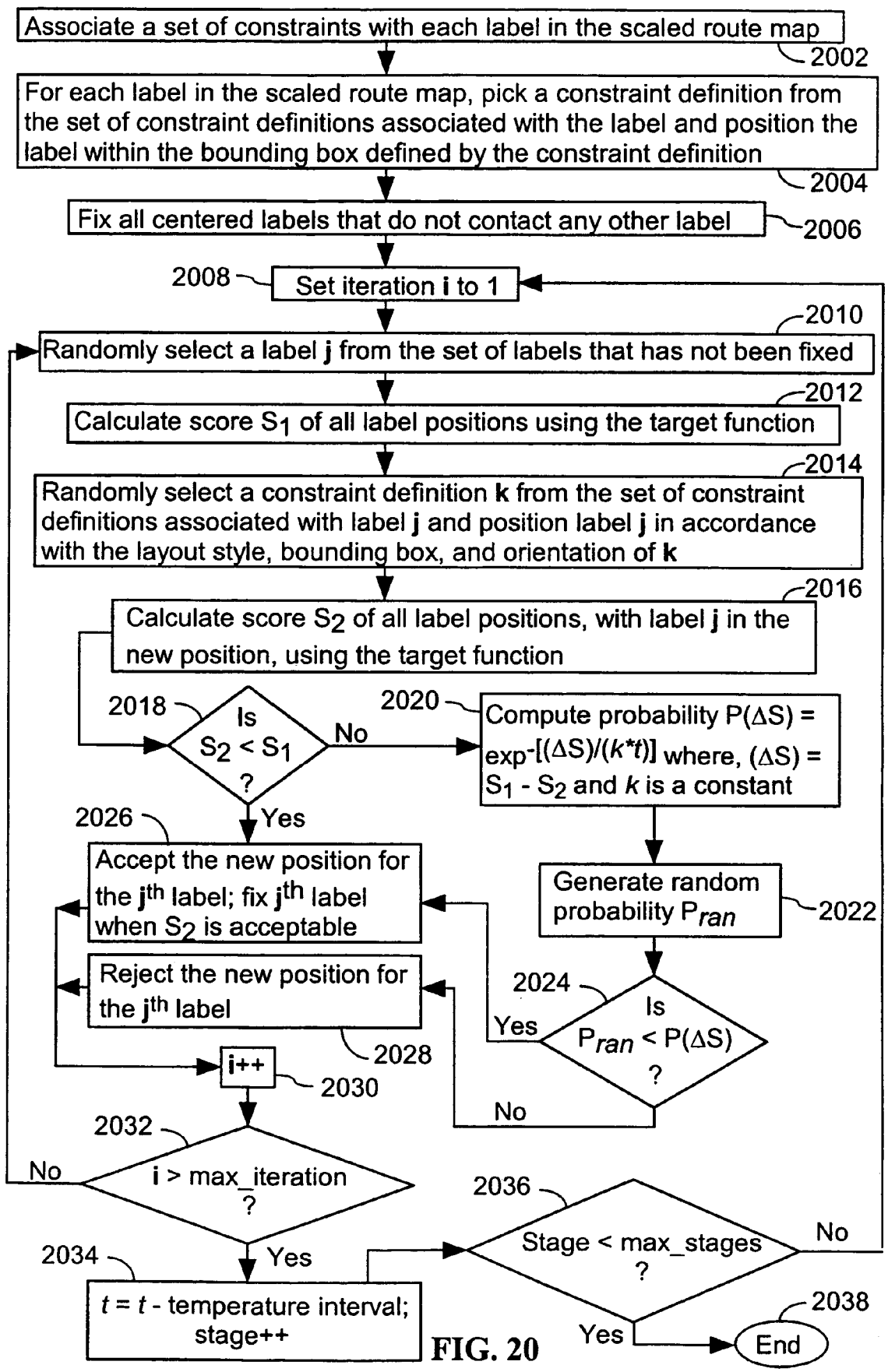
FIG. 20 provides an overview of an embodiment of layout module 688 that makes use of expanded constraint definitions, in accordance with one embodiment of the present invention.

Turning attention to FIG. 20, an overview of the embodiment of layout module 688 that makes use of expanded constraint definitions is illustrated. The process begins with processing step 2002. In processing step 2002 a set of potential constraint definitions is associated with each label to be placed in the scaled route map. Execution of processing step 2002 results in a set of potential constraint definitions, such as those represented in FIG. 19B, being associated with each label to be refined by label layout module 688. It will be appreciated that processing step 2002 will exclude constraint definitions that are not appropriate for a particular label class. For example, a constraint definition that includes a highway shield layout style will not be included within the set of potential constraint definitions associated with a label for a small road in the route map during processing step 2002. During processing step 2004, a constraint definition is selected for each label in the scaled route map from the set of constraint definitions associated with each label during processing step 2002. In one embodiment of layout module 688, an optimal constraint definition is selected for each label from a set of heuristics. Such heuristics include, for example, rules for specifying an optimal constraint definition for a highway. In another embodiment of layout module 688, no set of heuristics are used to choose a constraint definition from the set of potential constraint definitions and a constraint definition is randomly selected for each label from the set of constraint definitions associated with the label during processing step 2002. Once a constraint definition has been chosen for a label in processing step 2004, the center of the label is positioned within the bounding box associated with the constraint definition in accordance with the orientation vectors associated with the constraint definition. In one embodiment, the center of the label is positioned at the center of the bounding box. In another embodiment, the center of the label is positioned at a random location within the bounding box.

In processing step 2006, a check is performed to determine whether any label positions can be fixed. In the check, the boundaries of a label are compared to the constraint boundaries of every other label in the map. If there is no overlap between the boundaries of a given label and the constraint boundaries of all other labels in the route map, then the given label is fixed at its current position since there is no possibility that the given label will intersect another label during subsequent refinement. In some embodiments, labels are only fixed in step 2006 if the constraint definition selected for the label during processing step 2004 was made based upon a set of heuristics designed to select an optimal label. Thus, in such embodiments, when the constraint definition selected during processing step 2004 is randomly selected, the label is not fixed during processing step 2006.

During processing step 2008, an initial effective temperature t is selected and counter i is set to one (2008). In processing step 2010, a label j from the set of labels that has not been fixed in processing step 2006 is randomly selected. The quality of the position of the $j^{th}$ label ($S_1$) is measured using a target function in processing steps 2012 and in processing step 2014 the $j^{th}$ label is repositioned by positioning the label in accordance with the bounding box, orientation vectors, and layout style of a different constraint definition in the set of constraint definitions associated with the $j^{th}$ label during processing step 2002. In particular, the center of the $j^{th}$ label is randomly positioned within the boundaries of the bounding box of the different constraint definition. In processing step 2016, the quality of the newly positioned $j^{th}$ label ($S_2$) is measured. The target function used during processing step 2012 and 2016 is any function capable of assessing the quality of a label position in a route map. To this end, the target function could be that of lines 301 through 308 or lines 401 through 417 of the illustrative code described in other embodiments of label layout module 688 above.

When the quality of the $j^{th}$ position has improved ($S_2<S_1$) (2018-yes), the new label position for the $j^{th}$ label is accepted (2026). When the quality of the map has not improved ($S_2>S_1$) (2018-no) there is a probability $$1-\exp^{-[(\Delta S)/k*t]}$$

that the new label position for the $j^{th}$ label will be accepted. The probability that the change in label position will be accepted diminishes as effective temperature t is reduced. The probability function is implemented as processing steps 2020 through 2028 in FIG. 20. In processing step 2020, $\exp^{-[(\Delta S)/k*t]}$ is computed. In processing step 2022, a number $P_{ran}$, in the interval 0 to 1, is generated. If $P_{ran}$ is less than $\exp^{-[(\Delta S)/k*t]}$ (2024-Yes), the change made to the $j^{th}$ label position in processing step 2014 is accepted (2026). If $P_{ran}$ is more than $\exp^{-[(\Delta S)/k*t]}$ (2024-no), the change made to the $j^{th}$ label position in processing step 2014 is rejected (2028). It will be appreciated that probability functions other than the function shown in processing step 2020 are within the scope of the present invention. Indeed, any probability function that is dependent upon effective temperature t is suitable.

Processing steps 2008 through 2028 represent one iteration in the annealing process. In processing step 2030, iteration count i is advanced. When iteration count i does not exceed the maximum iteration count (2032-no), the process continues at step 2010. When the iteration count equals a maximum iteration flag (2032-yes), effective temperature t is reduced and the stage counter is advanced (2034). One of skill in the art will appreciate that there are many possible different types of schedules that are used to reduce effective temperature t in various implementations of processing step 2034. All such schedules are within the scope of the present invention. After processing step 2034, a check is performed to determine whether the simulated annealing schedule should be terminated (2036). When it is determined that the annealing schedule should not end (2036-no), the process continues at step 2008 with the re-initialization of iteration count i.

Layout Templates

Because route maps are often used when driving or navigating, it is important to present the maps and text in a convenient format such as a single 8.5 by 11 inch form. In one embodiment of the present invention, each form contains several image templates, such as the scaled route map or a conventional overview map, as well as text boxes for text directions, estimated distance and time. In one embodiment of the present invention, predefined forms are provided that define the layout and size of each of the image templates and text boxes. Exemplary image templates and text boxes are provided in FIG. 21. FIG. 21A is a text box that provides header information while FIG. 21B is an image template that provides a scaled route map. There are different image template sizes to accommodate scaled route maps of various sizes. FIG. 21C is a text box that provides text directions, FIG. 21D is an image template that provides an overview map, and FIG. 21E is an image template that provides a detailed map.

Several factors are used to consider which image template to use for a scaled route map. Such factors include, for example, the estimated aspect ratio of the scaled route map (i.e. the ratio of the total width of the scaled route map to the total height of the scaled route map), the number of elements (i.e. roads) in the scaled route map, and the overall orientation of the scaled route map. Exemplary code for one method for selecting an image template is provided in lines 700 through 723 of the exemplary code.

Figures 22A, 22B, 22C:
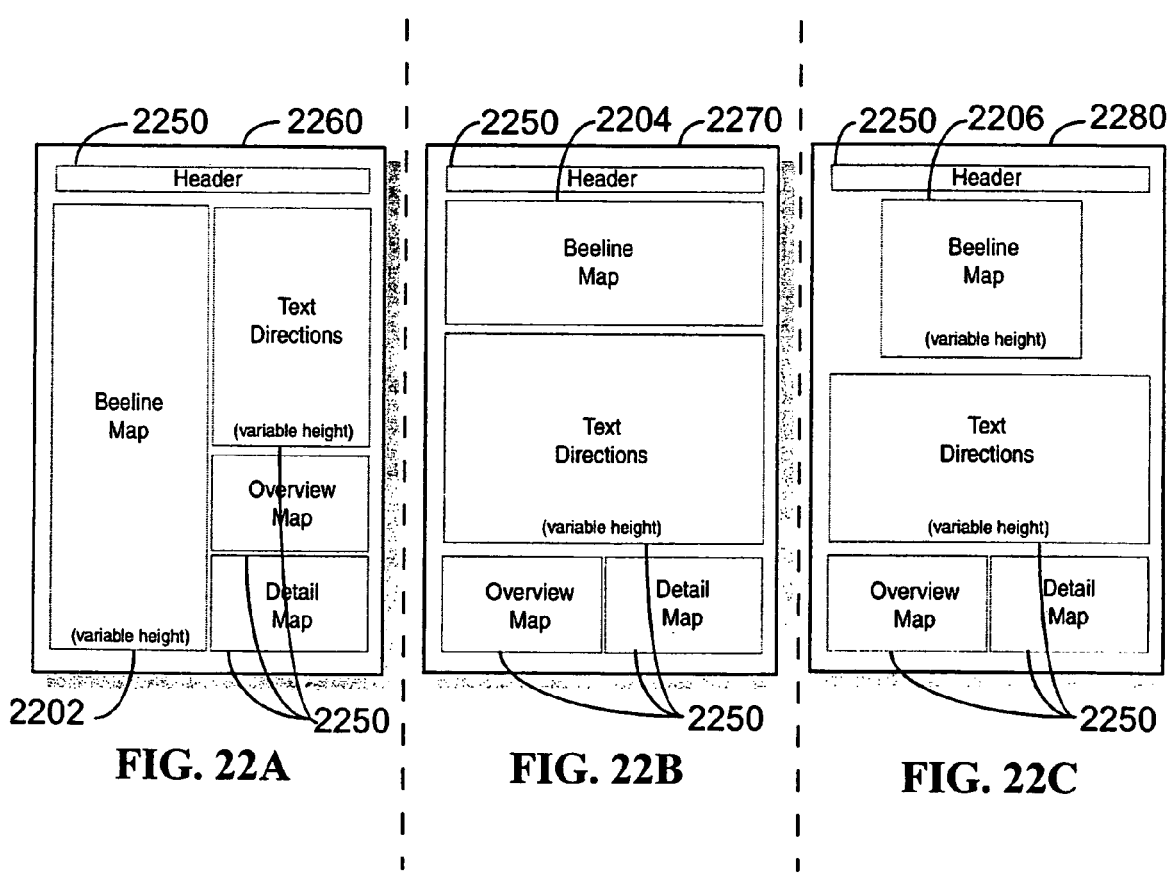
FIGS. 22A, 22B, and 22C illustrate various output forms in accordance with one embodiment of the present invention

```
(700) function SelectTemplate( ) {
(701) aspectRatio = map->EstimateAspectRatio( );
(702) int num_roads = map->GetOrigNumSteps( );
(703)
(704) if((aspectRatio < 0.60) .vertline..vertline. ((aspectRatio < 0.70)
&& (num_roads <= 15))) {
(705) select skinny vertical image template for the scaled route map
(FIG. 22A)
(706) if (num_roads < 20) scaled_route_map_height = 500;
(707) else {
(708) // this is a long route, so extra pixels in the vertical dimension //
are required
(709) scaled_route_map_height = 700; }
(710) else if (aspectRatio > 2.0) {
(711) select skinny horizontal image template for the scaled route
map (FIG. 22B)
(712) else {
(713) select square image template for the scaled route map
(FIG. 22C)
(714) if (num_roads < 15) scaled_route_map_height = 400;
(715) else if (num_roads < 25) {
(716) // this is a long route
(717) scaled_route_map_height = 500;}
(718) else {
(719) // This is a really long route
(720) scale_route_map_height = 600;}
(721) }}
(722) adjust dimensions of text, overview map, detail map and scaled
(723) route map to defaults for this template}
```

In the exemplary code, the aspect ratio of the scaled route map is estimated in line 701 and the number of elements or roads in the route map is determined in line 702. In lines 704 and 705 of the exemplary code, a decision to chose a skinny vertical image template 2202 (FIG. 22A) for the scaled route map is made when the estimated aspect ratio of the scaled route map is less than 0.6 or when the aspect ratio is less than 0.7 and the number of elements or roads in the scaled route map is less than 15. Skinny vertical image 2202 has a variable height which is determined by lines 706 through 709 of the exemplary code. Accordingly, when the number of roads in the route map is twenty or less, skinny vertical image 2202 is assigned a height of 500 pixels. When, the number of road in the route map is more than twenty, skinny vertical image 2202 is assigned a height of 700 pixels.

When the aspect ratio of the scaled route map is greater than 2.0 (line 710 of the exemplary code), skinny horizontal image template 2204 (FIG. 22B) is selected (line 711). For scaled route maps with any other aspect ratio, square image template 2206 (FIG. 22C) is selected (lines 612-613). Like element 2202, element 2206 is of a variable height that is determined by the number of roads in the scaled route map as set forth in lines 715 through 720 of the exemplary code. Finally, in lines 722 through 723 of the exemplary code, the dimensions of the remaining image templates and text boxes 2250 that are provided in the output form are positioned around the image template that includes the scaled route map to yield a fixed dimension form 2260, 2270, or 2280.

Context Information

All the information depicted in a route map can be divided into two categories: (1) route information and (2) context information. Route information includes information that is necessary to follow a route. Roads along the route and their labels are examples of necessary route information. Context information is secondary information that is not directly on the route, and is not needed for communicating the basic structure of the route. Examples of context information include landmarks, roads that intersect the route (i.e. cross streets) and the names of cities, parks, or bodies of water near the route. Context information can make it easier to understand the geography of the route, provide validation that the navigator is still on the correct route, and aid in identifying important decision points along the route.

In one embodiment of the present invention, two basic types of context information are handled: cross streets and point features. In this embodiment, city names are considered as point features. Adding context information to a route map requires first deciding which context information should appear in the route map. This choice is made difficult by the fact that context that is important to one person is not necessarily important to another person. Although some basic rules and preferences that can be used for choosing context information are described in the following example, it will be appreciated that the present invention is fashioned so that any context selection algorithm can be used.

In one example, every major cross street intersecting the roads on the main route of the route map, as well as the first cross street after each turning point on the main route is added to a route map as context information. The cross streets before the turn help the navigator monitor progress up to the turn, and the last cross street before the turn provides warning that the turn is coming up. The first cross street after the turn helps the navigator determine the proper turn has been missed. Three main classes of point features useful for using a route map are: (i) highway exit signs, (ii) buildings and businesses along the route and at turning points, and (iii) city names. Preferably all highway exit signs, particularly the exit number, are included because they make it much easier for the navigator to figure out which exit to take to get onto the next road on the route. Picking which business to include is more difficult, as there is no simple way of identifying the most salient building or businesses along a route. However, if the map is designed for a particular business partner such as McDonalds, all McDonalds along the route can be added automatically. Finally, it is desirable to include all major city names near the main route. For example, for a route between Santa Cruz Calif., and Hayward Calif., labels for Cupertino, San Jose, Milpitas, and Fremont are added to the route map as context information. The cities are chosen based on their proximity to the route, their population, and their area. City names help the navigator understand the overall geographic position and orientation of the route.

Figure 1:
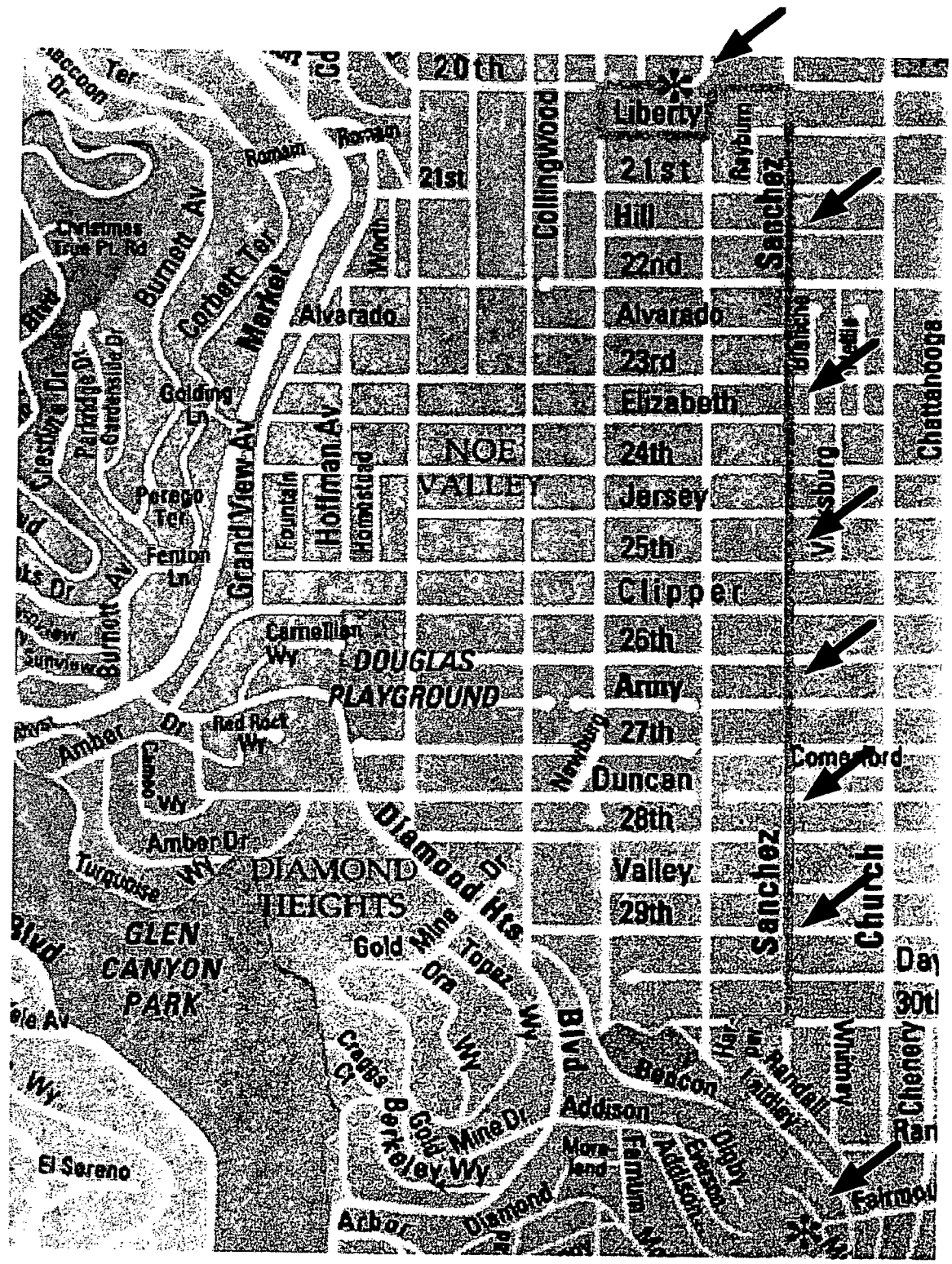
FIG. 1 is a prior art route highlight map.
Figure 2:
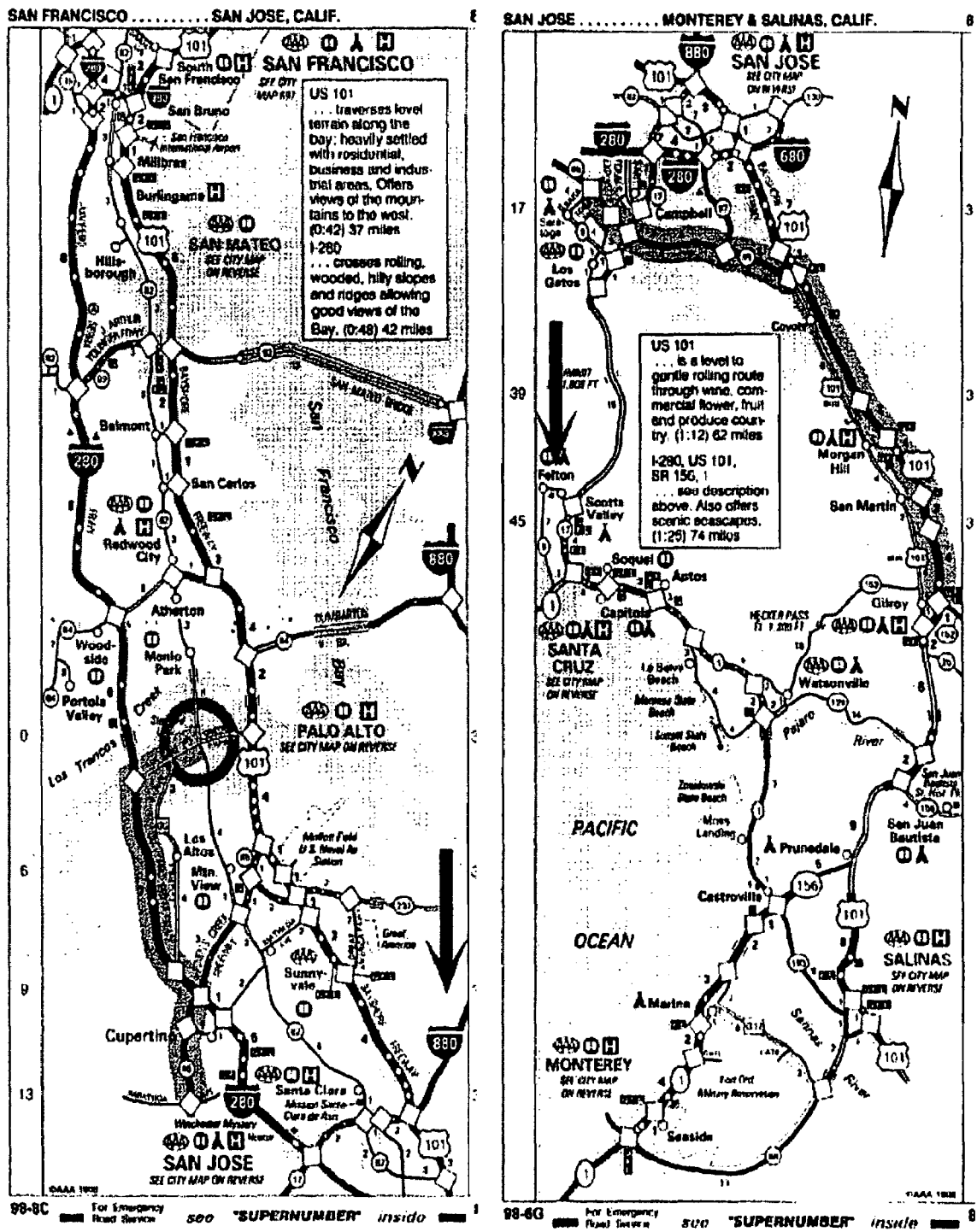
FIG. 2 is a prior art TripTik map.
Figure 4:
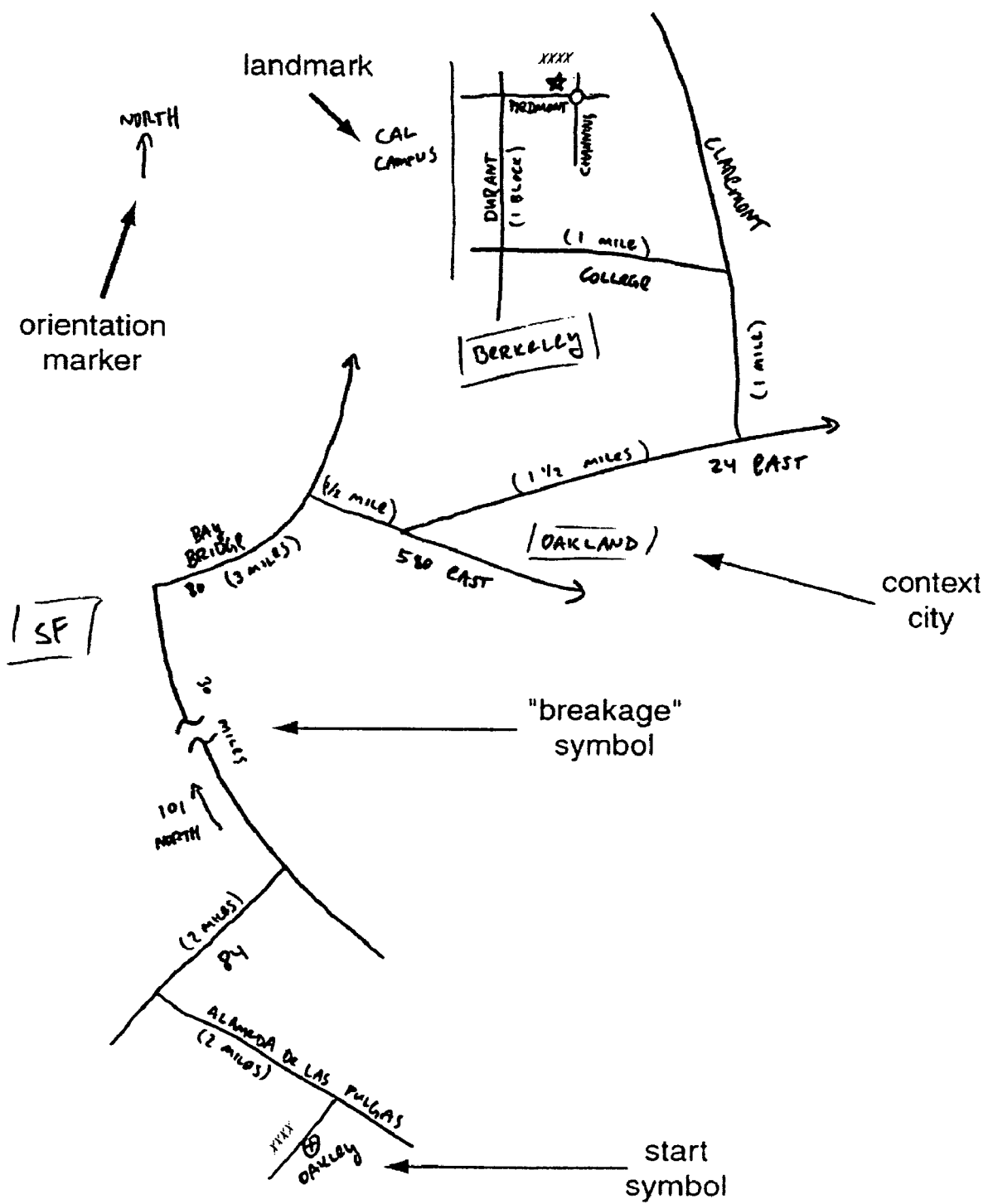
FIG. 4 is a prior art hand-drawn map.

Once context information has been selected, it must be placed onto the route map. Context can be placed by annotation module 690 any time after the roads on the main route have been laid out by road layout module 686 (FIG. 1). Context layout is generally performed right after execution of label layout module 688. If context is placed before label layout, the label layout scoring algorithm used by label layout module 688 is modified to check for label-context intersections. In one embodiment, selection of context information to be depicted on the map is no guarantee that it will actually be placed and rendered. If the context layout algorithm used by annotation module 690 cannot find a good placement for the context information, the algorithm can choose not to include this context information.

In one embodiment of the present invention, the approach used by annotation module 690 to place cross streets is very similar to the approach used for placing point features in the route map. The algorithm for placing cross streets will be described in detail first. Then, the differences in the algorithm used in one embodiment of annotation module 690 for placing point features will be briefly described.

Figure 23:
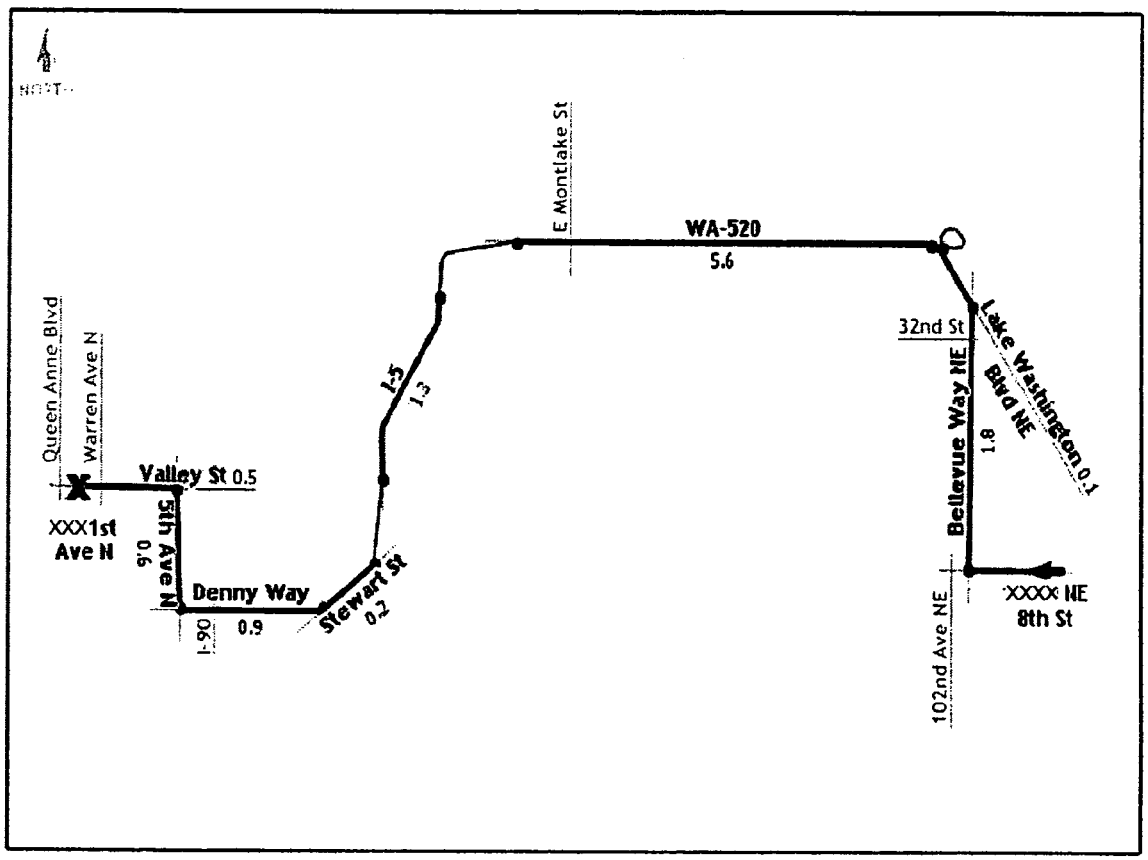
FIG. 23 illustrates a scaled route map with cross streets in accordance with one embodiment of the present invention.

Placing cross streets. FIG. 23 shows a scaled route map with several cross streets placed along the route. A cross street is specified by (i) the point of intersection of the street with the main route, (ii) the name of the cross street, (iii) shape points defining the shape of the street and optionally, and (iv) the importance of the cross street. The importance value for each cross street can either be supplied or it can be computed as the first step in placing the cross streets. In one embodiment, the names of cross streets and their relative importance are obtained from context database 696 (FIG. 1). In another embodiment, a predefined rules are used for computing the relative importance of a particular cross street. The last major cross street before a turning point on the main route is considered relatively important because such cross streets are helpful as a warning sign that the turn is approaching. Thus these cross streets are given the highest relative importance. In this embodiment, the cross road immediately after the turning point is given the next highest importance because such streets help navigators check if they missed the proper turn. Cross streets are especially helpful near the route destination, where presumably the navigator is less familiar with the territory. Therefore these cross streets are given higher importance than cross streets near the beginning of the route.

In the present invention, two search-based approaches to laying out cross streets are provided. The first approach considers each cross street, one at a time, in order of importance. If importance is equal, a cross street is randomly picked from the equally important cross streets. Then, a search for a "good" placement for the road is performed. If a good placement is found, the cross road is drawn in the rendering phase of the process. If a good placement is not found, the cross street is not drawn during the rendering phase and therefore is not included in the map.

The second approach to laying out cross streets searches for a good placement of all cross streets simultaneously. All of the cross streets are placed on the map. Each cross road may also be "hidden" instead of being placed. Then the placements are optimized.

The first approach to laying out cross streets is faster than the second approach but may not find an optimal placement for all of the cross streets. The second approach to laying out cross streets may take longer than the first approach but is less constrained and may therefore produce a better overall placement.

Regardless of whether the first or second approach is taken by annotation module 690 to lay out cross streets, a search-based approach to optimizing the placement of the cross streets is performed. This requires two basic functions: perturbation and scoring. The perturbation function is used to change the layout of a particular cross street while the scoring function evaluates the current placement of the cross streets. The scoring function is used in the search-based approach to determine whether the perturbation improved the map layout. Such a determination is made in accordance with a search algorithm. Representative search algorithms that may be used include greedy algorithms, gradient descent, simulated annealing, Tabu searches, and A* as reviewed by Zbigniew et al. in *How to Solve It: Modern Heuristics*, Springer-Verlag, Berlin, Germany, 2000, greedy searches A*/IDA*, simulated annealing and hill climbing (gradient descent) as reviewed by Russell et al. in *Artificial Intelligence: A modern Approach*, Prentice Hall, 1995, and genetic algorithms as reviewed by Goldberg in *Genetic Algorithms in Search, Optimization and Machine Learning*, Addison-Wesley, 1989.

In one embodiment, the perturbation function is designed as follows:

Perturb( )

randomly pick one of the following variables and change it:
  the position of a cross street's intersection with the main path;
  the position of cross street label; or
  whether the cross street is included in the map or is "hidden"

When Perturb( ) changes the position of the cross street label, the perturbation is subject to the constraint that the street label falls within a predetermined area that includes the cross street's intersection. In one embodiment of the present invention, the shape of the predetermined area is a square and the square is centered on the cross street's intersection. Accordingly, the position of the cross street label that is associated with the cross street can be perturbed by an amount as long as the cross street label remains in the square. Once the position of the cross street's intersection with the main path and the cross street's label are chosen, the cross street is extended to pass under or over its label and to pass slightly beyond the intersection with the main route.

In one embodiment, the scoring function that is used to evaluate perturbations is designed as follows:

Score( )

the placement of each cross street is scored based on several criteria as follows:

a distance between the current intersection point of the cross street and the main path and the true intersection point between the cross street and the main path;

a number of other objects in the map that overlap the cross street, weighted by the amount of overlap;

a number of other objects in the route map that overlap the cross street's label, weighted by the amount of overlap;

a position of a cross street label along a cross street, using the same constraint-based scoring as in normal label layout;

an amount of visual clutter/density around the cross street; and whether the cross street is hidden; hiding a cross street is penalized by an amount proportional to its importance, thus encouraging the search to place the cross streets rather than simply hide all of them.

The most complicated aspect of the scoring criteria is the notion of visual density or clutter. The present invention encompasses several different methods for computing visual density for a fixed region of focus centered at the cross street/ label. To appreciate these methods, reference is made to FIG. 24 which shows a portion of a route map 2402 that includes an area of focus 2404 with a cross street for which a measure of visual clutter is sought. Using FIG. 24 as a reference, representative metrics include:

(1) Convolve a pixel based image of the route map with a Guassian kernel in focus region 2404 using the luminance value of each pixel within the focus region.

Figure 24:
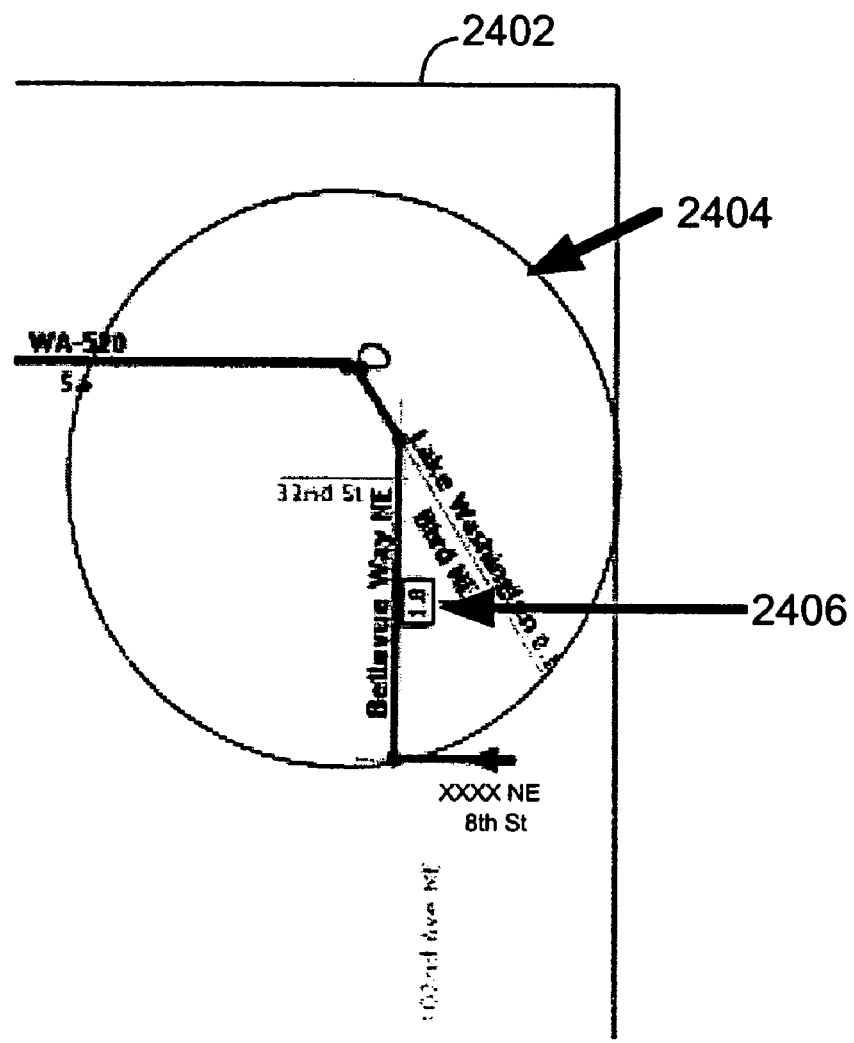
FIG. 24 illustrates the general problem of determining an amount of visual clutter in a pixel based image of a route map.

(2) Compute the area of each object in focus region 2404 multiplied by the average luminance for the object. Box 2406 drawn in FIG. 24 illustrates the area of one object in focus region 2404. The product of the multiplication of object area and average luminance is divided by distance from center of cross street to the center of object. Visual density is set to sum over all objects in the focus region. An equation that describes this metric is:

$$\sum_{i=1}^{Total\ objects\ in\ focus\ area} \left[ \frac{Object\ Area_i \times Average\ Luminance\ of\ Object_i}{Distance\ Between\ object\ i\ and\ center\ of\ focus\ region} \right]$$

Metric (1) is computationally expensive. Metric (2) is a quicker, but less accurate approximation of visual density. When laying out one cross street at a time, alternations are made between perturbing and scoring until the score reaches some acceptable threshold, and the placement is kept, or the iteration count reaches some maximum. If the score never goes below the threshold, the cross street is not included in the route map. When laying out all cross streets at once, a variety of search-based algorithms to minimize the overall score may be used. In such embodiments, overall score is computed as the sum of the scores for each cross street. Representative search-based algorithms that may be used include greedy algorithms, gradient descent, simulated annealing, Tabu searches, and A* as reviewed by Zbigniew et al. in *How to Solve It: Modern Heuristics*, Springer-Verlag, Berlin, Germany, 2000, greedy searches A*/IDA*, simulated annealing and hill climbing (gradient descent) as reviewed by Russell et al. in *Artificial Intelligence: A modern Approach*, Prentice Hall, 1995, and genetic algorithms as reviewed by Goldberg in *Genetic Algorithms in Search, Optimization and Machine Learning*, Addison-Wesley, 1989.

Figure 25:
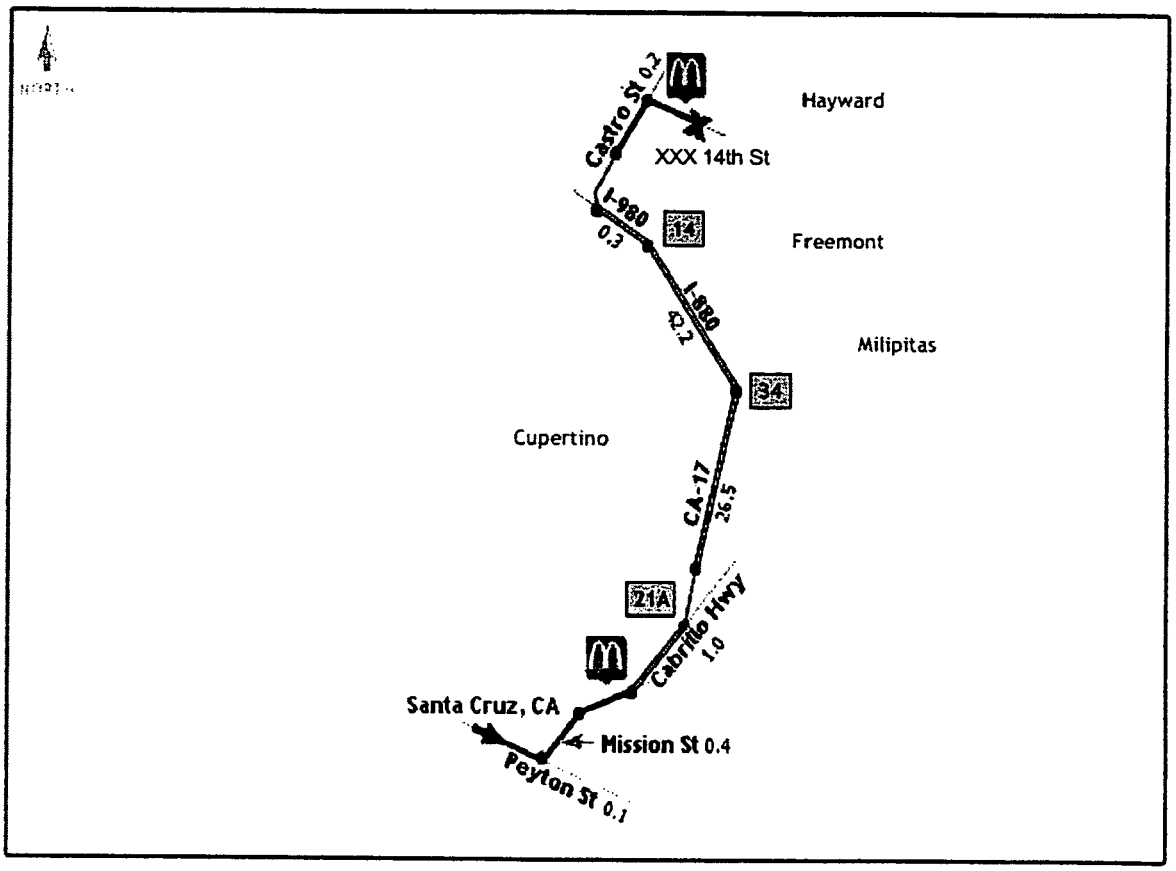
FIG. 25 illustrates a route map with several point features, such as exit numbers, restaurant locations, and city names included in accordance with one embodiment of the present invention.

Placing point features. FIG. 25 shows a route map with several point features, such as exit numbers, restaurant locations and city names included. A point feature is specified by:

An ideal (latitude, longitude) location for the point feature and either a circular or linear constraint region specifying the acceptable positions for the point feature. In the case of a city name, the feature would be allowed to appear any where within a circle inscribed in the boundary of the city. This region must be warped into the non-uniform coordinate system of the map;

the feature name, or an image, to be shown at the feature location; and optionally, the importance of the feature.

Just as in the case of cross streets, the importance of a point feature may be provided or may be computed during the layout. In one embodiment, all highway exit signs are given equal importance unless their importance values are provided a priori. For city names, importance is computed by multiplying the proximity of the city region to the route, the population of the city and the area of the city. Thus in this embodiment, large cities, with high populations, near the route are considered most important. Buildings and businesses are given higher importance when they are at intersections as opposed to along the roads in the route map. Furthermore, according to this embodiment, higher importance is allocated to businesses that are on smaller roads near the beginning or end of the route than those that are on larger roads such as highways and freeways.

As with cross streets, point features can be placed one at a time, or all at once. The ideal location and its surrounding constraint region is well-defined in the original coordinate system of the constant scaled map. To place point features we must first warp the ideal point and constraint region into the non-uniform coordinate system of the scaled route map. Because the coordinate system is non-uniform, a constraint-based optimization procedure is used to perform the warp. A variety of constraint-based warping techniques have been developed and are known as morphing techniques. See, for example, Beier and Neely, "Feature-Based Image Metamorphosis," Proc. SIGGRAPH '92, 3-42 (1992). Furthermore, for a general overview of warping techniques see Gomes et al., "Warping and Morphing of Graphical Objects," Morgan Kaufmann (1998). Any of the methods described in these references can be used to warp the ideal point and constraint region into the non-uniform coordinate system of the scaled route map.

The main differences in the search-based layout between cross streets and point features are in the perturb and score functions, which we describe below. When refining point features the perturb and score function has the format:

Perturb( )

Randomly pick one of the following variables and change it the position of the point feature within the region of acceptable positions.

whether the point feature is included in the map.

Score( )

The placement of each point feature is scored on the criteria:

the number of other objects in map that overlap point feature, weighted by the amount of overlap;

the distance between current location of point feature and its ideal location;

whether the point feature is hidden-again the penalty is proportional to the importance of the point feature; and amount of visual clutter/density.

Verticalization Techniques

In some embodiments of the present invention, memory 668 of server computer 624 includes a map verticalization module 698 (FIG. 6). Map verticalization module 698 is used to optimize the orientation of the scaled route map with respect to the dimensions of a given viewport. Map orientation optimization is particularly advantageous in instances where the viewport size used to display the scaled route map is small. In such situations, only a portion of the scaled route map is typically displayed. When just a portion of the scaled route map is displayed, the user is provided with the option to scroll the scaled route map in order to view the full route. To avoid confusion, it is advantageous to orient the scaled route map such that the long axis of the scaled route map coincides with the scroll direction. In one embodiment, the scroll direction is vertical and the scaled route map is oriented by map verticalization module such that the long axis of the scaled route map is vertical. Alignment of the long axis of a scaled route map with the scroll direction maximizes the amount of information that is displayed in a miniature viewport and provides a convenient mechanism for delivering consistent map layouts. The user can review the full rotated scaled map by using the scroll option.

Map verticalization is particularly advantageous in hand held devices such as personal digital assistants ("PDAs"). Given the dimensions of the viewport of a typical PDA, it is desirable to offer scaled route maps having the dimensions constant by Y, where Y varies in accordance with the number of steps or distance of the route within the route map. Thus, if the route is fairly short, the entire scaled route map is displayed in the PDA viewport. However, if the route includes several steps and has a fairly extensive long axis, the long axis is oriented so that it is aligned with a scroll bar. In this way, the consumer gets a consistent layout with only vertical scrolling.

Now that an overview of the advantages of map orientation have been discussed, a method for computing the orientation of the map is described. First, the position of each intersection along the main path in the scaled route map is computed. These intersection points are then fitted with a probability distribution. The probability distribution could be, for example, a binomial distribution, a Poisson distribution, a Gaussian distribution, or any other suitable probability distribution. When a Gaussian distribution is used, the center of the distribution is the mean of the intersection points, the axes of the distribution are the eigenvectors of the covariance matrix, and the extents of the distribution are the eigenvalues of the covariance matrix. The probability distribution defines axes and extents along those axes for the route. As illustrated in FIG. 11A, from these axes, the tightest bounding box 1100 that contains the complete route is determined. From bounding box 1100, the longest (dominant) axis of the route is computed. The direction of the longest axis is used to determine the amount by which the scaled route map is rotated so that it runs in a predetermined direction. In FIG. 11, the start of the route is marked by a hashed circle and the end of the route is marked by an open circle. Since the start point of the route is known, it is possible to perform the rotation of the map so that the start location is always at the bottom (FIG. 11B) or always at the top (FIG. 11C) of the viewport. Thus, the verticalization method is used to ensure that limited viewport space is fully utilized and to ensure that the starting location of each displayed map consistently lies in the same region of the viewport.

It will be appreciated that if the aspect ratio of the probability distribution used to determine the axes of the scaled route map indicates that the map is roughly square, verticalization is not performed. In one embodiment, the probability distribution used is a Gaussian distribution and verticalization is not preformed when the aspect ratio of the scaled route map is less than or equal to 1.98.

Sample code used to compute the long axis in a scaled route map and to rotate the scaled route map is provided below.

```
(801) bool Map::Verticalize( )
(802) {
(803) Vector2 mapOrientation[2];
(804) double extents[2];
(805) GaussPointsFit(numIntersectionPts, intersectionPts, center, axes,
       extents);
(806) // Verticalize map only if aspect ratio in obb coordinates is > // 1.98
(807) // Compute the aspectRatio as extent[1]/extent[0] as it should be
(808) // since the second extent is sorted to be the longest axis.
(809) double aspectRatio = extents[1]/extents[0];
(810) if (aspectRatio >= 1.98) {
(811) // Assume the mapOrientation vectors are of unit length. The
(812) // orientation vectors are sorted in increasing order, so use the
(813) // second one to compute the rotation angle.
(814) double angle = atan2(mapOrientation[1].v,mapOrientati- on[1].u);
(815) Rotate(-angle);
(816) return true;
(817) }
(818) return false;
(819) }
(820) void GaussPointsFit (int NumPoints, const Vector2* Point,
(821) Vector2& Center, Vector2 Axis[2], double Extent[2])
(822) {
(823) // Compute mean of points.
(824) for (int i = 1; i < NumPoints; i++)
(825) Center += Point[i];
(826) Center /= NumPoints;
(827) // Compute covariances of points
(828) double SumXX = 0.0, SumXY = 0.0, SumYY = 0.0;
(829) for (i = 0; i < NumPoints; i++)
(830) {
(831) Vector2 Diff = Point[i] – Center;
(832) SumXX += Diff.u*Diff.u;
(833) SumXY += Diff.u*Diff.v;
(834) SumYY += Diff.v*Diff.v;
(835) }
(836) SumXX /= NumPoints;
(837) SumXY /= NumPoints;
(838) SumYY /= NumPoints;
(839) // solve eigensystem of covariance matrix
(840) Eigen E(2);
(841) E(0,0) = fSumXX;
(842) E(0,1) = fSumXY;
(843) E(1,0) = fSumXY;
(844) E(1,1) = fSumYY;
(845) E.SolveEigenSystem( );
(846) Axis[0].u = E.GetEigenvector(0,0);
(847) Axis[0].v = E.GetEigenvector(1,0);
(848) Axis[1].u = E.GetEigenvector(0,1);
(849) Axis[1].v = E.GetEigenvector(1,1);
(850) Extent[0] = E.GetEigenvalue(0);
(851) Extent[1] = E.GetEigenvalue(1);
(852) }
```

In line 805 of the sample code, a call to procedure GaussPointsFit is made. Procedure GaussPointsFit is coded by lines 820 through 852 of the sample code. On lines 823 through 826 of the sample code, procedure GaussPointsFit computes the mean of all the intersections in the scaled route map. On lines 827 through 838 of the sample code, procedure GaussPointsFit computes the covariances of the intersections. On lines 839 through 851 of the sample code, procedure GaussPointsFit solves the eigensystem of the covariance matrix. This information is used in the main body of the sample code. More specifically, in line 809 of the sample code, an aspect ratio is computed. As defined herein, the aspect ratio is the ratio of the lengths of the two axes corresponding to the scaled route map, as determined by procedure GaussPointsFit. In the embodiment described by the illustrative code, the scaled route map is not reoriented if the aspect ratio is less than 1.98. If the aspect ratio is equal to or greater than 1.98, than the scaled route map is rotated so that the longest of the two axes computed by procedure GaussPointsFit lies in a predetermined direction, such as vertical. This rotation is performed by lines 814 and 815 of the sample code.

Although the above example describes the verticalization of a scaled route map, it will be appreciated that the verticalization technique is not limited to scaled route maps. Indeed, any image that has a collection of points that can be fitted by a probability distribution can be optimized for display on a viewport using the verticalization techniques.

Finding Empty Space

Figure 12:
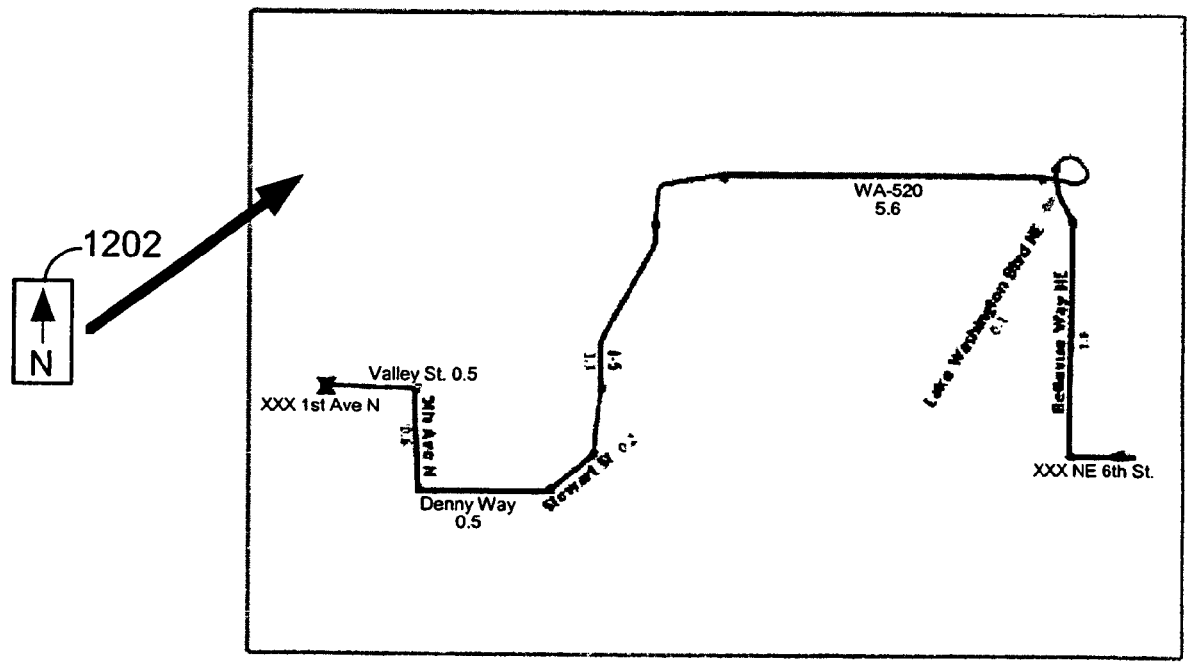
FIG. 12 illustrates a generalized problem of placing annotations on a route map.

As discussed previously, annotation module 690 (FIG. 6) is used to place landmarks and other annotations on the scaled route map in order to help guide the user. However, identifying regions of the map that are suitable for the placement of such annotations presents a special problem. Simply stated, the problem is the need to use efficient methods to identify suitable regions of the map to the place the annotations. Suitable regions are regions of the map that are not overpopulated with other objects. In FIG. 12, North arrow annotation 1202 is added to the route map to indicate direction. In one embodiment of the present invention, the placement of North arrow annotation 1202 is constrained to the upper left quadrant of the map in order to present a consistent appearance between maps. Thus, the problem posed by FIG. 12 is the identification of regions in the upper left hand corner of the route map that are suitable for the placement of North arrow annotation 1202.

Figure 13:
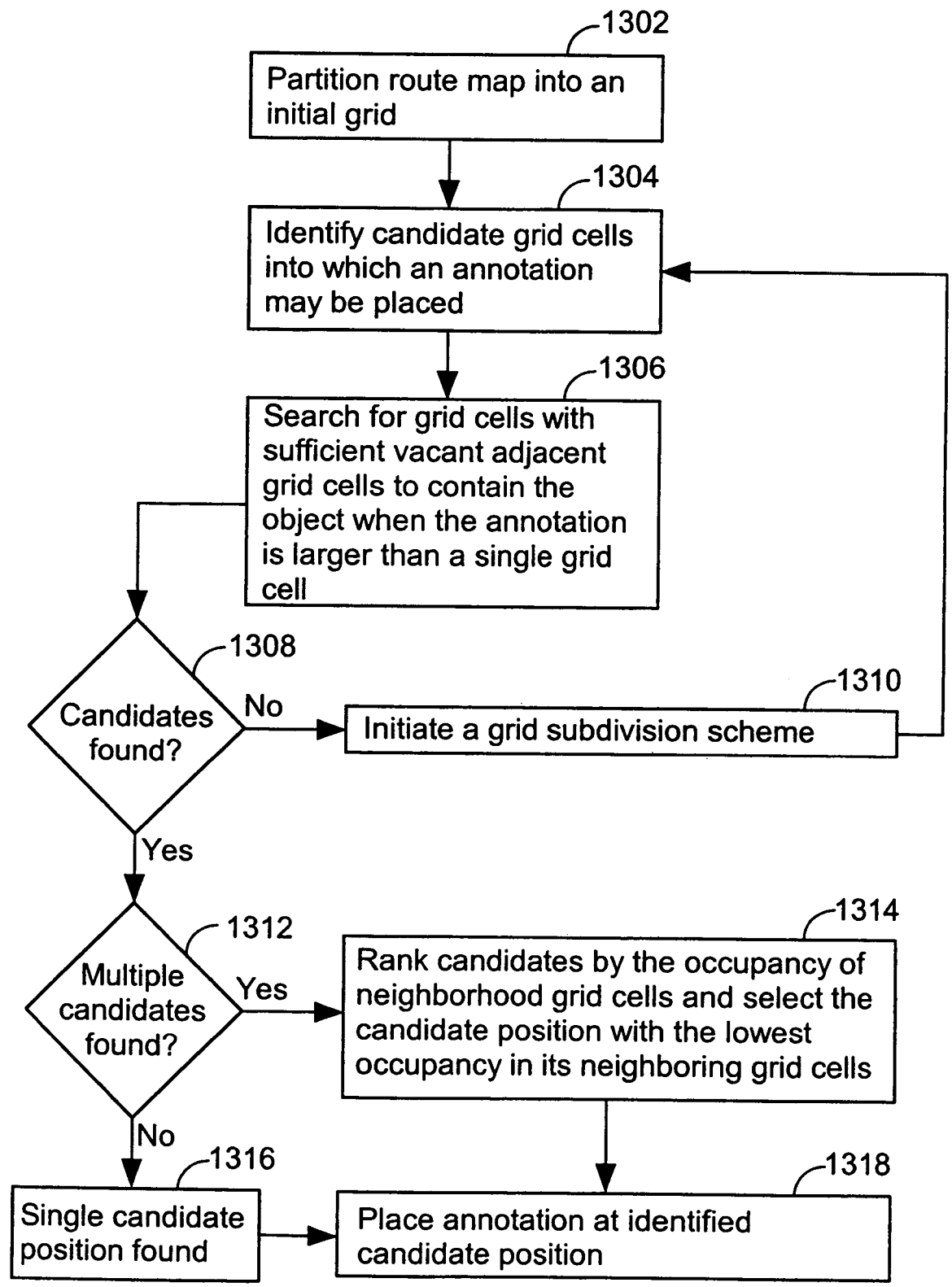
FIG. 13 illustrates the processing steps associated with one solution to the generalized problem of placing annotations in a route map in accordance with one embodiment of the present invention.

FIG. 13 details the processing steps used to efficiently identify free space in a route map in accordance with one embodiment of the present invention. This free space is used to place annotations and labels in the route map. In processing step 1302, the map is partitioned into a grid. Typically, the grid used in processing step 1302 is uniform, so that each grid cell is the same size. The number of objects in the route map that touch each grid cell produced in processing step 1302 is tracked. In this way, it is possible to determine discrete areas of the route map that have relatively few objects. In processing step 1304, candidate grid cells into which the target annotation may be placed are identified. In some embodiments, the region in which candidate grid cells are searched for is restricted to a specific region of the route map. In one example, each city label is assigned a bounding region in which the label may be placed. This bounding region is near the actual city in the route map.

When the annotation or label is larger than a single grid cell, processing step 1306 is used to search for grid cells with sufficient vacant adjacent grid cells to contain the object. If no candidates are found after search 1306 (1308-no), a grid subdivision scheme (1310) is initiated. Such a subdivision is necessary in order to search through the map at a higher resolution in order to identify a set of adjacent grid cells that can be used for the annotation or label.

Processing step 1310 is implemented using any one of several different possible grid subdivision schemes. For example, a number of schemes that have been used to partition three-dimensional space in disciplines such as ray tracing can be adopted for use in two dimensional route map space. Such schemes are found in *An Introduction to Ray Tracing*, Ed. Andrew S. Glassner, Academic Press, Harcourt Brace Jovanovich, Publishers, New York (1989). In one embodiment, the grid subdivision scheme used in processing step 1310 is a form of uniform spacial separation such as that discussed in Section 5.2 of *An Introduction to Ray Tracing* id. For example, in one uniform spacial separation grid scheme, each original grid cell is divided into four cells. In another embodiment, the grid subdivision scheme used in processing step 1312 is nonuniform spacial subdivision such as that discussed in Section 5.1 of *An Introduction to Ray Tracing* id. Nonuniform spatial subdivision techniques are those that discretize space into regions of varying size as a function of the density of objects present in the space. Thus, in a nonuniform spacial subdivision approach, portions of the route map that are more densely occupied by objects such as roads, labels and annotations, are divided into smaller grid cells than portions of the route map that are sparsely populated.

After the route map has been subjected to a grid subdivision scheme in processing step 1310, the process continues by looping back to processing step 1304. When processing step 1304 is reexecuted, a search for candidate grid cells into which the label or annotation can be placed is conducted using the grid subdivision generated in processing step 1310. Furthermore, when the annotation or label is too big to fit into a single grid cell, a search for adjacent grid cells that can collectively accommodate the label or annotation are identified. Processing steps 1304, 1306, 1308 and 1310 are repeated until a candidate position is found in the route map (1308-yes). In some embodiments, processing steps 1304, 1306, 1308 and 1310 are only repeated a predetermined number of times. If, after processing steps 1304, 1306, 1308 and 1310 have been repeated a predetermined number of times and a candidate position has still not been identified, the annotation is rejected and not placed on the route map. In some embodiments, when a label or annotation has been geometrically constrained to a particular region of the route map and no candidate position has been found in the route map, step 1304 and/or 1306 is repeated using less strict constraints. For example, when a city label is restricted to be within a fixed region of the geometric center of a city in the route map and no candidate position is identified in the fixed region during a first pass through processing steps 1304, 1306, 1308 and 1310, processing step 1304 and/or 1306 is repeated using a larger fixed region centered on the position of the city in the route map.

When processing step 1304 or 1306 identifies multiple candidate positions in which to place the target label or annotation (1312-yes), the candidates are ranked by a ranking mechanism that considers the density of objects in the grid cells that neighbor the candidate position. In some embodiments, the candidate position that has neighboring grid cells with the lowest occupancy is selected. In other embodiments, other factors in addition to the occupancy of neighboring cells in considered. For example, in some embodiments, the candidate ranking is a function of both the occupancy of neighboring cells as well as the absolute distance between the candidate position and some reference point. In such embodiments, candidate positions that are closer to a reference point are up weighted relative to candidate positions that are further away from a reference point. Such ranking embodiments are useful for city labels, road labels, and for the placement of geographical landmarks. When a single candidate position has been selected by processing step 1314, or a single candidate position has been found by processing step 1306 (1316), the annotation or label is placed at the candidate position and the process ends (1318).

Figure 14:
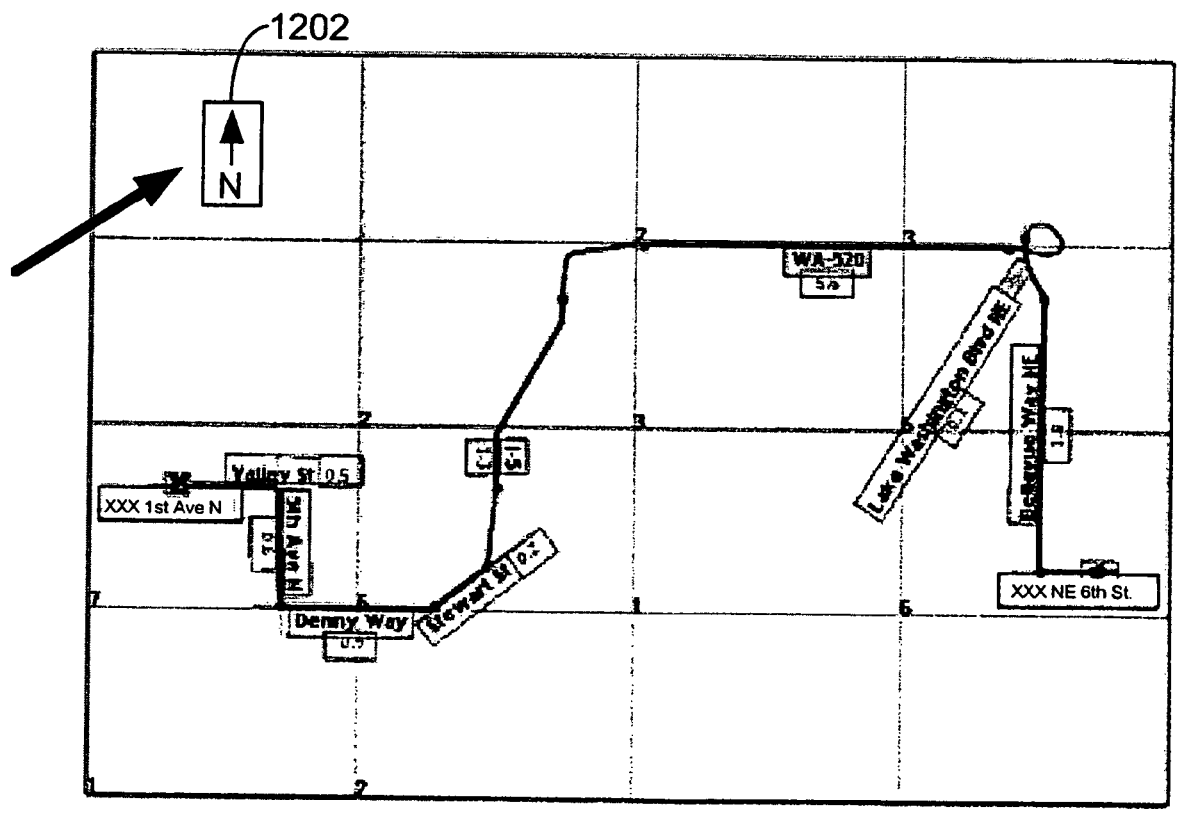
FIG. 14 illustrates the spatial subdivision of a route map in order to identify regions of the route map that are suitable for the placement of annotations as well as labels.

FIG. 14 illustrates how the spatial subdivision of a route map is used to identify grid cells suitable for the placement of North arrow annotation 1202. In FIG. 14, the route map is partitioned into a grid in accordance with processing step 1302 (FIG. 13). A candidate grid cell into which an annotation may be placed is identified in processing step 1304. In this example, step 1304 is restricted to the top left corner in order to consistently place the North arrow annotation 1202 in this region of the map. Because step 1304 successfully identified a candidate grid cell using the initial partition computed in processing step 1302, there is no need to initiate a grid subdivision scheme 1310 and repeat processing steps 1304, 1306 and 1308. Rather, North arrow annotation 1202 is placed in an empty grid cell that is bordered by grid cells having the lowest possible occupancy in accordance with processing step 1314.

Figure 15:
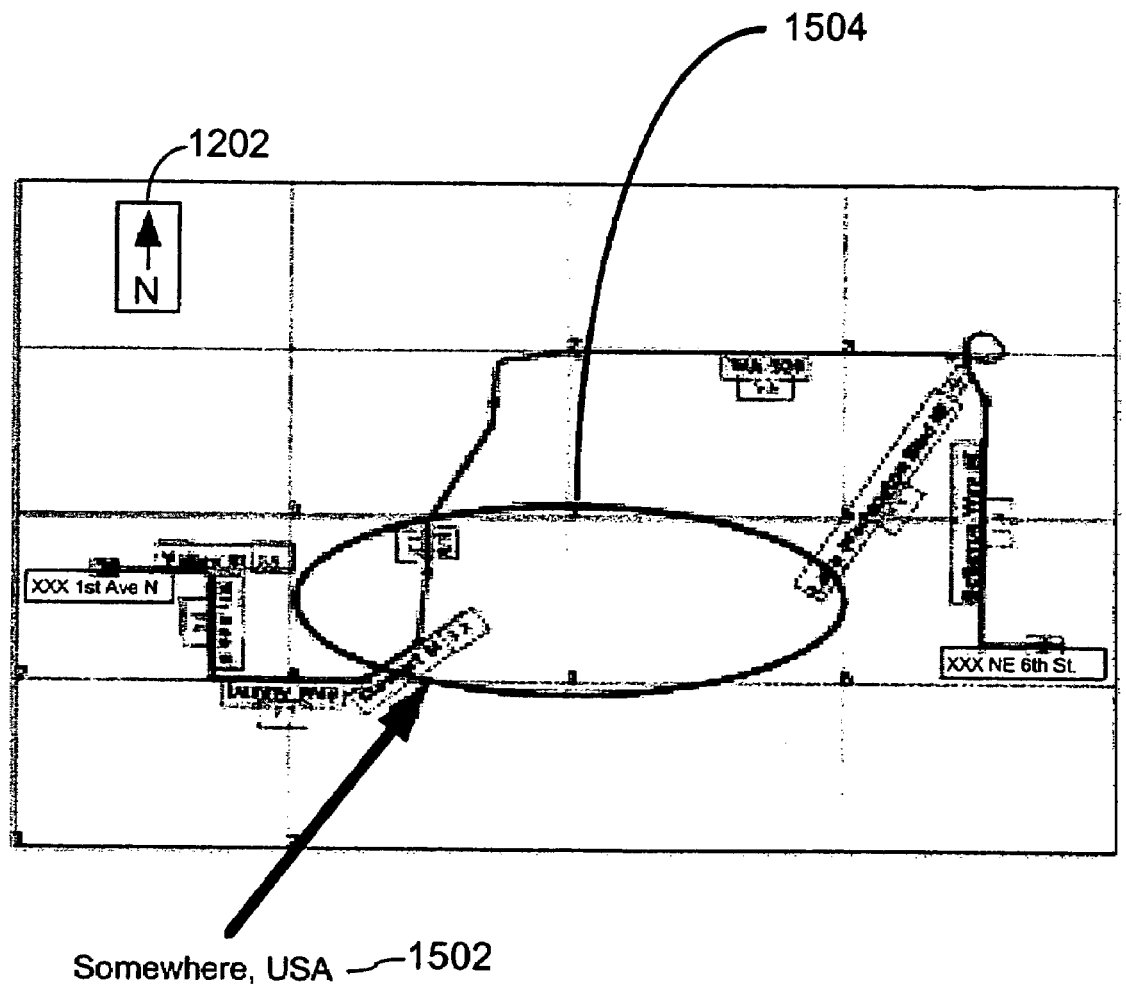
FIG. 15 illustrates a generalized problem, which arises in a spatial subdivision approach to placing a label or annotation in a constrained area, in which no empty grid cell can be found.
Figure 16:
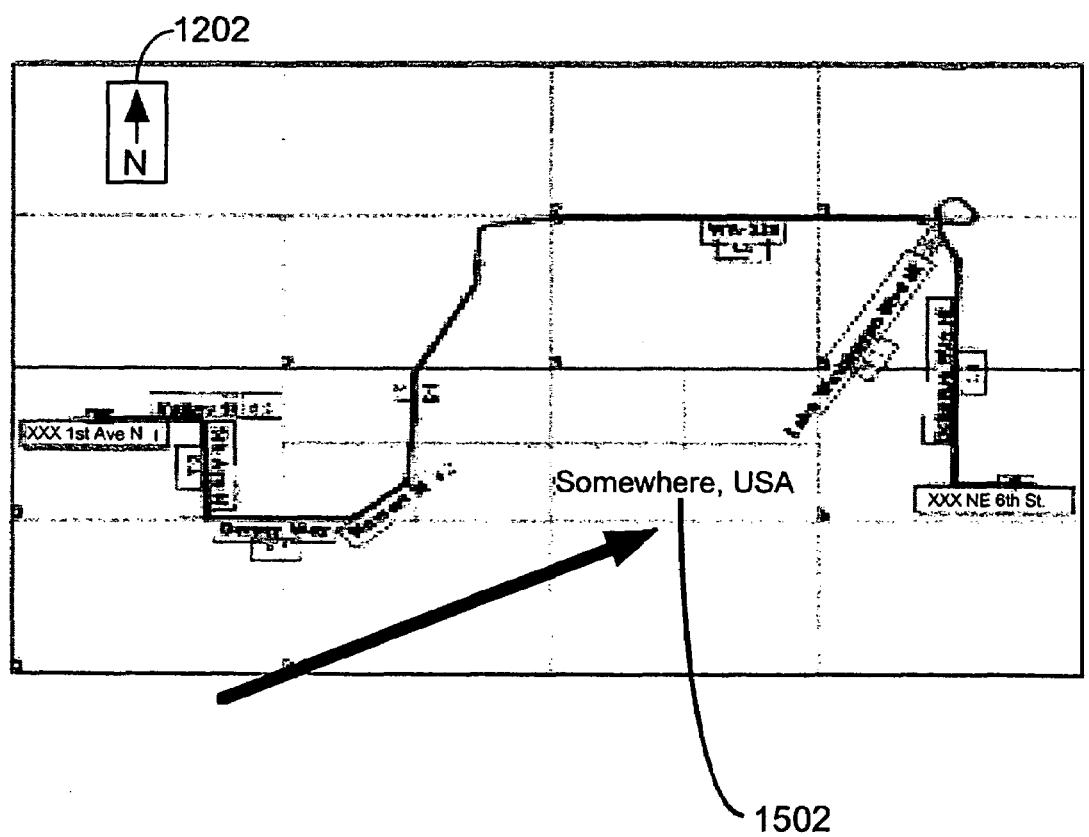
FIG. 16 illustrates how nonuniform subdivision is used to solve the problem of using spatial subdivision to place a label or annotation in a constrained area.
Figure 19A:
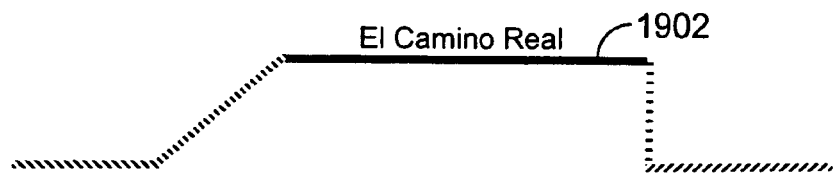
FIG. 19 illustrates the processing steps used to optimize label positions in a route map using a simulated annealing schedule that includes usage of constraint definitions, in accordance with one embodiment of the present invention.
Figure 19B:
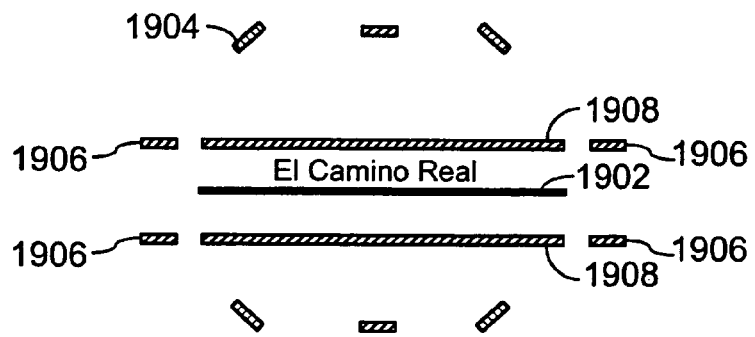
Figure 19C:
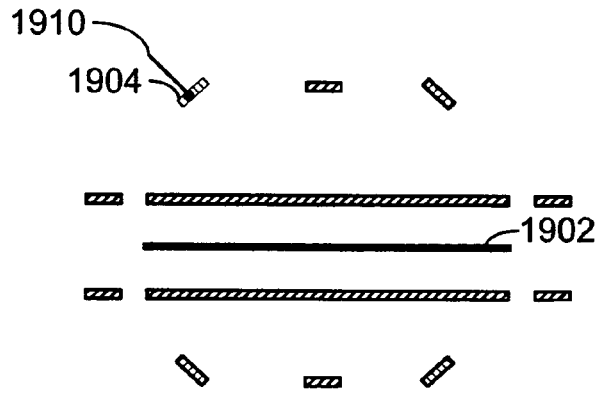
Figure 19D:
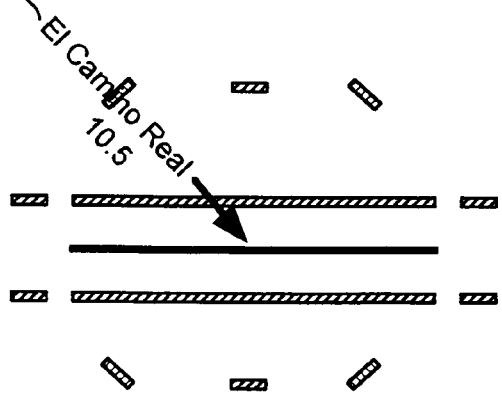

FIG. 15 illustrates a situation that arises when processing step 1304 and/or 1306 (FIG. 13) attempts to identify a grid cell or set of contiguous grid cells in a constrained area and no candidate grid cells are identified. In FIG. 15, label "Somewhere, USA" 1502 is constrained to the area identified by oval 1504. However, the initial grid generated by processing step 1302 (FIG. 13) has failed to produce a suitable candidate grid cell (1308-No). Therefore, grid subdivision scheme 1310 is executed. FIG. 16 depicts the route map after uniform spacial separation is used to subdivide only those grid cells in the constrained area of the route map. In this subdivision, each of the original grid cells in the constrained area is subdivided into four new grid cells. Then, processing steps 1304 and 1306 are repeated using the new grid scheme. Because label "Somewhere, USA" 1502 is too large to fit in the new grid cells, processing step 1304 will fail. However, when processing step 1306 is executed, a candidate position that is composed of two adjacent grid cells is identified and the label is placed at the identified candidate position (1308-Yes, 1312-no, 1316, 1318). FIG. 16 shows the placement of label "Somewhere, USA" 1502 after execution of processing step 1318.

In some embodiments of the present invention, the spatial subdivision scheme used in processing step 1310 is facilitated by the use of a hierarchical data structure known as the region quadtree. See e.g. *Applications of Spatial Data Structures*, Hanan Samet, Addison-Wesley Publishing Company, New York (1990), pp. 2-8. A region quadtree is a hierarchical data structure that is based on the successive subdivision of a bounded image array into four equal-sized quadrants. In the classical application of a region quadtree, if a given array does not consist entirely of ones or entirely of zeros, it is subdivided into quadrants, subquadrants, and so on, until blocks are obtained that consist entirely of ones or entirely of zeros. In this way, the image is subdivided using a variable resolution data structure. The region quadtree is used in some embodiments of the present invention in grid subdivision scheme 1310. In such embodiments, the grid subdivision scheme only subdivides selected grid cells in the initial grid. Typically, grid cells that are selected for subdivision are chosen from the constrained area.

Trip Tiks and Insets

In some instances, when scaling a map non-uniformly, it is difficult to make all roads visible within a given viewport. Because of this difficulty, some embodiments of the present invention include a map division module 699 (FIG. 6). Map division module 699 makes use of insets and/or triptiks when it is difficult to make all roads visible within a given viewport. Map division module 699 includes algorithms for determining when insets and triptiks should be used within a scaled route map. When a determination is made that an inset should be made, map division module decides which portion of the map should be inset, and where the inset should be placed within the main scaled route map.

Trip Tiks. When a route contains a large number of roads or segments, it may not be possible to scale all the roads so that they are large enough to be readable and yet within the image size. In this situation it is desirable to break the scaled route map up into several separate segment maps. In one embodiment of the present invention, map division module 699 uses the following algorithm to determine whether a scaled route map should be split into a set of segment maps:

- generate an intermediate map that includes each road (element);
- define a maximum number of elements (M) allowable in any given map; and
- when a map contains S roads (elements), where S>M, then divide the map uniformly into N segment maps such that N>=S/M.

However, in some instances additional issues are considered. One such issue is the means by which the main route in the route map is connected across a plurality of segment maps. Various methods for depicting such connectivity information in some embodiments of map division module 699 include:

- use of a special connection point icon at the endpoint of the last road on a first segment map and use of the same special connection icon at the start point of the first road on the subsequent segment map; and
- sharing some roads between each pair of successive segment maps.

In addition, connectivity between successive segment maps is insured by preserving the shape of the main route and in particular the shape of any shared roads across successive segment maps. To insure that the shape of shared roads across successive segment maps remains exactly the same in each segment map, shape simplification is preferably done for the entire route in the intermediate map as a whole, as opposed to separately in segment maps.

Figure 26:
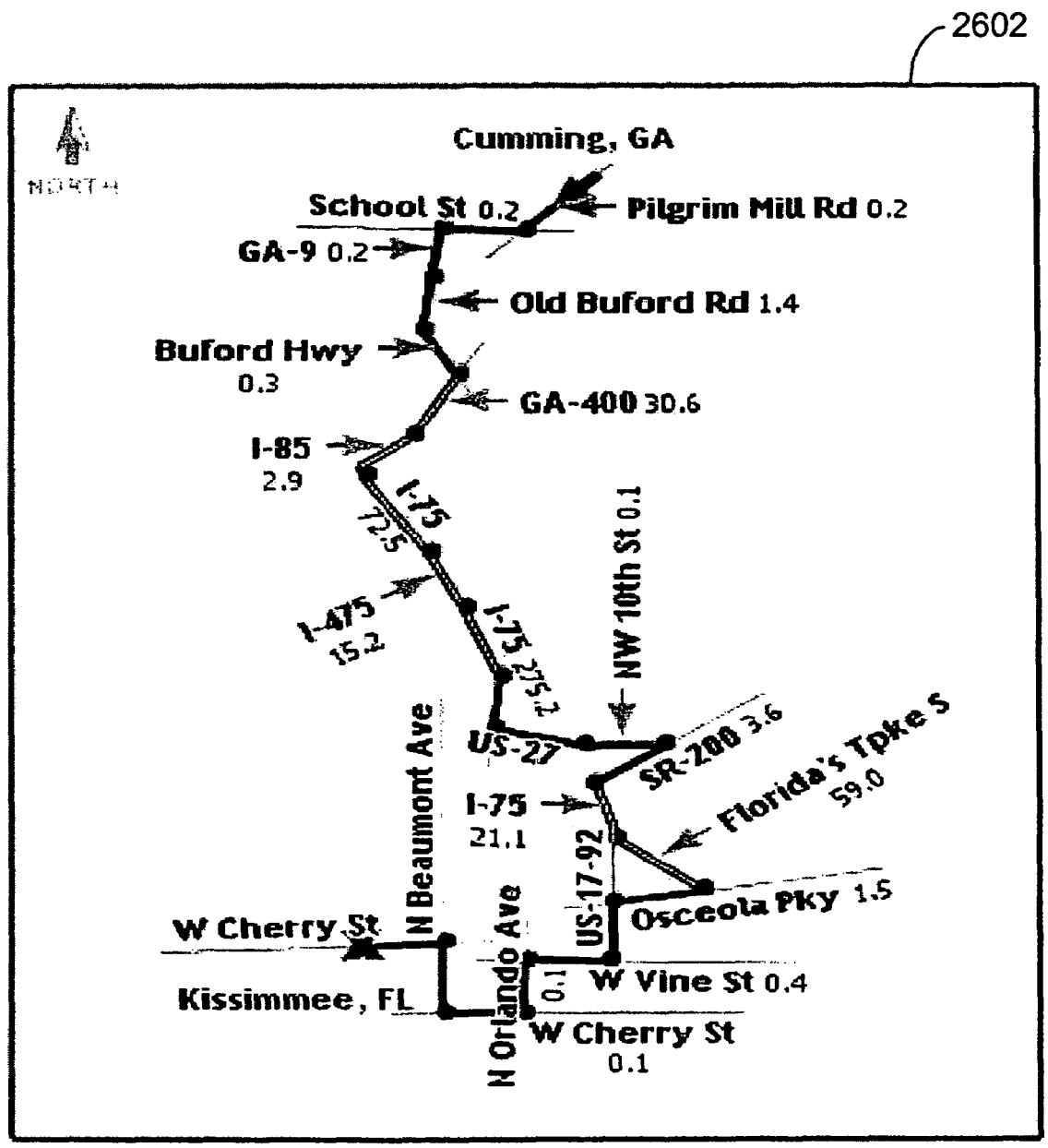
FIG. 26 illustrates a cluttered route map that would be difficult to use while driving.
Figure 27:
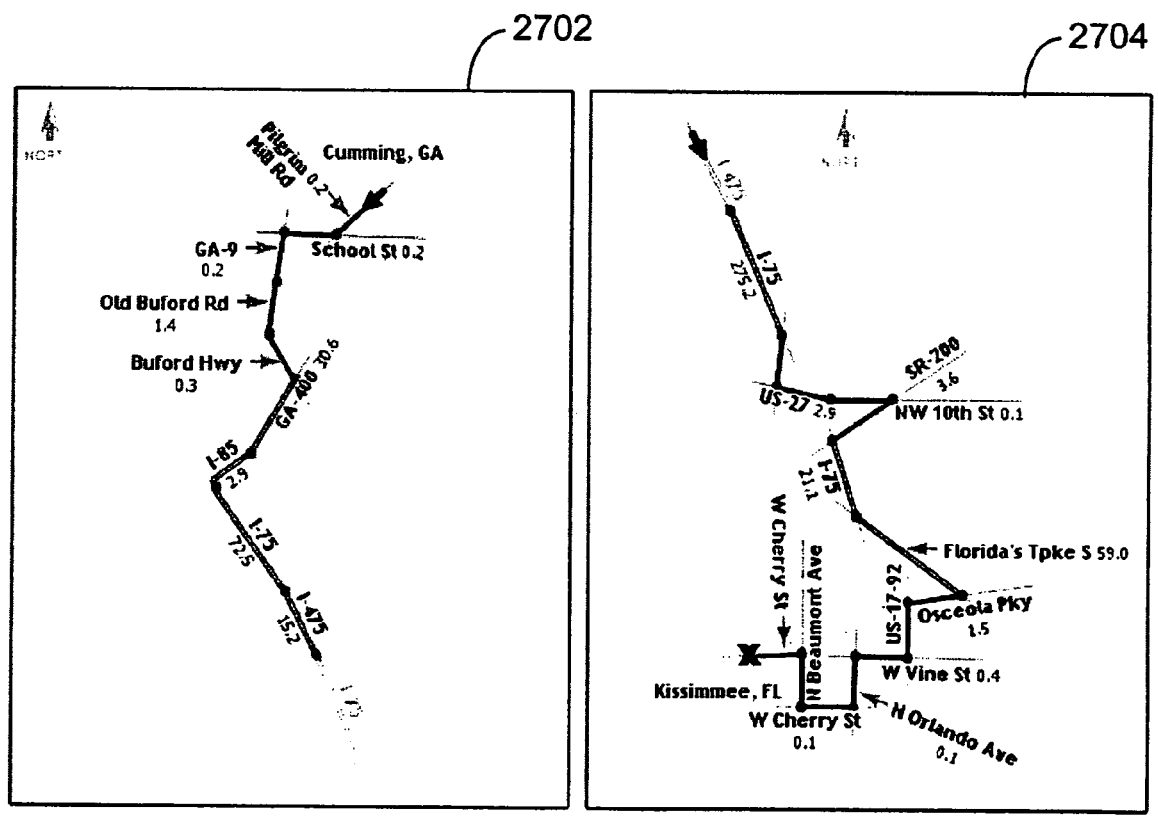
FIG. 27 illustrates the route map of FIG. 26 split into two segment maps which, taken together, comprise the route map of FIG. 26.
Figure 28A:
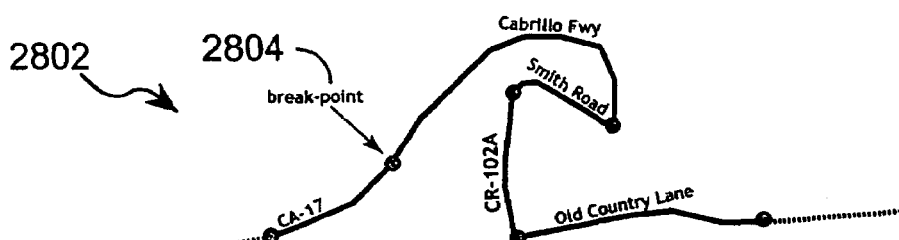
FIGS. 28A, 28B, 28C and 28D illustrate various intermediate and segment maps in accordance with one embodiment of the present invention.
Figure 28B:
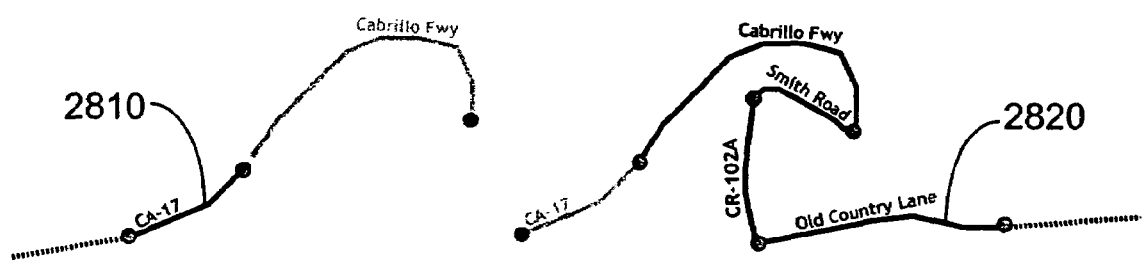
Figure 28C:
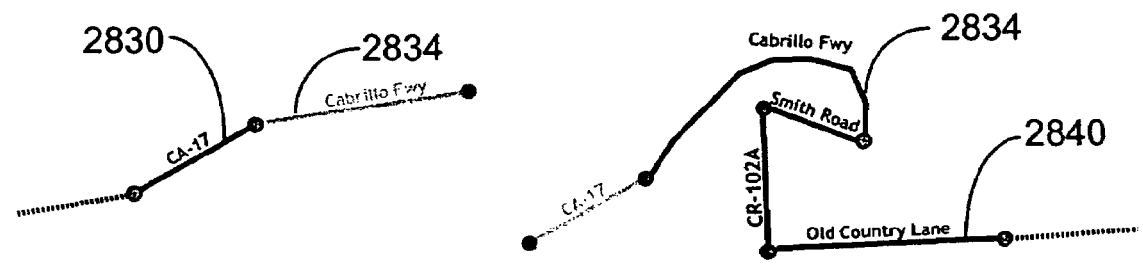
Figure 28D:
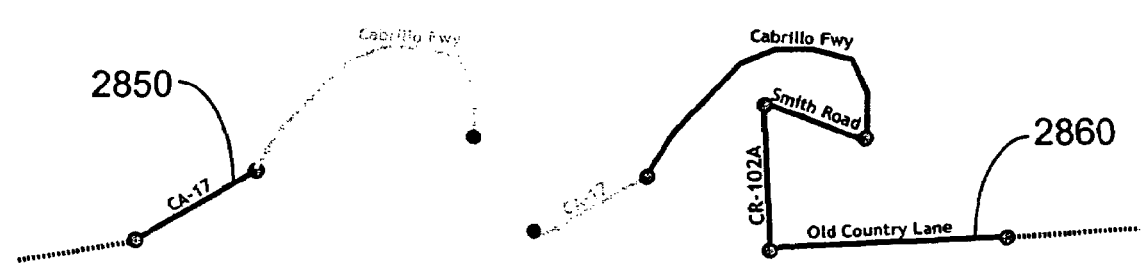

The problems map division module 699 is designed to alleviate and the algorithms used in some embodiments of map division module 699 are illustrated with reference to FIGS. 26 through 28. FIG. 26 describes an entire route in a single image 2602. Although the entire route is visible, the map is very cluttered and would be difficult to use while driving. Furthermore, if the route had more roads (elements) it would not be possible to label all of the roads on the route. FIG. 27 splits image 2602 (FIG. 26) into two separate segment maps 2702 and 2704 which, taken together, comprise the route map of FIG. 26. The directions in segment maps 2702 and 2704 are more readable and comprehensible than the corresponding directions in image 2602.

Turning to FIG. 28, the importance of preserving shape of shared roads across successive segment maps is illustrated. In FIG. 28A, an intermediate map 2802 that is about to be split into two segment maps at breakpoint 2804 between element "CA-17" and "Cabrillo Freeway" is shown. In FIG. 28B, intermediate map 2802 has been split into segment maps 2810 and 2820. Both segment maps 2810 and 2820 have full shape. In contrast, in FIG. 28C intermediate map 2802 has been split into segment maps 2830 and 2840 that do not retain the original shape of intermediate map 2802. That is, in FIG. 28C, the route shape has been simplified separately in segment maps 2830 and 2840. As a result, element 2834 "Cabrillo Fwy" has different shape in segment maps 2830 and 2840. FIG. 28C represents an undesirable representation of the overall route corresponding elements in successive segment maps, i.e. "Cabrillo Fwy" have different shape. A more desirable situation is represented in FIG. 28D. In FIG. 28D, route shape simplification is performed on the intermediate map 2802 prior to splitting the intermediate map into segment maps 2850 and 2860.

Some routes, termed multi-segment routes, contain multiple way points between the start point and the end point of the main route. Multi-segment routes are handled much like trip tiks in one embodiment of the present invention. Accordingly, the multi-segment route is split into separate segment maps at each way point: the first image shows the route from the start point to the first way point, the second image shows the route from the first way point to the second way point, etc. With multi-segment routes, the same convention of repeating a connection icon, in this case a way point icon, and/or a set of shared roads is used across successive maps. Moreover, simplification preferably occurs before splitting the route so that the shape of each road and the overall shape of the route do not change in each image.

Insets

Figure 29:
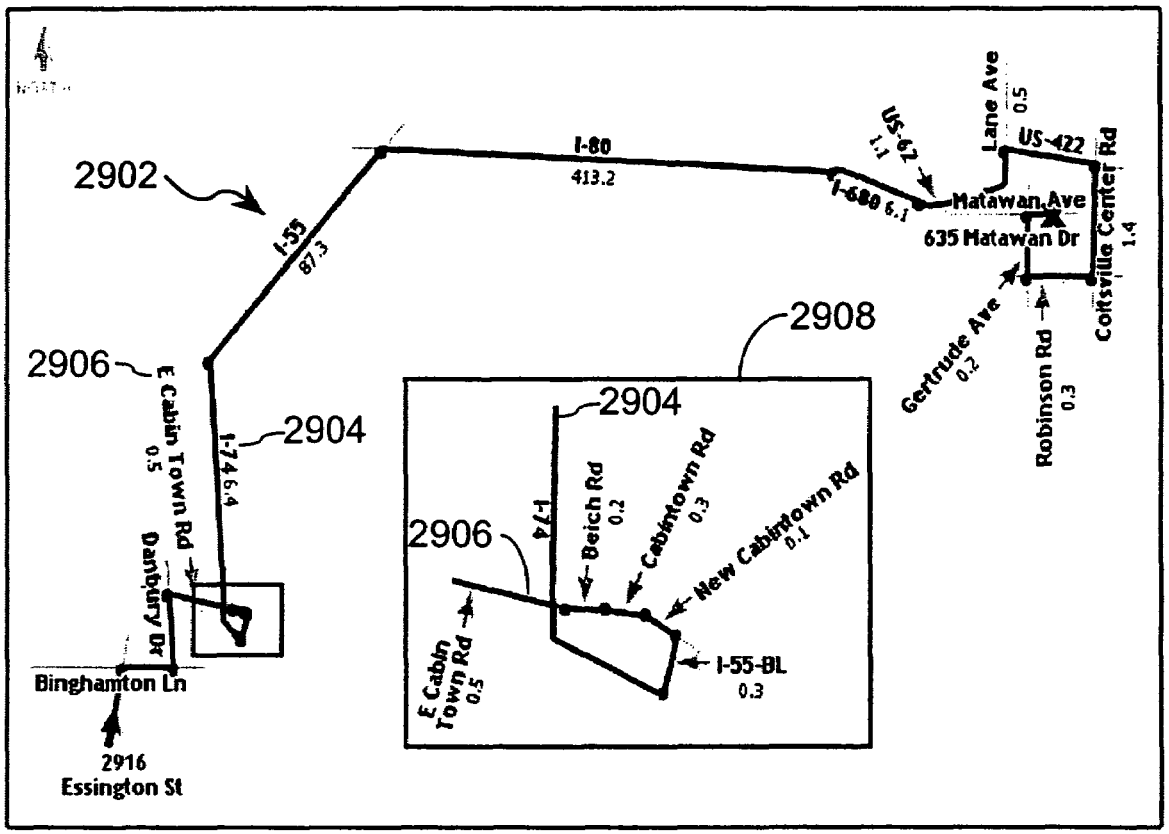
FIG. 29 illustrates a scaled route map with a corresponding inset in accordance with one embodiment of the present invention.

In the map rendering phase two goals are optimized. The first goal is to ensure that all roads in the route map are large enough to be legible. The second goal is to maintain the overall shape of the route, as well as the position of all intersection points between roads. Despite the flexibility in scaling roads provided by the present invention, it is difficult to attain both goals for some routes in a single image. FIG. 29 illustrates how it is sometimes difficult to fully optimize for both goals. In the scaled route map 2902 depicted in FIG. 29, it is readily apparent that:

1) Some roads remain very small in order to maintain the overall shape, or to maintain intersection points. Legibility has been sacrificed in favor of minimizing shape and topological distortions.

2) The scaling of many small roads causes the overall shape of the route to distort severely. In this case, overall shape has been sacrificed in order to maintain legibility.

Figure 30:
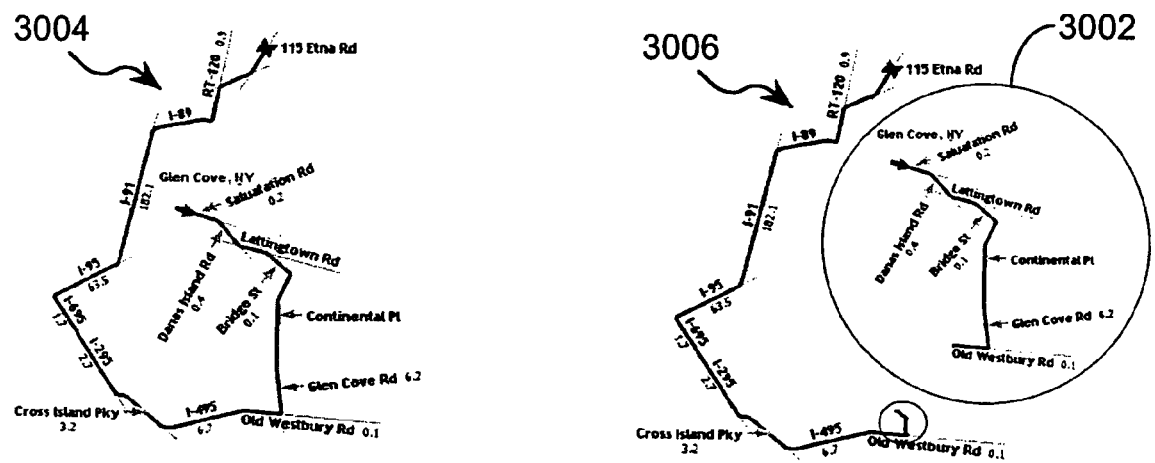
FIG. 30 illustrates how the use of an inset can be used to avoid the circularization of a predominantly North-South or East-West route map in accordance with one embodiment of the present invention.
Figure 31:
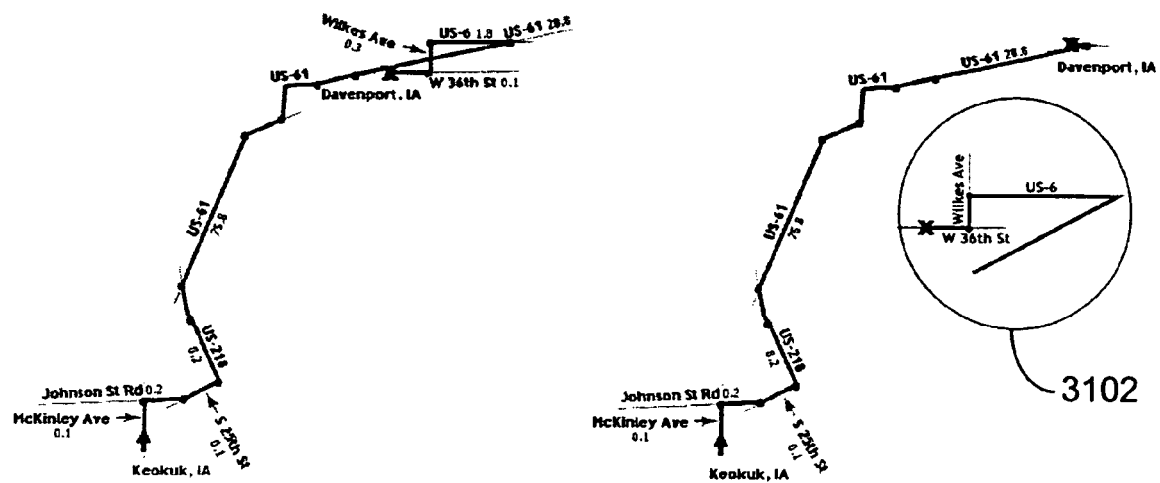
FIG. 31 illustrates how the use of an inset can be used to associate legible labels to roads that do not have legible labels in a corresponding main route map, in accordance with one embodiment of the present invention.

3) The scaling of short roads so they are legible causes a false intersection. In this case, overall topology has been sacrificed to maintain readability One solution for such routes is to find the set of roads that must remain small to maintain topology or intersection points and to show them in a separate inset image. For example, in FIG. 29, to maintain the intersection between I-74 (2904) and E. Cabin Town Rd (2906) all the roads between the two roads are kept very short. By including inset 2908, however, it is possible to enlarge the labels of the roads between 2904 and 2906 and label these intermediate roads as well. Additional examples of scenarios in which insets are beneficial are provided with reference to FIGS. 30 and 31. In FIGS. 30 and 31, short roads that cause distortion or false intersections are placed at an enlarged size in circular inset 3002 and 3102 respectively. By placing short roads in an enlarged inset, the corresponding roads can be shorted in the main scaled route map to the point where the overall shape distortion of the route is acceptable or the false intersection is avoided. In one embodiment, the inset image is created by running the entire map layout algorithm coded by road layout module 686 on just the roads in the inset. Roads that are shown in the inset and are too small to label in the main scaled route map are labeled only in the inset. Furthermore, in one embodiment, a unique boundary is placed around the inset region in the main route map and the same unique boundary is placed around the corresponding inset image to help the navigator correlate insets to the main route map. Moreover, the inset image is placed close to the feature of the main map it depicts. In FIG. 30, the route shown in map 3004 is in fact almost entirely North-South. However, the scaling of the small roads at the end of the route has made the route appear to be almost circular. This is an example of severe shape distortion that is possible on such route maps after individual roads in the route have been scaled. Using inset 3002, small roads are kept at their original size in main map 3006, thus preserving a proper overall North-South orientation. Simultaneously, the small roads are enlarged in inset 3002 to make them legible in the insert. In FIG. 31, the scale of smaller roads such as "US-6", "W. 36th Ave", and "Wilkes Ave" so that they are legible has introduced a false intersection between "Wilkes Ave." and "US-61" in the route map. By using inset 3102 the three roads can be grown to be large enough to be visible without introducing the false intersection.

In one embodiment of the present invention, there are three steps to creating an inset. First a determination is made as to which, if any, roads to place in an inset, second the image size of the inset is determined and finally, sufficient space to place the inset in the main map image near the inset feature is identified. With this overview of the process in this embodiment, the three steps will now be described in more detail.

Selecting inset roads. The process begins by attempting to layout all the roads in a single route map without insets. After the initial layout a search is made for sets of roads that are very short (in pixel size) as well as tight intersection loops. A check is also made to determine if there is excessive shape distortion in the overall shape of the route by checking how well the orientation vector between the start and destination point of the overall route is maintained. If it is not well maintained, a search for adjacent sets of short roads, such as in a mile length of the main route, that were grown excessively and are in the direction of the distortion is made. Such sets of short roads are placed in an inset and the main route map is re-scaled so that the excessively grown roads are reduced to a more accurate scale. Finally a search for false intersections is made. All roads in the loop created by the false intersection are placed in the inset and the roads in the loop are re-scaled in the main route maps to remove the false intersection.

Inset image size. The size of the inset is chosen by first estimating the aspect ratio for the set of roads that will appear in the inset using the same procedure as described for choosing layout templates. This gives an aspect ratio for the inset image. Next a scale factor for the inset image is chosen. The scale factor can be set a priori as a fixed number (i.e. 100 pixels) or can dynamically be computed as a scale factor based on the number of roads to appear in the inset (i.e. the scale factor equals thirty times the number of roads in inset). Then, the pixel size of the inset image is simply the scale factor multiplied by the aspect ratio.

Placing an inset in a scaled route map. It is desirable to place the inset in the main map image without overlapping any of the objects in the main image. Thus, the inset should be placed close to the feature of the main map it depicts so that the navigator understands the relationship of the inset to the main map. A search is made for empty space in the main map image using the techniques described for finding empty space. The search begins in the main image grid cell containing the features shown in the inset and spirals around the image from this cell until free space large enough to show the inset is found.

Road Shape

In another aspect of the present invention, novel algorithms for simplifying the shape of a route are used. Most roads can be immediately simplified to straight lines and this is in fact perceptually preferable. However, some roads must maintain some curvature and the orientation and layout of intersections between two roads must be kept true to reality. In some embodiments of the present invention, road shape simplification is not implemented. Rather, each road in the route (or path) is specified as a single linear segment. In embodiments in which road simplification is applied, the route map is processed by road simplification module 697 prior to execution of road layout module 686. Rather than treating each road as a single linear segment, road simplification module 697 considers each road as a piecewise linear curve, i.e. by a set of (lat,lon) shape points connected by linear segments. The goal of road simplification module 697, then, is to reduce the number of shape points in each road thereby simplifying the roads.

Figure 32A:
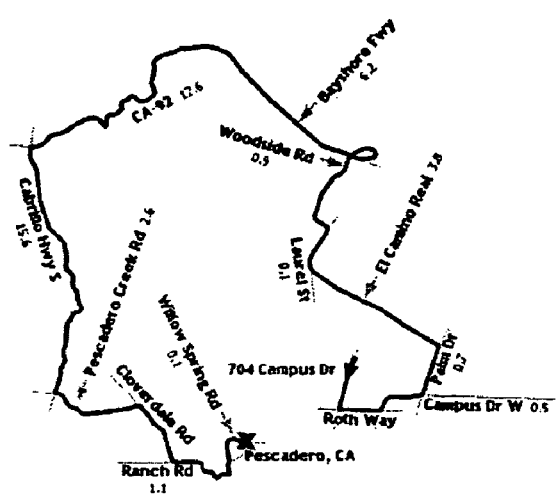
FIG. 32A illustrates a route map before curve (road or element) simplification and FIG. 32B illustrates the route map of FIG. 32A after curve simplification, in accordance with one embodiment of the present invention.
Figure 32B:
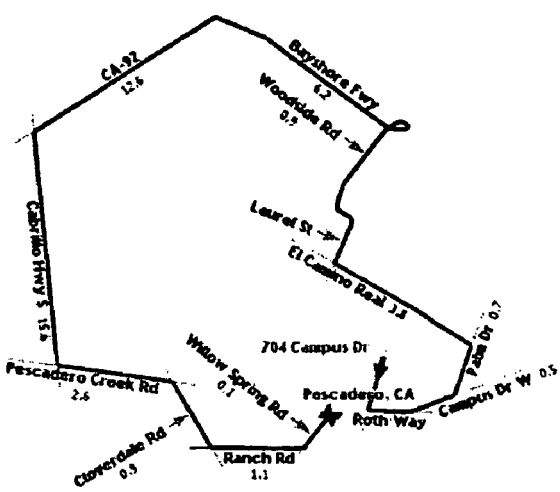
Figure 33A:
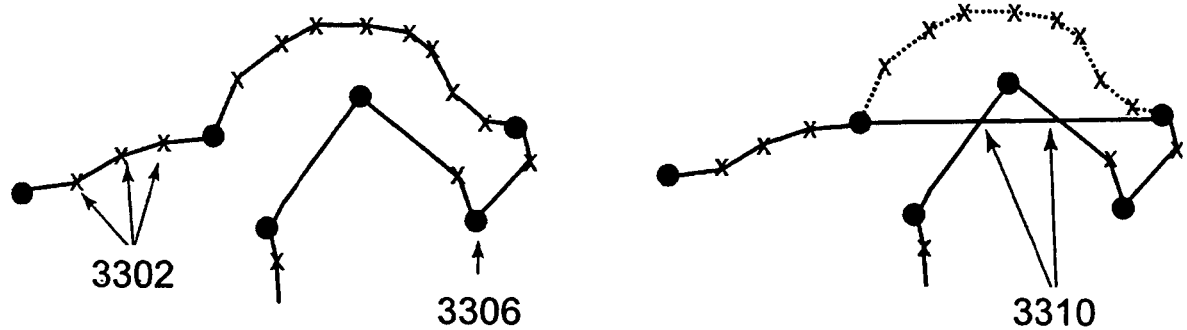
FIGS. 33 illustrates how road simplification can introduce false intersections (33A), missing intersections (33B), and inconsistent turning angles (33C).
Figure 33B:
Figure 33C:
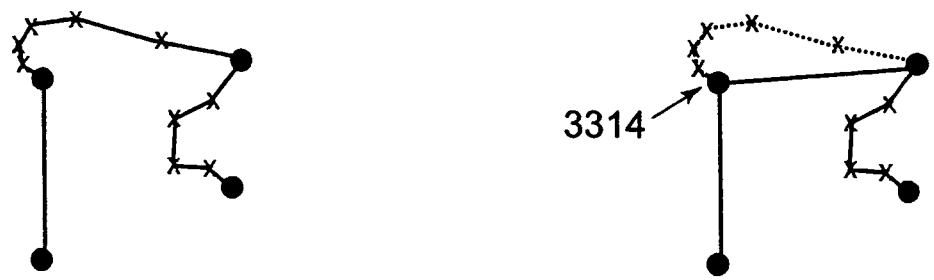

There are two main reasons to simplify each road in a road map. The first and most important reason is that roads with simpler shape are perceptually easier to interpret as separate entities, and the resulting route map has a cleaner, uncluttered look. See FIG. 32 for a comparison of the same route without (FIG. 32A) and with (FIG. 32B) curve simplification. Second, simpler roads containing fewer segments require less memory and are faster to process by road layout module 686 in the subsequent layout stages. For example, to compute the intersection of two roads requires looking for an intersection between each pair of segments in each road. With fewer segments per road this operation becomes much faster.

Figure 34:
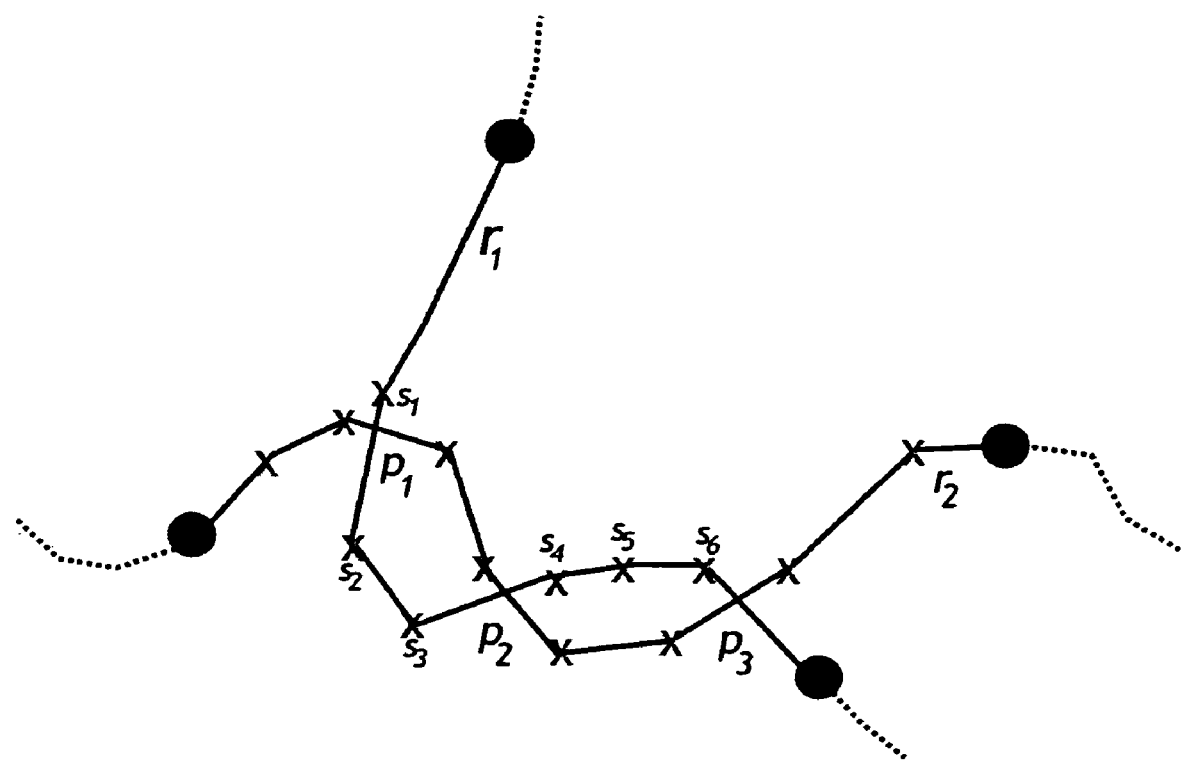
FIG. 34 illustrates how a road is treated as a set of shape points (s) into which intersection points are introduced, in accordance with one embodiment of the present invention.

Avoiding False/Missing Intersections. In one embodiment, before simplifying roads, road simplification module 697 computes all the intersection points between each pair of roads. Consider the situation where roads $r_1$ and $r_2$ intersect at the points $P_1$, $P_2$ and $p_3$ in FIG. 34. Road simplification module 697 inserts each intersection point into the set of shape points for both $r_1$ and $r_2$, and marks these intersection points as retained, as shown in FIG. 34. More specifically, the original sequence of shape points for $r_1$ is ($s_1$, $s_2$, $s_3$, $s_4$, $s_5$, and $s_6$). Three new intersection points are inserted into this sequence, one for each intersection, resulting in the sequence ($s_1$, $p_2$, $s_2$, $s_4$, $p_2$, $s_4$, $s_5$, $s_6$, and $p_3$). Similarly, these intersection points are inserted into the sequence for $r_2$ as well. Since these intersection points can no longer be removed, the simplification algorithm cannot cause any missing intersections. Moreover, road simplification module 697 maintains a separate list of all the true intersection points between roads. In subsequent stages, simplification algorithm module 697 only accepts removal of one or more shape points if the removal does not create a new intersection point (i.e. an intersection point is not in the original intersection points list). In this way module 697 ensures that simplification does not generate any false intersections.

Figure 35:
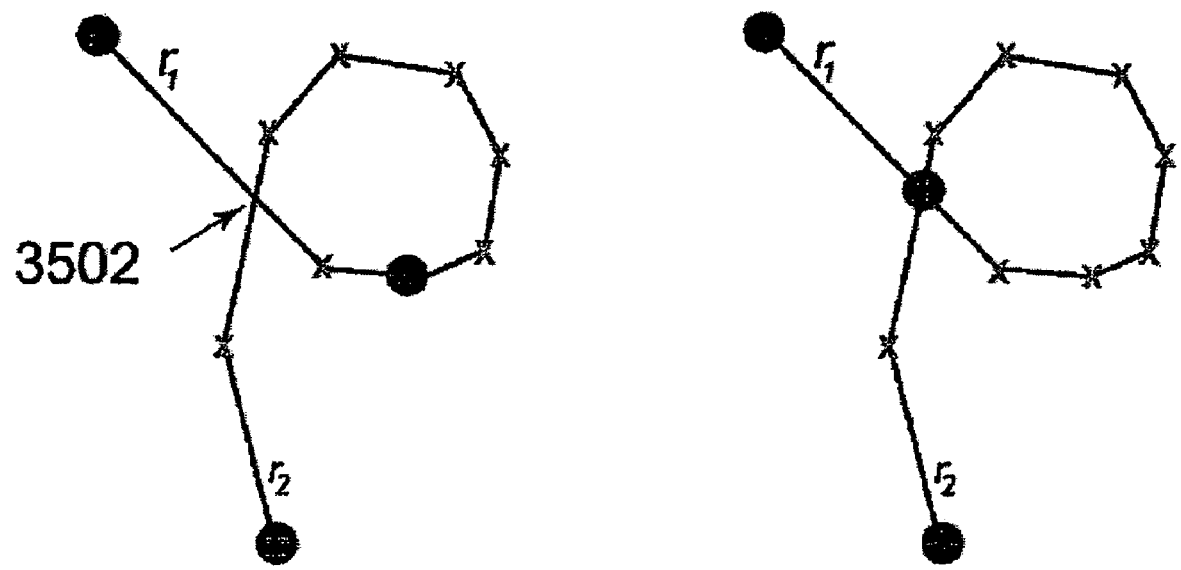
FIG. 35 illustrates the intersection of roads $r_1$ and $r_2$ at a point 3502.

In some embodiments of the present invention, data cleanup is performed after intersection points have been marked as retained. Most roads depicted in a route map intersect with at least two other roads: the previous road in the route at the road's start point and the next road in the route at the road's end point. These intersections are called "turning points" rather than "intersections." At a turning point, the navigator switches from following one road to following a different road. The term "intersection" is used to refer to all other intersections between roads. At intersections, the road being followed does not change. It is extremely rare for two adjacent roads along the route to join at both a turning point and also intersect with one another in a separate location. If they did, the navigator would have turned onto the second road at the earlier intersection rather than the turning point (see FIG. 35). However, some highway on- and off-ramps are exceptions to this rule. Consider some road A that connects to a ramp which then passes under road A. From the two dimensional overhead perspective of the route map, the ramp intersects road A and then goes on to connect with the highway. Module 697 forces such ramps to be like the other roads by moving all the shape points between the turning point and the intersection point in road A into the ramp. Then road layout module 686 assumes that adjacent roads never intersect one another and thereby the costly intersection computation between these roads is avoided. Also, when the circular ramp is scaled by road layout module 686, the entire circle is scaled as a unit thus avoiding concerns about properly placing the intersection between the ramp and the previous road.

Choosing Points to Remove/Retain from non-ramps. For roads that are not ramps, a very aggressive protocol is used by road simplification module 697 to smooth such roads. For a given road in the route, the module initially marks every shape point except the first, last, and any intersection points as removed. A pointer to the second shape point and the second to last shape point is maintained. Then, a check is made for false intersections. If a false intersection is found, both the second and second to last shape point is marked as retained. Further, the pointers are moved to the next innermost shape points. If a false intersection is not found, or the pointers cross over one another, the false intersection check ends.

After performing a false intersection check, a check is performed to identify inconsistent turning angles at the turning point between the previous road and the current road. Various embodiments of road simplification module 697 use one of two alternative methods for detecting inconsistent turn angles with respect to the coordinate system oriented along the last segment of the previous road. The two methods are shown in FIGS. 36A and 36B respectively.

In the first method (FIG. 36A), a vector between a current shape point and the previous shape point is formed. The vector is then compared to the vector between the previous shape point and the last shape point. If the vectors are not in the same half-plane, or some other predetermined number of degrees such as quadrants, with respect to the coordinate system defined by the last segment of the previous road, then road simplification module 697 retains this shape point and continues checking at the next shape point.

In the second method (FIG. 36B), a vector is formed between the first shape point and the current shape point. This vector is compared to the vector between the current shape point and the last shape point. If the vectors are not in the same half-plane, or some other predetermined number of degrees such as quadrants, with respect to the coordinate system defined by the last segment of the previous road, then the shape point is retained and the method continues by checking at the next shape point.

Figure 36A:
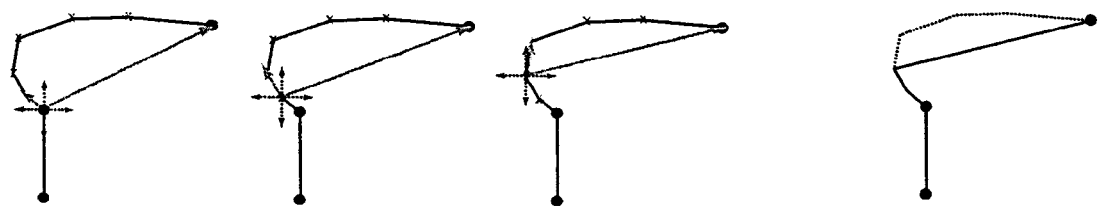
FIGS. 36A and 36B respectively illustrate two different methods for identifying shape points to remove or retain from roads in a road map that are not part of a ramp, in accordance with one embodiment of the present invention.
Figure 36B:
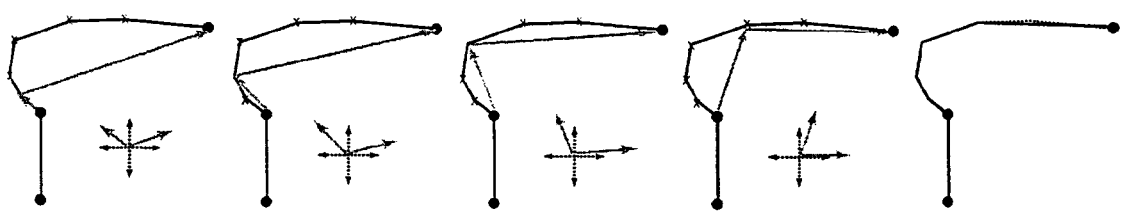

Both the method of FIGS. 36A and 36B loop through the set of shape points from first to last and perform simple angle checks to determine whether or not the shape point should be retained. The first method (FIG. 36A) tends to retain fewer shape points than the second (FIG. 36B). In some embodiments of road simplification module 697, the two methods are combined by running the first and then the second and then retaining all the shape points up to some average of the two results. A similar turning angle consistency check is performed by road simplification module 697 at the turn between the current road and the next road.

Figure 37:
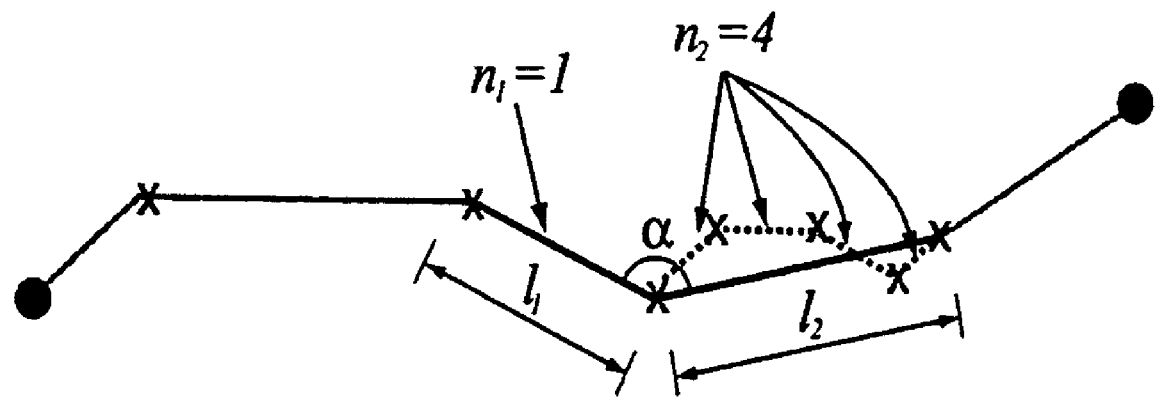
FIG. 37 illustrates aspects of shape points in a ramp that are measured in order to evaluate a relevance of a particular shape point in a ramp in a route map during a simplification process, in accordance with one embodiment of the present invention.

While detailed shape information is not necessary for following most roads, highway on and off ramps are an exception to this rule. Knowing whether a ramp curves back around to form a cloverleaf or if it bends only slightly can make it much easier to figure out how to get on and off the highway. Therefore simplification algorithm module 697 uses a different simplification criteria for highway on/off ramps than for the other roads in the route. For ramps, road simplification module 697 performs a more detailed shape analysis during simplification. At each interior shape point, the lengths of the two adjacent segments, and the angle between them is considered, as shown in FIG. 37. In FIG. 37, for a given shape point, the two segments adjacent to the shape point have lengths 11 and 12, α is the angle between these two segments, and $n_1$ and $n_2$ are the number of unsimplified segments that are represented by each of the current segments. A relevance measure for the shape point is computed as:

$$\text{relevance} = \left[ \frac{(180 - \alpha)}{\frac{l_1}{n_1} + \frac{l_2}{n_2}} \right]$$

The higher the relevance measure the more important it is to retain the point. Road simplification module 697 defines a tolerance value; and if there is at least one shape point with relevance<tolerance, the shape point with the lowest relevance is marked as removed. Then, the relevance for all of the remaining shape points is recomputed; and if possible, another shape point is removed. This process is repeated until all the shape points have a relevance larger than the tolerance or all of the remaining shape points are marked as retained.

Figure 38:
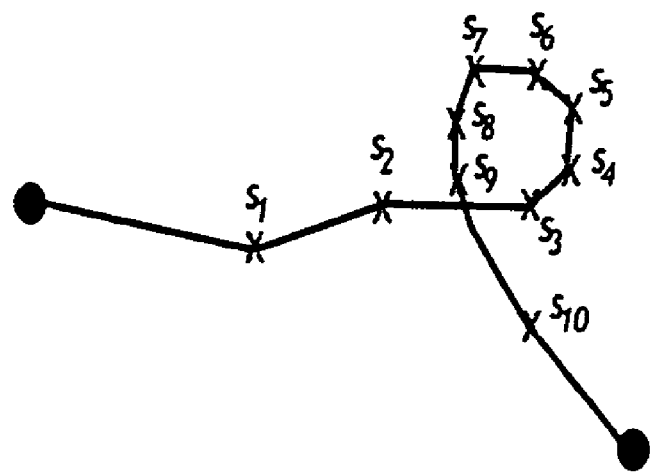
FIG. 38 illustrates shape points in a ramp in a route map, in accordance with one embodiment of the present invention.

The relevance measure is based on two observations. First, sharper turning angles are more important than shallow turning angles. Since we measure the smallest angle, α, between adjacent segments, we use 180-α in the numerator of the relevance measure to give higher relevance to the sharper angled roads. Second, for ramps, turns between shorter segments tend to be more important than turns between longer segments (see FIG. 38). Thus, the denominator is the sum of the two adjacent segments. However, it will be appreciated that removing a shape point causes a segment to become longer. Therefore if the algorithm were to simply divide by the sum of the adjacent segment lengths as the process continued simplifying the ramp, the relevance measures of the remaining shape points would tend to decrease. Thus, the lengths of the adjacent segments are normalized by the number of unsimplified segments the current segment replaces.

Dropping ramps. Entering or exiting most highways requires taking a short on or off ramp. For long routes (i.e. fifty miles or longer) that include many highways, showing all the short ramps can clutter the map with unnecessary detail. However, some ramps, particularly near the beginning or end of the route, can be very important for understanding how to follow the route. Therefore, some embodiments of road simplification module 697 includes a set of heuristics for evaluating the importance of a ramp. When a given ramp does not satisfy this set of heuristics, the ramp is dropped. In one embodiment, this set of heuristics is as follows:

1. Between highway ramps. Ramps between two highways are less important than those between small roads and highways.

2. First/last ramp. Never drop the first and last ramps on the route since they are likely to go between smaller, local roads and the highway.

3. Short routes. Keep all the ramps for routes smaller than a predefined length cutoff (i.e. 50 miles) or step cutoff (i.e. 20 steps).

4. Long ramps. Keep ramp if it is longer than some pre-specified minimum ramp length (i.e. 0.1 miles).

5. Short road before/after ramp. If the road immediately before or after the ramp is shorter than some pre-specified length (i.e. 0.5 miles) keep the ramp.

As in road simplification, the three main problems that road simplification module 697 seeks to avoid when dropping ramps are the introduction of false intersections, missing a true intersection, and the creation of inconsistent turns. To avoid false and missing intersections the same approach found in the previously described road simplification process is used by road simplification module 697. First the set of intersection points between each pair of roads is precomputed. Before allowing a ramp to be removed, a check is made to determine whether removal will add a false intersection to the intersection list, or cause a true intersection to be missed; and if so, the ramp is not removed.

Figure 39:
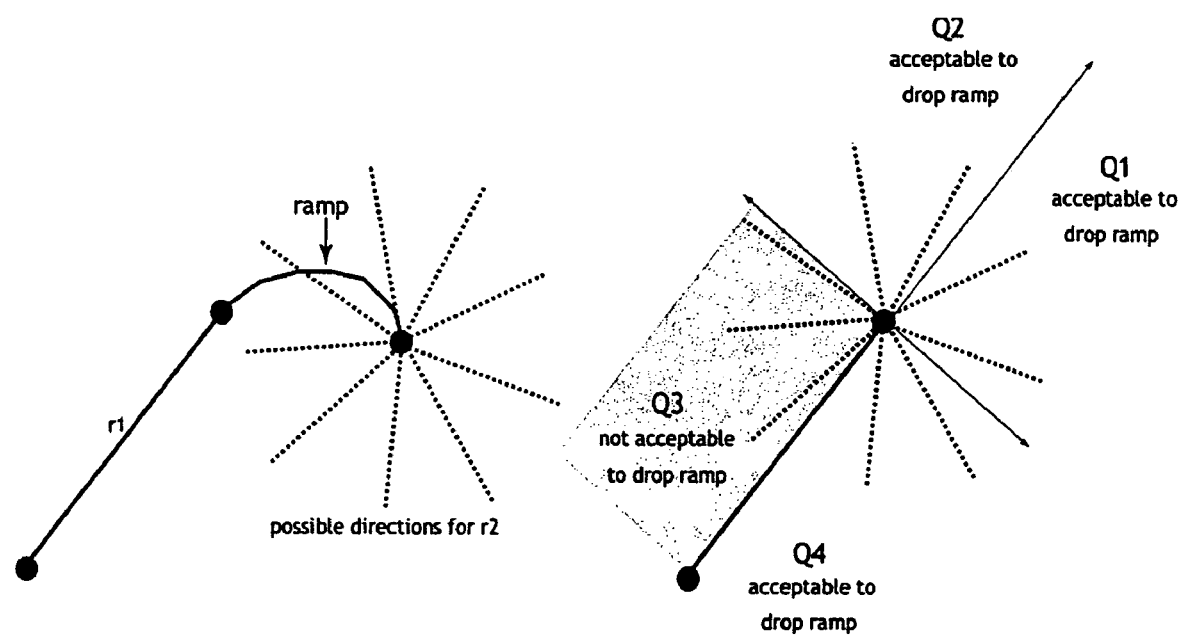
FIG. 39 illustrates how a check for turn angle consistency is made when considering to drop a ramp from a route map, in accordance with one embodiment of the present invention.

Ensuring turn angle consistency is slightly different when dropping ramps than when simplifying road shape. When dropping ramps, road simplification module 697 checks to make sure that the road continues to appear to be to the right of the ramp after removing the ramp. If this relationship does not hold, the turn is inconsistent and the ramp cannot be removed as shown in FIG. 39. Note a test for turn consistency does not have to be performed at a cloverleaf ramp since such ramps essentially form a circle, because they start and end at the same point, which is the same as the last point on the road before the ramp ($r_1$).

To check for turn consistency, road simplification module 697 first checks if the ramp, which is approximated as a single line segment between its start and end shape points, turns to the right or the left of $r_1$. If the ramp turns to the right then the ramp is dropped if the direction of $r_2$ is in the first, second or fourth quadrant of the coordinate system oriented along $r_1$. Similarly if the ramp turns to the left of $r_1$, the ramp is dropped if the direction of $r_2$ is in the first, second or third quadrant of the coordinate system oriented along $r_1$.

Similar Optimization Algorithms

While the examples for label optimization and route scale optimization included refinement of a target function using simulated annealing, it will be appreciated that the target functions of the present invention may be refined using any form of search based refinement algorithm. Representative search-based algorithm include, but are not limited to greedy algorithms, gradient descent, simulated annealing, Tabu searches, and A* as reviewed by Zbigniew et al. in *How to Solve It: Modern Heuristics*, Springer-Verlag, Berlin, Germany, 2000, greedy searches A*/IDA*, simulated annealing and hill climbing (gradient descent) as reviewed by Russell et al. in *Artificial Intelligence: A modern Approach*, Prentice Hall, 1995, and genetic algorithms as reviewed by Goldberg in *Genetic Algorithms in Search, Optimization and Machine Learning*, Addison-Wesley, 1989.

Concluding Remarks

The efficient use of data structures and acceleration techniques is useful in implementing the methods disclosed in the present invention. Typically, the search algorithms described herein require a significant number of iterations to converge, and scoring is done on each iteration. Often, scoring involves determining whether various objects in the map intersect, and the costs of these intersection calculations should be minimized. One way to minimize the cost of such calculations is to use a two-dimensional partitioning grid to subdivide the display and reduce the number of possible candidate objects for any intersection calculation.

It is also possible to significantly reduce the computational overhead of the search algorithms by performing a simple analysis before commencing a search. In many cases, the algorithm can determine the optimal length of a road or the optimal placement of a label will not detrimentally affect the size or placement of other roads or labels on the map. Therefore, these attributes can be assigned a priori thus reducing the size of the search space and reducing the running time of the algorithm.

References Cited

All cited references are incorporated herein by reference in their entirety and for all purposes to the same extent as if each individual publication was specifically and individually indicated to be incorporated by reference in its entirety for all purposes.

OTHER EMBODIMENTS

The present invention can be implemented as a computer program product that includes a computer program mechanism embedded in a computer readable storage medium. For instance, the computer program product could contain direction parser 684, road layout module 686, label layout module 688, and map renderer module 692 (FIG. 6). These program modules may be stored on a CD-ROM, magnetic disk storage product, or any other computer readable data or program storage product. The software module in the computer program product may also be distributed electronically, via the Internet or otherwise, by transmission of a computer data signal (in which the software modules are embedded) on a carrier wave.

It will be appreciated that, while reference was made to route maps that include roads, the present invention encompasses route maps of any kind. Thus, the route maps of the present invention include, but are not limited to, hiking trails, campus directions, and graphical representations of mass transportation networks in addition to road maps. Further, it will be appreciated that although reference is made in FIG. 6 to a system for generating a route map having a client/server format, many embodiments of the present invention are practiced using a single computer that is not necessarily connected to the Internet. Further still, it will be appreciated that the distribution of software modules shown in FIG. 6 is merely exemplary. For instance, embodiments in which direction parser 684, road layout module 686, label layout module 688, annotation module 690, map renderer module 692, direction database 694, and geographical landmark database 696 independently reside on client 622 and/or server 624 fall within the scope of the present invention.

The foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in an order to best explain the principles of the invention and its practical applications, to thereby enable others skilled in the art to best utilize the invention and various modifications as are suited to the particular use contemplated. It is intended that the scope of the invention be defined by the following claims and their equivalents.

We claim:

1. A computer-implemented method of preparing a route map that describes a path between a start and an end, said method comprising:

obtaining said path from said start to said end, said path comprising an initial set of elements wherein each said element comprises a portion of said path, each said element including information to determine a direction and each said element intersecting at least one other element in said initial set of elements; a first element in said initial set of elements including said start and a second element in said initial set of elements including said end;

independently applying a different scale factor to each of at least two elements in said initial set of elements; wherein application of said different scale factor to each of said at least two elements produces a scaled set of elements;

estimating a ratio of a total width to a total height of the route map that includes a rendering of each element in said scaled set of elements;

selecting, based on a function of said ratio of said total width to said total height, an image template from a plurality of image templates, wherein the plurality of image templates comprise different image template sizes to accommodate route maps of different sizes; and outputting a rendering of each element in said scaled set of elements to said image template.

2. The method of claim 1, wherein, in said selecting step:

when said ratio of said total width to said total height is less than 0.60, a first image template is selected;

when said ratio of said total width to said total height is greater than 2.0, a second image template is selected; and when said first image and said second image template is not selected, a third image template is selected.

3. The method of claim 1, wherein said image template is selected based on said function as well as a number of elements in said scaled set of elements.

4. A computer readable storage medium encoding computer readable instructions executable by a processor for preparing a route map that describes a path between a start and an end, the computer-readable instructions comprising:

instructions for obtaining said path from said start to said end, the path comprising an initial set of elements wherein each said element comprises a portion of said path, each said element including information to determine a direction and each said element intersecting at least one other element in said initial set of elements; a first element in said initial set of elements including said start and a second element in said initial set of elements including said end;

instructions for independently applying a different scale factor to each of at least two elements in said initial set of elements; wherein application of said different scale factor to each of said at least two elements produces a scaled set of elements;

instructions for estimating a ratio of a total width to a total height of the route map that includes a rendering of each element in said scaled set of elements;

instructions for selecting, based on a function of said ratio of said total width and said total height, an image template from a plurality of image templates, wherein the plurality of image templates comprise different image template sizes to accommodate route maps of different sizes; and instructions for outputting a rendering of each element in said scaled set of elements to said image template.

5. The computer readable storage medium of claim 4, wherein, said instructions for selecting further include:

instructions for selecting a first image template when said ratio of said total width to said total height is less than 0.60;

instructions for selecting a second image when said ratio of said total width to said total height is greater than 2.0; and instructions for selecting a third image template when said first image and said second image template is not selected.

6. The computer readable storage medium of claim 4, wherein said image template is selected based on said function as well as a number of elements in said scaled set of elements.

7. A computer system for preparing a route map, the computer system comprising:
- a central processing unit;
- a memory, coupled to said central processing unit;
- a viewport for displaying said route map;
- a map module stored in the memory comprising instructions, executable by said central processing unit, for preparing said route map, the route map describing a path between a start and an end, the map module further comprising:
- instructions for obtaining said path from said start to said end, the path comprising an initial set of elements wherein each said element comprises a portion of said path, each said element including information to determine a direction and each said element intersecting at least one other element in said initial set of elements; a first element in said initial set of elements including said start and a second element in said initial set of elements including said end;
- instructions for independently applying a different scale factor to each of at least two elements in said initial set of elements; wherein application of said different scale factor to each of said at least two elements produces a scaled set of elements;
- instructions for estimating a ratio of a total width to a total height of the route map that includes a rendering of each element in said scaled set of elements;
- instructions for selecting an image template from a plurality of image templates, the plurality of image templates comprise different image template sizes to accommodate route maps of different sizes, wherein the image template is selected based on a function of said ratio of said total width to said total height; and
- instructions for outputting a rendering of each element in said scaled set of elements to said image template.

8. The computer system of claim 7, wherein, said instructions for selecting further include:
- instructions for selecting a first image template when said ratio of said total width to said total height is less than 0.60;
- instructions for selecting a second image template when said ratio of said total width to said total height is greater than 2.0; and
- instructions for selecting a third image template when said first image and said second image template is not selected.

9. The computer system of claim 7, wherein said image template is selected based on said function as well as a number of elements in said scaled set of elements.

* * * * *